United States Patent
Tzirkel-Hancock

[11] Patent Number: 6,133,904
[45] Date of Patent: Oct. 17, 2000

[54] IMAGE MANIPULATION

[75] Inventor: Eli Tzirkel-Hancock, Surrey, United Kingdom

[73] Assignee: Canon Kabushiki Kaisha, Tokyo, Japan

[21] Appl. No.: 08/794,455

[22] Filed: Feb. 4, 1997

[30] Foreign Application Priority Data

Feb. 9, 1996 [GB] United Kingdom ............. 9602701

[51] Int. Cl.⁷ ......................................... G09G 5/02
[52] U.S. Cl. .................... 345/150; 345/156; 345/157; 345/153; 704/255; 704/256; 704/275
[58] Field of Search ................. 345/150–157; 358/518, 520, 522; 704/255, 256, 275

[56] References Cited

U.S. PATENT DOCUMENTS

| | | | |
|---|---|---|---|
| 4,726,065 | 2/1988 | Froessl | 381/41 |
| 4,922,544 | 5/1990 | Stansfield et al. | 382/56 |
| 5,151,998 | 9/1992 | Capps | 395/800 |
| 5,287,119 | 2/1994 | Drumm | 345/158 |
| 5,416,890 | 5/1995 | Beretta | 395/131 |
| 5,426,450 | 6/1995 | Drumm | 345/168 |
| 5,526,020 | 6/1996 | Campanelli et al. | 345/145 |
| 5,664,061 | 9/1997 | Andreshak et al. | 704/275 |
| 5,832,428 | 11/1998 | Chow et al. | 704/254 |

FOREIGN PATENT DOCUMENTS

| | | | |
|---|---|---|---|
| 0402911 | 12/1990 | European Pat. Off. | G06F 3/16 |
| 0594129 | 4/1994 | European Pat. Off. | G06F 3/033 |
| 0621531 | 10/1994 | European Pat. Off. | G06F 3/16 |

OTHER PUBLICATIONS

"Talk and Draw: Bundling Speech and Graphics", M.W. Salisbury et al, Computer, vol. 23, No. 8, Aug. 1, 1990, pp. 59–64, XP000150964.

*Primary Examiner*—Dennis-Doon Chow
*Assistant Examiner*—Amr Awad
*Attorney, Agent, or Firm*—Fitzpatrick, Cella, Harper & Scinto

[57] ABSTRACT

An apparatus for manipulating the colour of an image is provided, having a microphone for providing electrical speech signals representative of a user command, a speech recognition unit for recognizing the input speech signal, a command interpreter for interpreting the recognized speech, a graphics package responsive to the command interpreter and a display for displaying the current image being edited. The apparatus accepts other inputs, for example, from a pointing device.

28 Claims, 30 Drawing Sheets

IMAGE MANIPULATION

The present invention relates to a method of and apparatus for manipulating an image. The present invention has particular although not exclusive relevance, to colour manipulation of images in a computer graphics system.

Today's computer graphics systems are complex and provide the user with many processing options for manipulating the colour of an image. In these systems, the user must have a good understanding of the terminology used to describe the colour of the image, for example hue, intensity and saturation, and must be familiar with the colour manipulation tools provided to affect a desired colour manipulation of the image.

EP 594129 (Hitachi Limited) discloses a graphics package that can be controlled by voice in combination with a pointing device. The operations considered are the moving of objects within the image and the panning and zooming within the image. However, this document does not discuss the more difficult problem of manipulating the colour of a part or parts of the image.

One embodiment of the present invention provides an image manipulation apparatus comprising: means for reproducing an image; a speech recognition user interface for allowing a user to input a speech signal comprising a qualitative description of a desired colour change to be made to the reproduced image; and means for changing the colour of one or more parts of the reproduced image in order to affect the colour manipulation desired by the user.

Parts of the image that are to be changed may be designated by a pointing device which is used to sample the hue values of pixels within an area to be changed.

Another embodiment of the invention provides a method for manipulating an image comprising: reproducing an image to be manipulated; using a speech recognition user interface to output a recognition result for an input qualitative description of a desired colour change spoken by a user; interpreting the output recognition result and changing the colour of the, or parts of the, reproduced image in order to affect the colour manipulation desired by the user.

Various embodiments of the invention will now be described, by way of example only, with reference to the accompanying drawings in which.

Embodiments of the present invention can be implemented in computer hardware, but the embodiment to be described is implemented in software which is run in conjunction with processing hardware such as a personal computer, workstation, photocopier, facsimile machine or the like.

Figure 1:
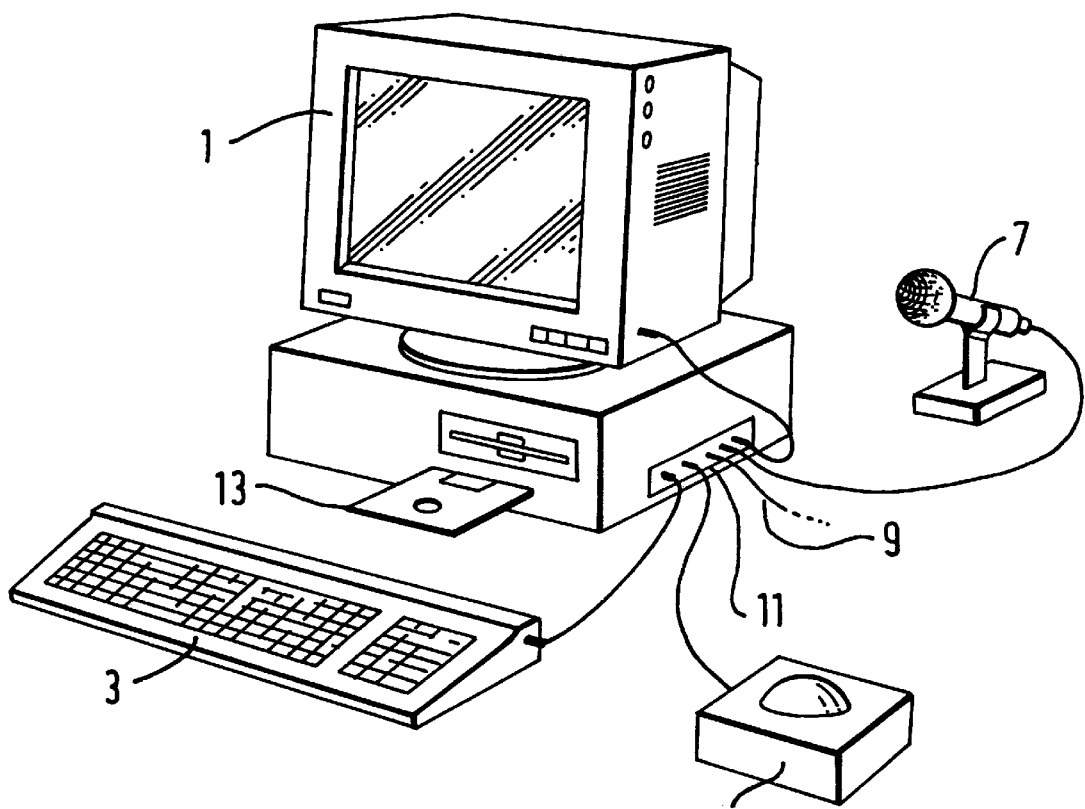
FIG. 1 is a schematic view of a computer which may be programmed to operate an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. In this embodiment, the beginning and end points of the input speech to be processed, are identified by the user holding the spacebar on the keyboard 3 down for the duration of the input utterance. In this manner, the system only processes the input utterance to be identified. An internal modem and speech receiving circuit (not shown) may be connected to the telephone line 9 so that the PC 1 can communicate with, for example, a remote computer or with a remote user.

The programme instructions which make the PC 1 operate in accordance with the present invention may be supplied for use with an existing PC 1 on a storage device such as a magnetic disc 13, or by the internal modem communicating with a remote computer via the telephone line 9.

The operation of the limited vocabulary continuous speech recognition system of this embodiment will now be described with reference to FIG. 2. Electrical signals representative of the input speech from, for example, the microphone 7 are applied to a preprocessor 15 which converts the input speech signal into a sequence of parameter frames, each representing a corresponding time frame of the input speech signal. The sequence of parameter frames are supplied to a recognition block where the speech is recognised by comparing the input sequence of parameter frames with reference models or word models 19, each model comprising a sequence of parameter frames expressed in the same kind of parameters as those of the input speech to be recognised.

A language model 21 and a noise model 23 are also provided as inputs to the recognition block 17 to aid in the recognition process. The noise model is representative of silence or background noise and, in this embodiment, comprises a single parameter frame of the same type as those of the input speech signal to be recognised. The language model 21 is used to constrain the allowed sequence of words output from the recognition block 17 so as to conform with sequences of words known to the system. The word sequence output from the recognition block 17 may then be transcribed for use in, for example, a word processing package or can be used as operator commands to initiate, stop or modify the action of the PC 1.

A more detailed explanation will now be given of the apparatus described above.

Preprocessor

The preprocessor will now be described with the aid of FIGS. 3 to 10.

The functions of the preprocessor 15 are to extract the information required from the speech and to reduce the amount of data that has to be processed. There are many known methods of preprocessing speech in the field of speech analysis and the following method is given by way of example only and should not be construed as limiting in any way. In this embodiment the preprocessor 15 is designed to extract "formant" related information. Formants are defined as being the resonant frequencies of the vocal tract of the user, which change as the shape of the vocal tract changes.

Figure 3:
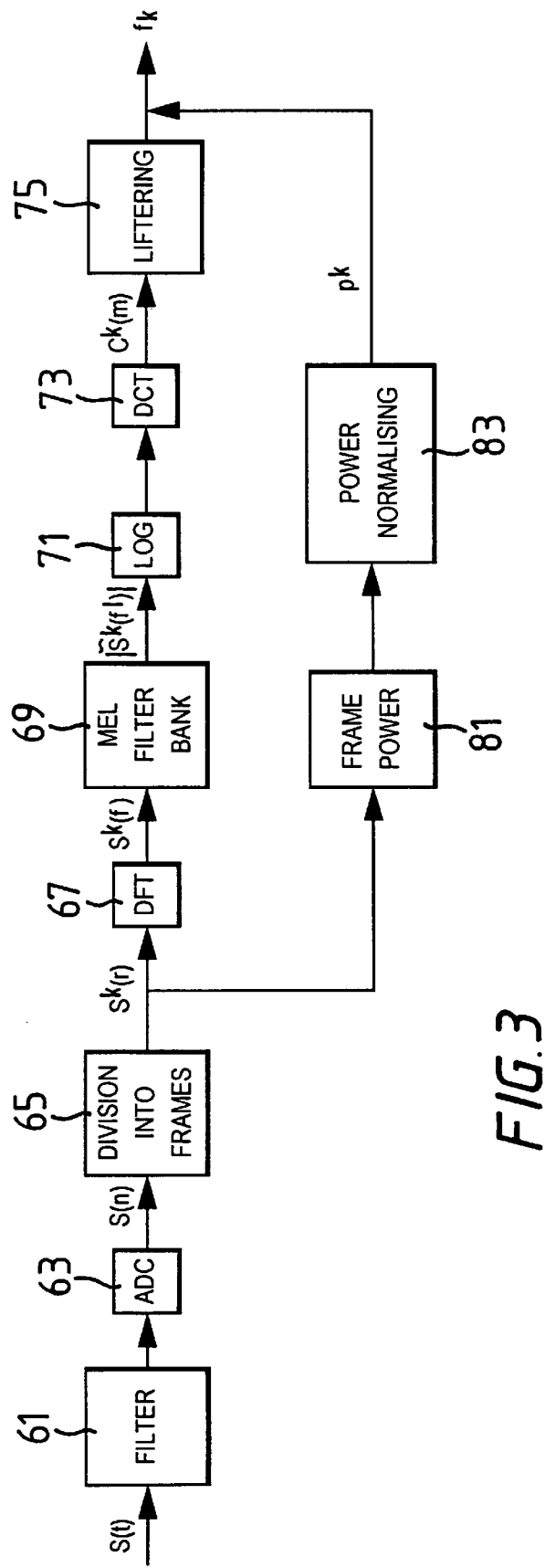
FIG. 3 is a block diagram of the preprocessor incorporated as part of the system shown in FIG. 2 which illustrates the processing steps that are performed on the input speech signal.

FIG. 3 shows a block diagram of the preprocessing that is performed on the input speech signal. Input speech S(t) from the microphone 7 or the telephone line 9 is supplied to filter block 61, which removes frequencies within the input speech signal that contain little meaningful information. In speech signals, most of the meaningful information is contained below 4 KHz. Therefore, filter block 61 removes all frequencies above 4 KHz. The filtered speech signal is then converted into digital samples by the analogue-to-digital converter (ADC) 63. To adhere to the Nyquist sampling criterion, ADC 63 samples the filtered signal at a rate of 8000 times per second. In this embodiment, the whole input speech utterance is converted into digital samples and stored in a buffer (not shown), prior to the subsequent steps in the processing of the speech signals.

After the input speech has been sampled it is divided into overlapping equal length frames in block 65. The reason for this division of the input speech into frames will now be described in more detail. As mentioned above, during continuous speech the formant related information changes continuously, the rate of change being directly related to the rate of movement of the speech articulators which is limited by physiological constraints. Therefore, in order to track the changing formant frequencies, the speech signal must be analysed over short time periods or frames, this method being known in the art of speech analysis as a "short time" analysis of speech. There are two considerations that have to be addressed when performing a short time analysis: (i) what rate should the time frames be extracted from the speech signal, and (ii) how large a time frame should be used.

The first consideration depends on the rate of movement of the speech articulators i.e. the frames should be sufficiently close to ensure that important events are not missed and to ensure that there is reasonable continuity. In this embodiment, a frame is extracted once every 10 milliseconds. The second consideration is determined by a compromise between the time frame being short enough so that the speech signal's properties during the frame are constant, and the frame being long enough to give sufficient frequency detail so that the formants can be distinguished. In the present embodiment, the frames are 20 milliseconds in length which, with the above sampling rate, corresponds to 160 samples per frame.

If these frames are generated by extracting the frames directly from the speech samples, considerable frequency distortion results. Therefore, to reduce such distortions, a smoothed window function should be used. There are many such windows available including Hamming, Hanning, Blackman, Bartlett and Kaiser all of which will be known to those skilled in the art of speech analysis. In the present embodiment, a Hamming window is used, this being represented by the following equation:

$$W(n)=0.54-0.46\cos[2\pi n/(N_s-1)] \quad (1)$$

where $N_s$ is the number of samples in the window, i.e. 160 samples.

Figure 4:
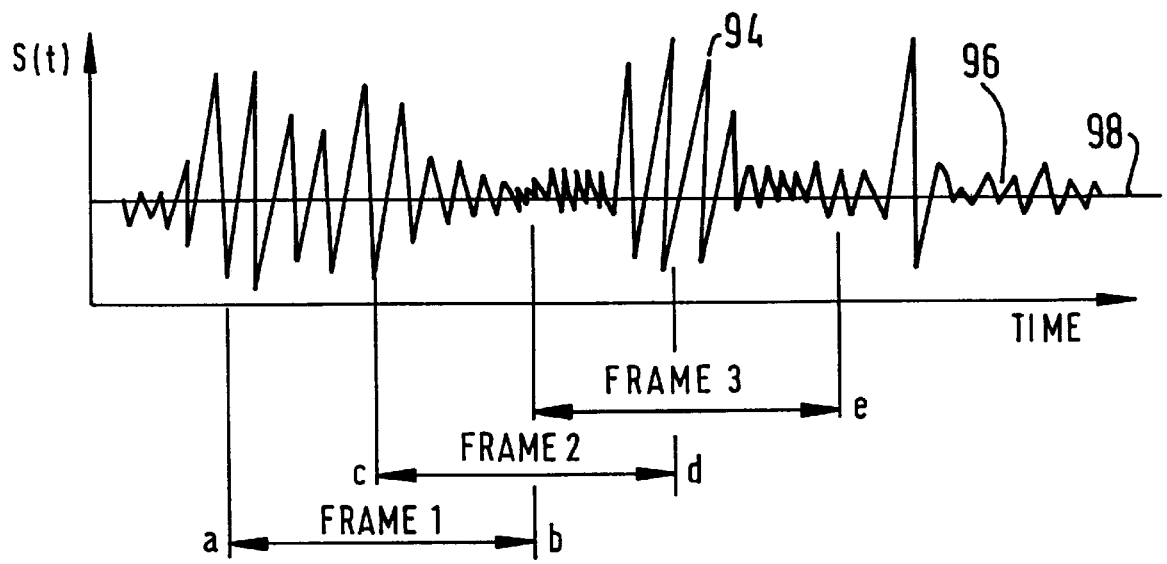
FIG. 4 is a diagrammatical representation of the division of the input speech signal S(t) into a series of time frames.

FIG. 4 shows in more detail the short time analysis operation that is carried out in the present embodiment. The speech signal in frame 1, i.e. between time instant "a" and time instant "b", is multiplied by the window function given in equation (1). Further, due to the choice of the frame rate and the frame length, the next frame, frame 2, starts midway between frame 1 at time instant "c" etc.

Figure 5:
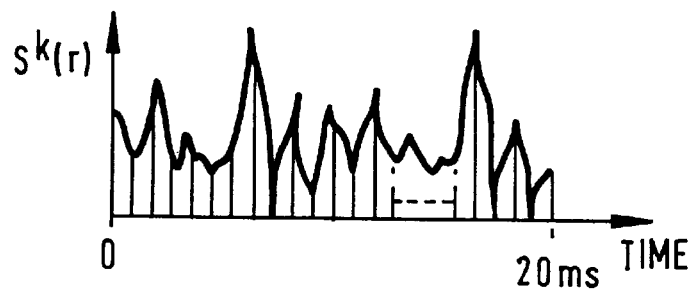
FIG. 5 is a diagrammatical representation of a typical speech signal for a single time frame.

Once a frame of input speech signal has been extracted, the magnitude of the discrete Fourier transform (DFT) of the frame is calculated in block 67, i.e. $|S^k(f)|$ where f is the discrete frequency variable. Only the magnitude information is required, since many aspects of this preprocessor are designed to simulate the operation of the human auditory system, which is relatively insensitive to the phase of the input speech signal. FIG. 5 shows a typical speech signal for a single frame $S^k(r)$ comprising 160 samples, i.e. r=0,1, . . . 159. To enable an efficient Fast Fourier Transform (FFT) algorithm to be used in the calculation of the DFT, the number of samples within the frame $S^k(r)$ needs to be increased to a power of 2. One method of achieving this is by adding 96 zero's at the end of the 160 samples to give 256 samples. This technique is known as "padding with zeros" and is well known in the art of speech analysis, and will not be described further.

Figure 6:
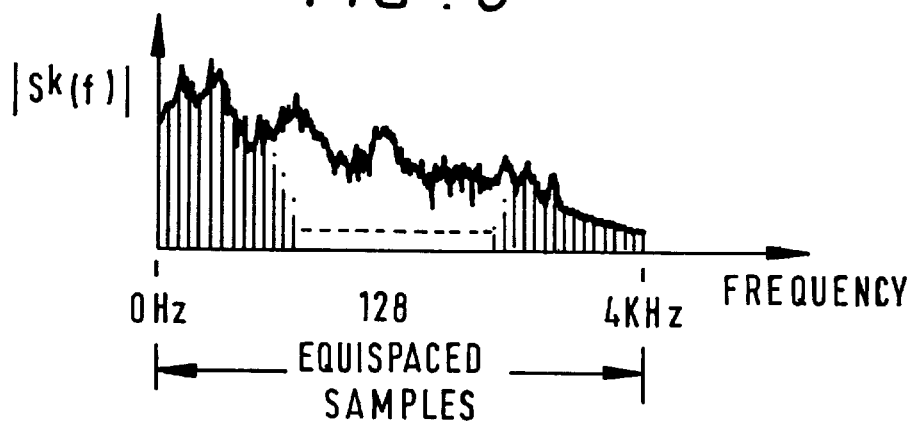
FIG. 6 is a diagrammatical representation of the magnitude response of the discrete Fourier transform of the speech signal shown in FIG. 5.

In computing the DFT of $S^k(r)$, only the first 128 samples of the spectrum need to be computed, since speech is a real signal and so the second 128 samples will be a mirror image of the first 128 samples. FIG. 6 shows the first 128 samples of the magnitude of the DFT $|S^k(f)|$ of the speech signal in frame $S^k(r)$ shown in FIG. 5, the last sample of which occurs at a frequency of half the sampling frequency, i.e. 4 KHz.

As mentioned earlier, the purpose of preprocessor 15 is to reduce the data rate and to emphasise particular components of the input speech signal. The data rate has been reduced slightly by the DFT, since there are now only 128 samples per frame. One method of reducing the data rate further is to split the spectrum into a number of equal frequency bands and to average the samples within each band, i.e. pass the samples shown in FIG. 6 through a filter bank.

Studies on the human auditory system have shown that the ear frequency resolution decreases with increasing frequency. Therefore, a logarithmically spaced filter bank, i.e. one in which there are more frequency bands in the low frequency region compared to the high frequency region, is preferable to a linearly spaced filter bank since a logarithmically spaced filter bank retains more perceptually meaningful information.

Figure 7:
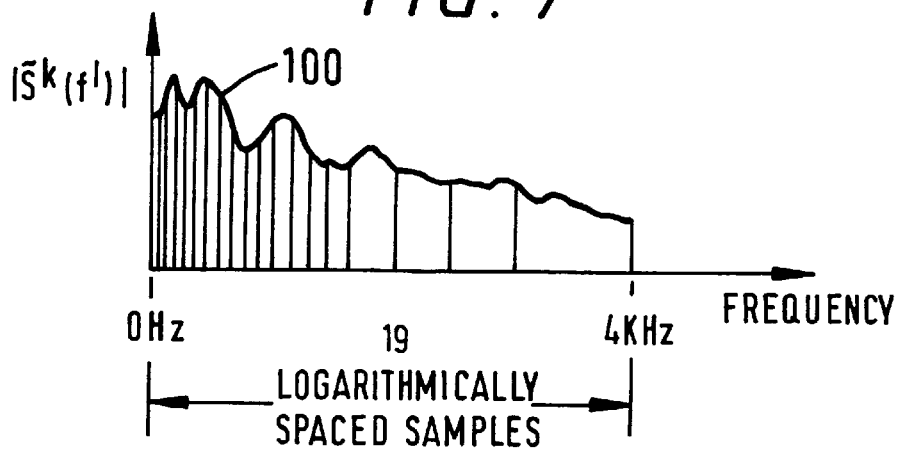
FIG. 7 is a diagrammatical representation of the averaged magnitude response output of a mel scale filter bank.

In the present embodiment, a mel spaced filter bank 69 having nineteen bands is used. The mel scale is well known in the art of speech analysis, and is a logarithmic scale that attempts to map the perceived frequency of a tone onto a linear scale. FIG. 7 shows the output $|\tilde{S}^k(f')|$ of the mel spaced filter bank 69, when the samples shown in FIG. 6 are passed through the bank 69. The resulting envelope 100 of the magnitude spectrum is considerably smoother due to the averaging effect of the filter bank 69, although less smooth at the lower frequencies due to the logarithmic spacing of the filter bank.

The formant related information is then extracted from the speech using blocks 71, 73 and 75 of FIG. 3, by a process which will now be explained.

It is possible to model the speech signal S(t) of a user in terms of an excitation signal E(t) and a filter V(t), where the excitation signal E(t) represents the airflow entering the vocal tract, and the filter V(t) represents the filtration effect of the vocal tract. Consequently, the magnitude of the frequency spectrum $|S(f)|$ of the speech signal is given by the multiplication of the magnitude of the frequency spectrum $|E(f)|$ of the excitation signal with the magnitude of the spectrum $|V(f)|$ of the vocal tract filter, i.e.

$$|S(f)|=|E(f)|\cdot|V(f)| \quad (2)$$

One method, known as the cepstral method, of extracting the vocal tract information from the input speech will now be described. This method involves separating the vocal tract filter magnitude response $|V(f)|$ from the excitation magnitude response $|E(f)|$ by taking the logarithm of the speech magnitude response $|S(f)|$, which results in the excitation and vocal tract filter characteristics becoming additive, i.e.

$$\log|S(f)|=\log|E(f)|+\log|V(f)| \quad (3)$$

Figure 8:
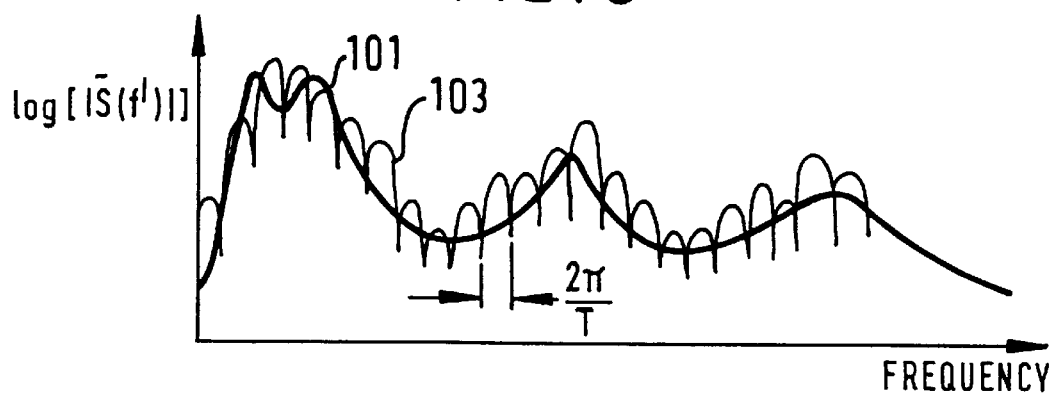
FIG. 8 is a diagrammatical representation of the log magnitude spectrum of the output from the mel scale filter bank.

FIG. 8 shows the envelope of the logged output from the mel filter bank 69, i.e. log $|\tilde{S}^k(f')|$, which shows graphically the additive nature of two components 101 and 103. Component 101 is representative of the vocal tract characteristics, i.e. log $|V(f)|$, and component 103 is representative of the excitation characteristics, i.e. log $|E(f)|$. The peaks in component 101 occur at the formant frequencies of the vocal tract and the equally spaced peaks in component 103 occur at the harmonic frequencies of the pitch of the speaker.

The vocal tract characteristics 101 can be extracted from the excitation characteristics 103, by performing a Discrete Cosine Transform (DCT) on the samples output from block 71, and then filtering the result.

Figure 9:
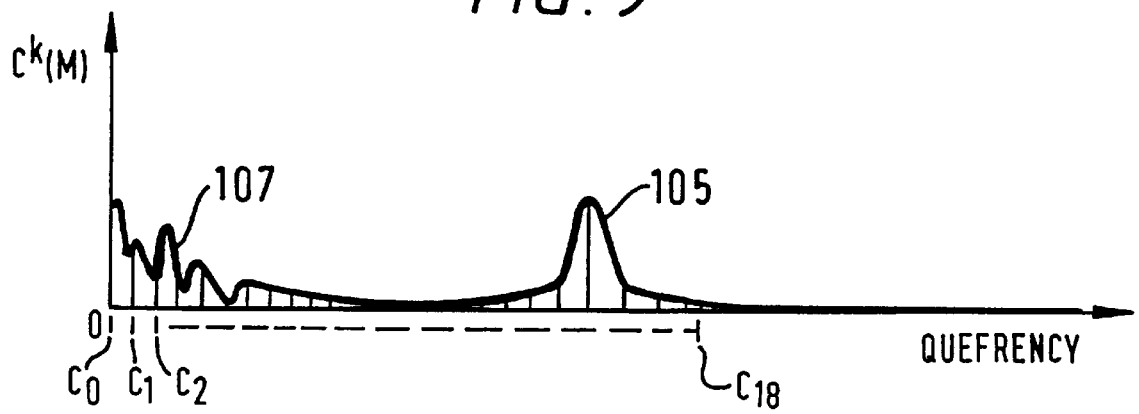
FIG. 9 is a diagrammatical representation of the cepstrum of the logged magnitude spectrum shown in FIG. 8.

FIG. 9 shows the output of the DCT block 73, which is known as the cepstrum $C^k(m)$. The independent variable (x-axis of FIG. 9) of the cepstrum has dimensions of time and is given the name "quefrency". The strongly periodic component 103 shown in FIG. 8 becomes a peak 105 in the cepstrum at a location equivalent to the pitch period T of the speaker. The slowly varying component 101 shown in FIG. 8, is transformed onto a number of small peaks 107 near the origin of the cepstrum, the position and amplitude of which are dependent on the formants.

As the vocal tract characteristics and the excitation characteristics of speech appear in separate parts of the quefrency scale, they can be separated from one another by a filtering process, or, in cepstral terminology by a so called "liftering" process. The cepstrum $C^k(m)$ shown in FIG. 9 is made up of a set of discrete cepstral coefficients ($C_0$, $C_1$, . . . $C_{18}$), and therefore the liftering could be achieved by means of a simple rectangular window. However, in order to de-emphasise parts of the spectrum that are considered to be less reliable, a more gradual windowing function is preferred. In the present embodiment, the following window function is used in liftering block 75:

$$W_{lift}(m) = 1 + \frac{N_c}{2}\sin\frac{\pi m}{N_c} \quad (4)$$

where $N_c$ is the desired number of cepstral coefficients output per frame from the liftering block 75, which in the present embodiment is twelve.

In addition to the twelve cepstral coefficients mentioned above, the power of the speech signal within each frame, i.e. the "frame power" is also calculated. This is an important feature since it can be used, among other things, to indicate whether or not the input speech signal during the frame corresponds to a voiced speech signal. The frame power is calculated in frame power block 81 shown in FIG. 3 using a conventional method well known in the art of speech analysis. To achieve independence of variable recording conditions, variable loudness etc, the power determined in block 81 is normalised in power normalising block 83 to give a power coefficient pk which is combined with the cepstral coefficients output from the littering block 75. The power is normalised in block 83 by determining the maximum power (dB) across the utterance stored in the, buffer (not shown), subtracting this from the power of each frame and multiplying the result by a normalisation constant.

Whereas in the present embodiment, the power of the input speech signal during each frame is determined, other values indicative of the input speech signal during each frame could be used. For example, a measure of the average magnitude of the input speech signal during a frame could be determined and normalised.

In summary, the preprocessor 15 outputs, for each time frame, a set of coefficients—twelve cepstral coefficients and one power coefficient. For convenience, the coefficients that represent frame k will be referred to as parameter frame $f_k$, and the coefficients that represent the subsequent frame will be referred to as parameter frame $f_{k+1}$ etc.

Buffer

Figure 2:
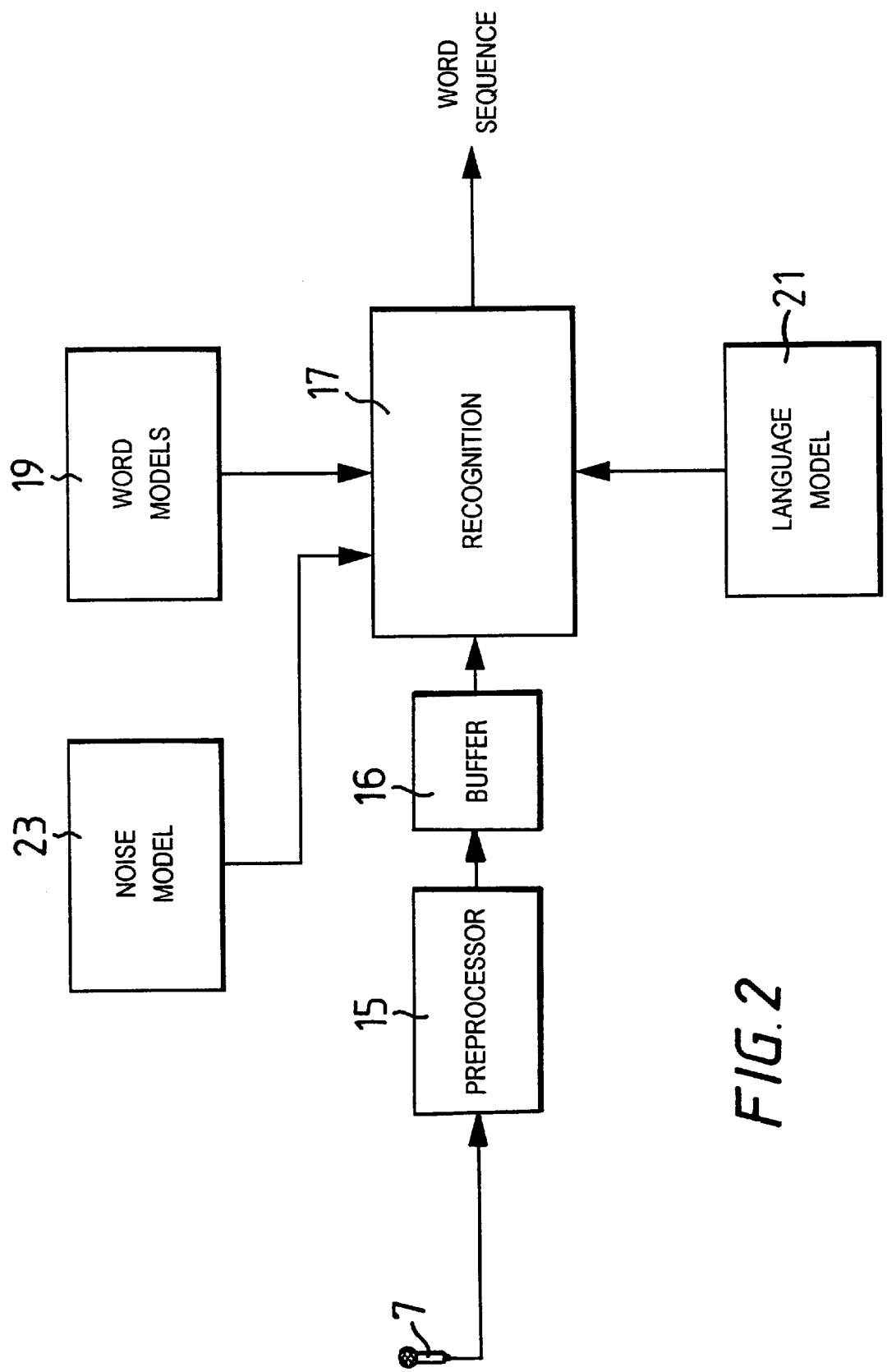
FIG. 2 is a schematic overview of a speech recognition system.

The parameter frames $f_k$ output from preprocessor 15 are applied to the buffer 16 shown in FIG. 2. In the present embodiment, the buffer 16 is large enough to store all the parameter frames generated for the speech stored in the buffer (not shown) which stores the digital samples output from ADC 63 for the input speech. After the entire input utterance has been processed by the preprocessor 15, the parameter frames stored in buffer 16 are fed to the recognition block 17 in the order that they are received, where the input utterance is recognised.

Reference Models

As mentioned above, in order to determine which words are represented by the output signals from the preprocessor 15, these signals are compared with stored reference models which model the words already known to the system and the acoustic environment surrounding the system. Each model associated with a particular word comprises a sequence of parameter frames of the same type of parameter frames output from the preprocessor 15 described above. However, to differentiate between the frames in the word models and the frames in the input utterance to be recognised, the frames in the word models will be referred to as states.

One feature of the speech recognition system according to this embodiment is that it can be supplied to the end user with no word models, environment (or noise) model or language model pre-stored therein. This allows the user the freedom to train the system to recognise the phrases he wants, without the system being overburdened with pre-stored words which may not be useful for the user's purpose. Further, as will be seen from the following description, the particular training method described is particularly adapted to this situation because it allows for new phrases to be learnt by the system without the need for a time consuming training session. In addition, since the reference models correspond to whole words and not phonemes, the system will work for any language or even any mixture of languages. The training process will now be described in more detail with reference to FIGS. 10 to 17.

Training

Figure 10:
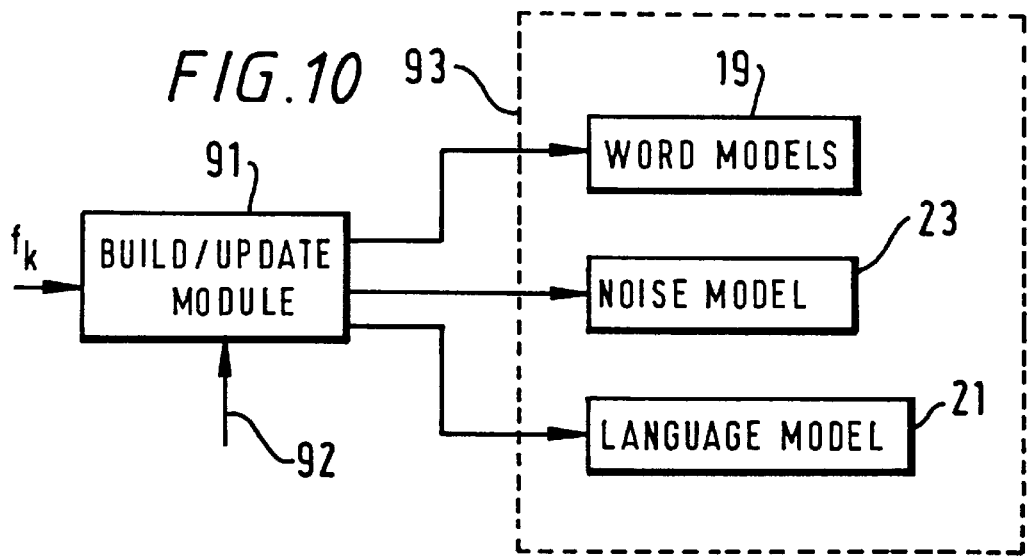
FIG. 10 is a schematic diagram of the reference model builder used during a training process.

FIG. 10 is a schematic diagram which illustrates the build/update module 91 which is used in the training process. In particular, the build/update module 91 receives sequences of parameter frames $f_k$ representative of a word or words to be learnt by the system, and user information, represented by arrow 92, indicative of the text corresponding to the input spoken word or words. If sufficient information has been input into the build/update module 91 then it generates word models corresponding to the input words and updates the language model 21. In this embodiment, both the word models and the language model are stored in a high volume data storage unit, such as a hard disc 93.

The manner in which the noise model 23 is determined in this embodiment will now be described. Firstly, the user indicates that he wishes to build a new or change the existing noise model 23. In response, the system prompts the user to input sound representative of silence. This is achieved by the user holding down the spacebar on the keyboard 3 while remaining silent. At the end of the period of silence, the user must then utter a word so that the system can normalise the power coefficient of the generated parameter frames representative of the silence. If the user does not utter a word at the end of the period of silence then the power coefficient for the noise model 23 will be unrealistically high, and misrecognition errors may result. Finally, in order to determine the noise model 23, the system averages the parameter frames generated for the period of silence to produce a single parameter frame which is used as the noise model 23.

The speech recognition system of this embodiment is designed to recognise continuously spoken words, i.e. words embedded within phrases. In order to achieve good recognition results, the reference models (or continuous word models) should be derived from example phrases which contain the words of interest. Unfortunately, it is not an easy task to identify the beginning and end points of a word within a continuously spoken phrase. An overview of the way in which the present embodiment generates a continuous word model will now be given. Firstly, the system determines a model for the word from an isolated utterance of that word. This model will be referred to as the "isolated word model" although, as those skilled in the art of speech recognition will realise from the following description, these isolated word models may not correspond to conventional isolated word models well known in the art. The system then uses the isolated word models to generate the continuous word models by comparing the isolated word models with example phrases containing the corresponding words.

To generate the isolated word model, the word must be input into the system via the microphone 7 or the telephone line in isolation. As described above, the space bar is used to identify each incoming utterance. Therefore, the sequence of parameter frames representative of the isolated utterance of the word will comprise parameter frames at the beginning and end thereof which correspond to silence. The system then compares the utterance of the isolated word with example phrases which contain that word. This comparison identifies approximate beginning and end points of the word within the isolated utterance. These beginning and end points are then averaged and the isolated word model for the word is determined by extracting the sequence of parameter frames which lies between the averaged beginning and end points. By determining the isolated word model in this way, not only should the silence at the beginning and end of the word be removed, but parts of the word which are not pronounced during continuous speech will also be removed. Therefore, the isolated word model may not correspond to a conventional isolated word model, which is determined by removing the silence from the beginning and ends of the input utterance, and will be more representative of the word when spoken in continuous speech.

Once the isolated word model has been determined, it is aligned with the example phrases which contain that word in order to identify the location of the word within the phrase. Finally, the reference or continuous word model is determined by extracting and combining the speech from the locations identified in the phrases. The way in which the system generates the word models will now be described in more detail.

Figure 11:
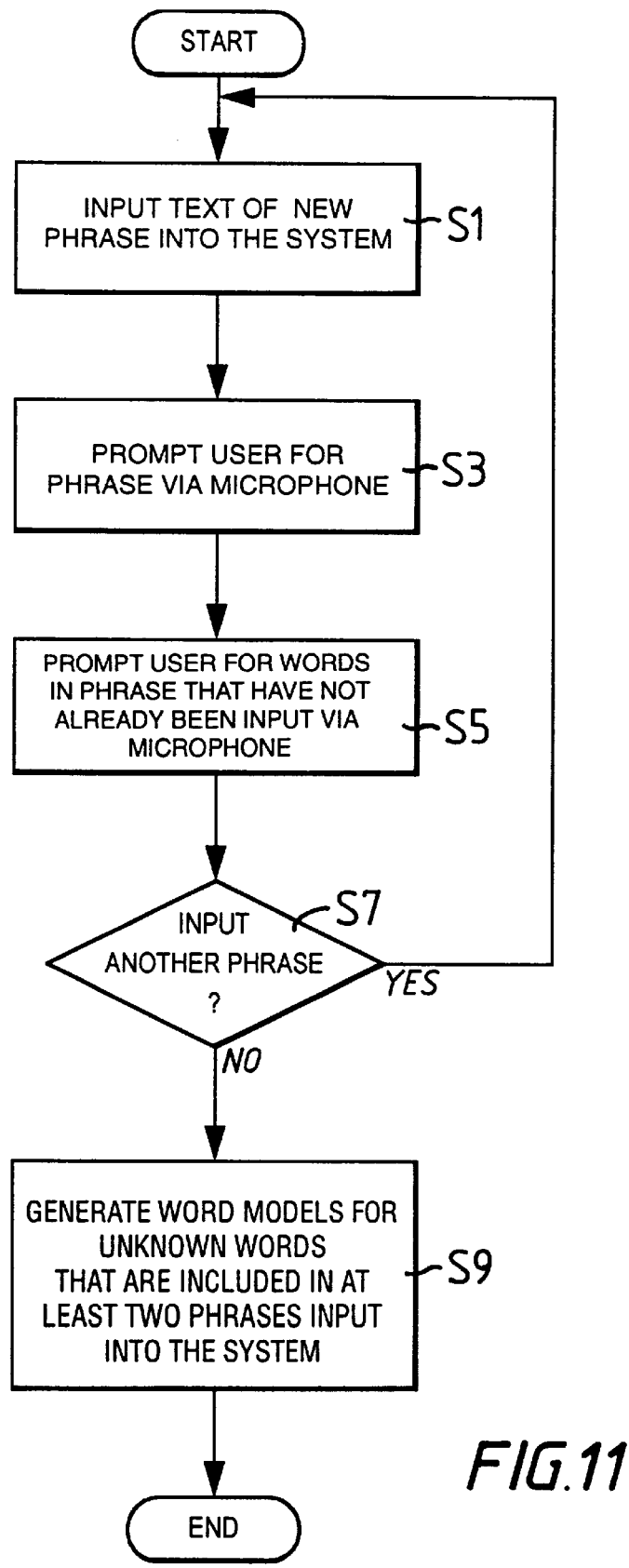
FIG. 11 is a flow chart which illustrates the steps taken during the training process for generating word models for use in the speech recognition system.

When the user wishes to teach the system one or more new phrases, the user initiates the subroutine shown in FIG. 11. In step S1 the user enters the text of the new word or phrase into the system via the keyboard 3. The system then checks whether that word or phrase is already known, and if it is not then in step S3, it prompts the user to enter the same word or phrase via the microphone 7, and associates the utterance with the corresponding text input in step S1. Next in step S5 the PC 1 uses all the text which has been previously entered, to check whether any of the words within the phrase have been input (in isolation) already, and prompts the user to input, in isolation via the microphone 7, those words that have not been entered before.

After step S5, the user decides whether to enter another new word or phrase in step S7, and returns to step S1 if he does. On the other hand, if the user decides not to input any more phrases, then the processing moves to step S9 where reference models are generated for unknown words which are included in at least two phrases input into the system. For example, if no training phrases have been input, and the system has no pre-stored reference models, and the user decides to input the phrases "get an image" and "get the earth", and then decides in step S7 that he does not wish to enter any more phrases, then the system will only be able to generate a word model for the word "get", since it is the only word that is in both of the input phrases. If on the other hand the user inputs the phrase "get an image" twice, then the system will be able to generate a reference model for each word in the phrase. Taking the first example mentioned above further, if the user decides to input the phrase "get the earth" in a second training session after inputting the first two phrases, then the system will not prompt the user for the words "get" or "the" in step S5 since these words will have been input in isolation already. Further, the system will now be able to generate a reference model for the word "the" since it now appears in two phrases which have been input into the system. In this way, the training is incremental and can be trained at the convenience of the user.

Figure 12:
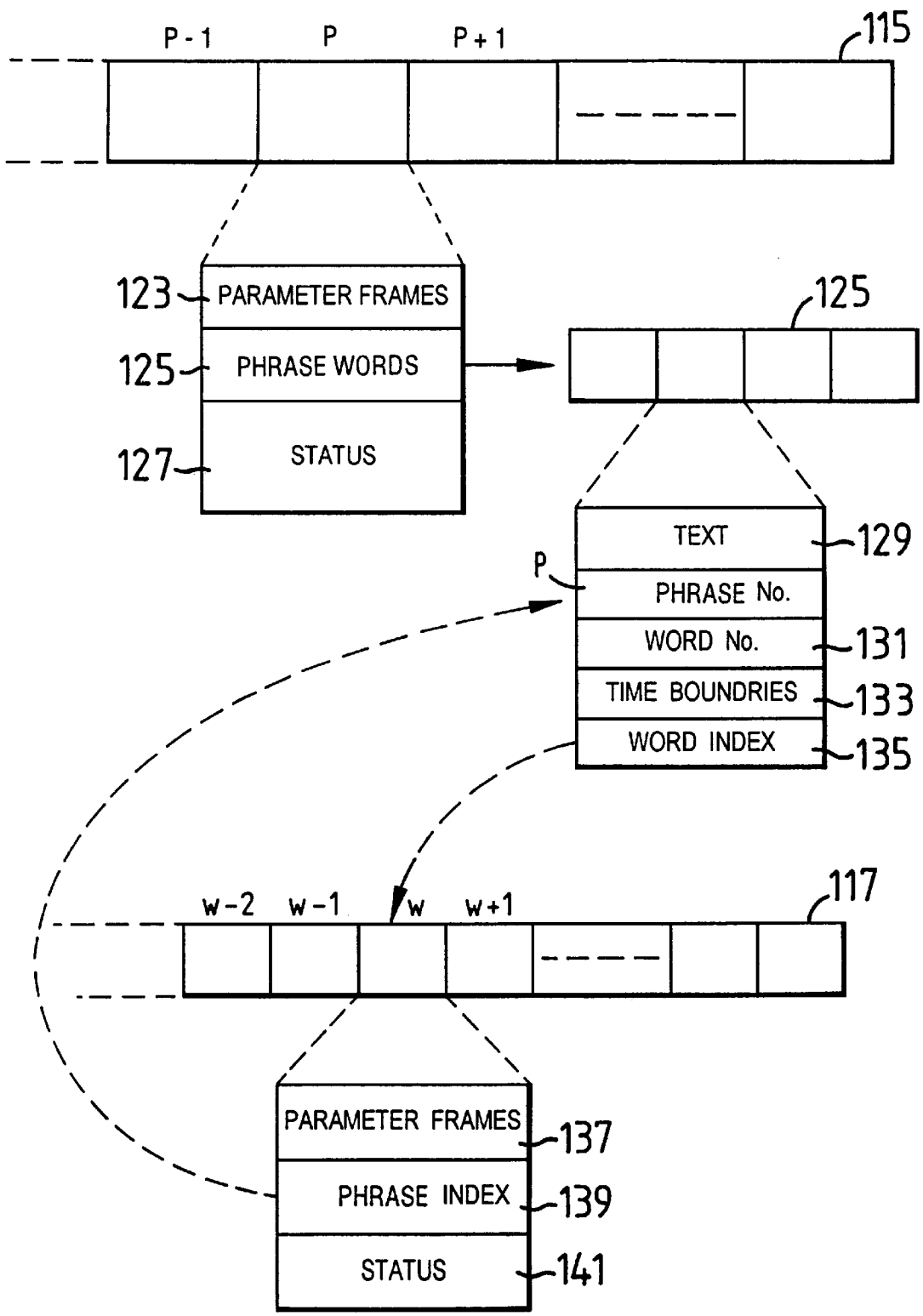
FIG. 12 is a schematic diagram which illustrates the manner in which the training phrases and words are stored during the training process.

Referring to FIG. 12, each phrase input in the above manner is given a phrase number P and is stored in a phrase array 115 on the hard disc 93. Similarly, each isolated word that is input is given a word number W and is stored in a word array 117 on the hard disc 93. As shown in FIG. 12, each phrase P in the phrase array 115 has an associated sequence of parameter frames 123, the sequence of words 125 that form the phrase and a status flag 127. Each word in the sequence of words 125 has an associated text 129 of the word, the phrase number P, the word number 131 (i.e. the position of the word within the phrase), the time boundaries 133 of the word within the phrase and a word index 135 which points to the corresponding isolated word W in the word array 117. Each isolated word W in the word array 117 has an associated sequence of parameter frames 137, a phrase index 139 which points back to those phrases in which that word can be found and a status flag 141.

Initially, when the isolated words and phrases are being entered into the system, the status flags 127 and 141 associated with each word or phrase are labelled FLEXI to indicate that they have not been processed, and the time boundaries 133, associated with each word within the sequence of words in the phrase, are set to UNKNOWN.

The generation of the word models for the unknown words performed in step S9 of FIG. 11 will now be briefly described with reference to FIGS. 12 to 16, using as an example the training phrases "get an image" which has been input twice, and "get the earth" which has been input once. Therefore, there will be three elements P1, P2 and P3 in the phrase array 115, one for each utterance of the phrase "get an image" and one for the utterance of the phrase "get the earth". Additionally, there will be five elements W1, W2, W3, W4 and W5 in the words array 117, one for each of the different words that make up the two phrases. As described above, a sequence of parameter frames corresponding to each phrase and corresponding to each of the different words will be stored in the corresponding elements in the phrase array 115 and word array 117.

Figure 13:
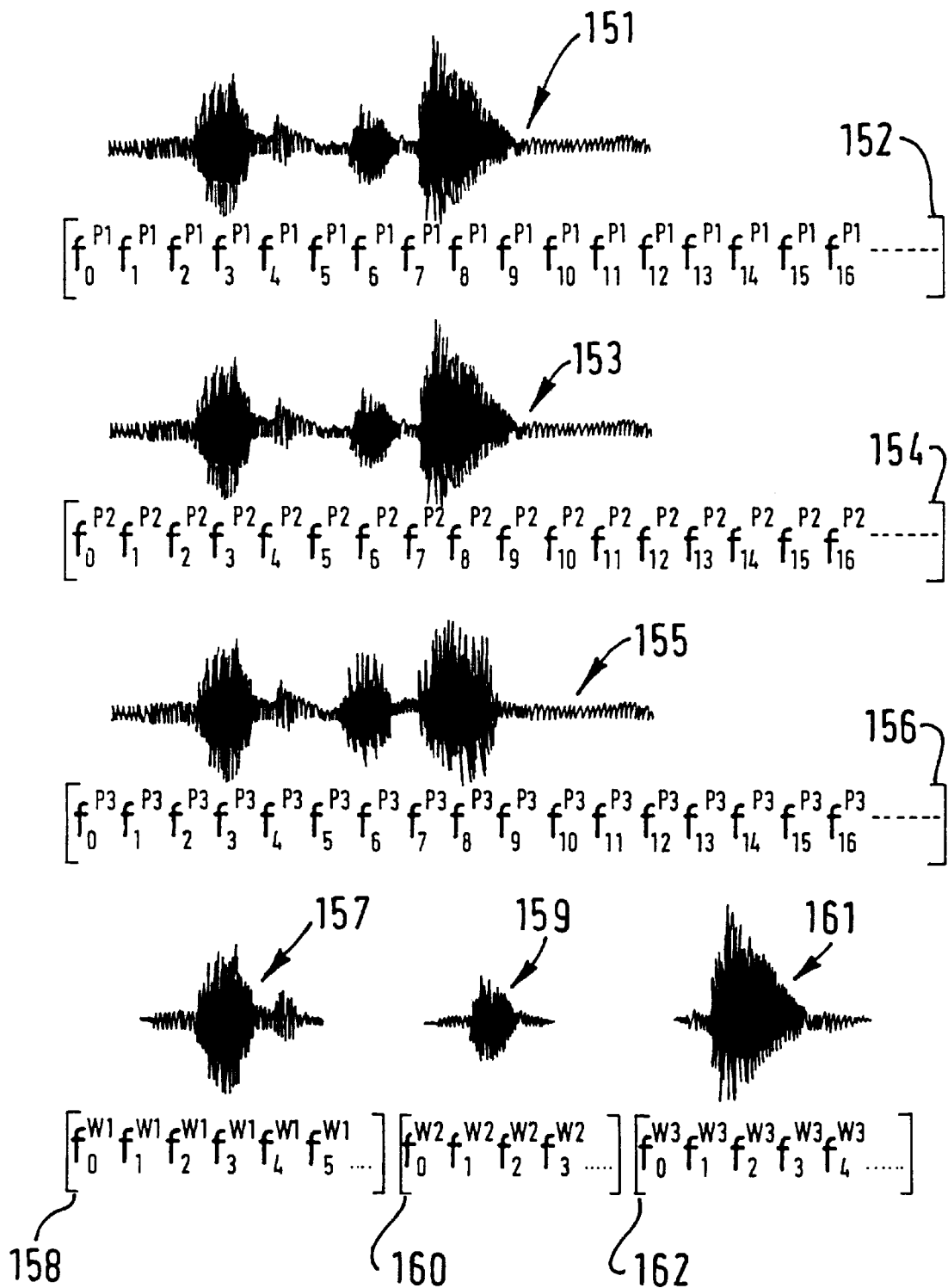
FIG. 13 is a schematic representation of a number of input phrases and words, and their corresponding sequences of parameter frames.

FIG. 13 shows speech signals 151 and 153 which represent the two utterances of the phrase "get an image" and speech signal 155 which represents the utterance of the phrase "get the earth". FIG. 13 also shows the speech signals 157, 159 and 161 which represent the isolated utterances of the words "get", "an" and "image" respectively. FIG. 13 also shows the two sequences of parameter frames 152 and 154 which correspond to the two utterances of the phrase "get an image", the sequence of parameter frames 156 corresponding to the utterance of the phrase "get the earth" and the sequences of parameter frames 158, 160 and 162 corresponding to the utterances of the isolated words "get", "an" and "image" respectively. Representations of the words "the" and "earth" are not shown in FIG. 13, since word models for these words cannot be generated as they do not appear in two or more phrases.

Figure 14:
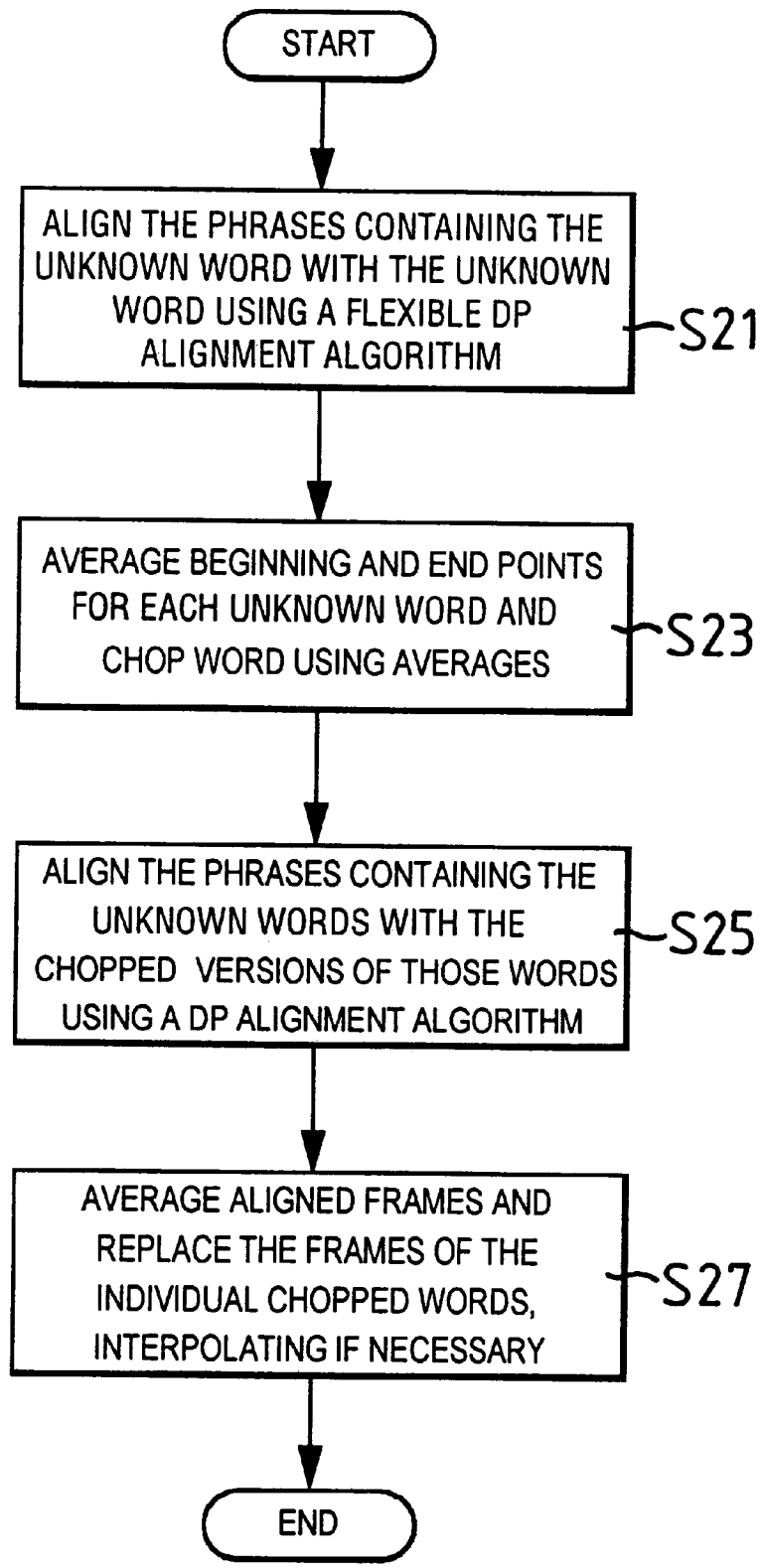
FIG. 14 is a flow chart which illustrates the steps taken in determining the word models from the input utterances, input during the training session.

FIG. 14 shows in more detail the steps required to generate a word model for each of the unknown words. In particular, in step S21 the sequences of parameter frames corresponding to the input phrases that contain the unknown words are aligned with the sequences of parameter frames corresponding to the unknown words when spoken in isolation, using a flexible dynamic programming alignment process which accommodates the initial lack of knowledge of the start and end points of the unknown words. In particular, a dynamic programming alignment process is used that does not constrain where the optimum alignment path of each word must begin or end. This flexible dynamic programming alignment process will be described in more detail later after dynamic programming alignment has been discussed.

The result of the flexible dynamic programming alignment is the identification of an approximate start and end point of each unknown word within the sequence of parameter frames for that unknown word. For example, when the sequence of parameter frames 152 corresponding to the first utterance of the phrase "get an image" is aligned with the sequence of parameter frames 158 corresponding to the utterance of the unknown word "get", a start and end point of that word within the sequence of parameter frames 158 are identified from the alignment results. As mentioned above, the parameter frames before the start point and after the end point correspond to background noise, or parts of the word which are not pronounced in the example phrases, and can therefore be removed.

The alignment performed in step S21 for the example training phrases will identify three sets of start and end points for the word "get" (since the word "get" appears in three phrases) and two sets of start and end points for the words "an" and "image" (since the words "an" and "image" appear in two phrases). In step S23 an average start and end point for each unknown word are determined and the frames before the average start frame and after the average end frame are discarded. For example, if after step S21 for the word "get" the start points identified using the three phrases 151, 153 and 155 are frame $f_8^{W1}$, frame $f_9^{W1}$ and frame $f_{13}^{W1}$, then the average is frame $f_{10}^{W1}$ ($[8+9+13]/3$) and all frames in the sequence of parameter frames 158 before frame $f_{10}^{W1}$ are discarded. A similar procedure is used for the end points, except that it is the frames beyond the end frame which are discarded. The resulting sequence of parameter frames for each word is the isolated word model mentioned above for that word.

Figure 15:
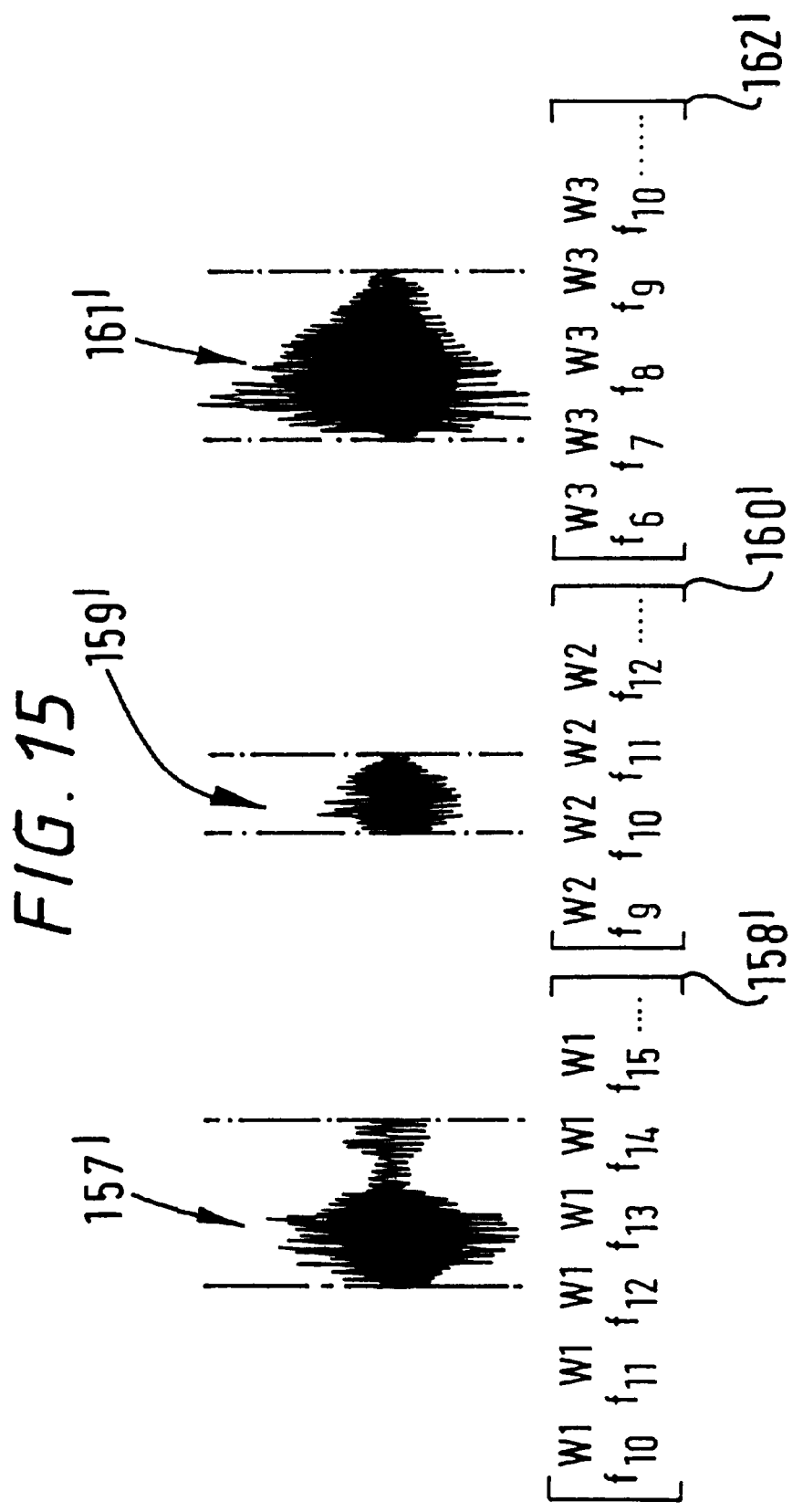
FIG. 15 is a schematic representation of training words and their corresponding sequences of parameter frames which have had their ends discarded.

FIG. 15 shows the speech signals 157', 159' and 161' and the corresponding sequences of parameter frames of the isolated word models 158', 160' and 162' for the words "get", "an" and "image" respectively. At this stage in the processing, the status flag 141, shown in FIG. 12, for each word processed is changed from FLEXI to CHOPPED to signify that the unknown words have had the frames from the beginning and ends removed.

Figure 16:
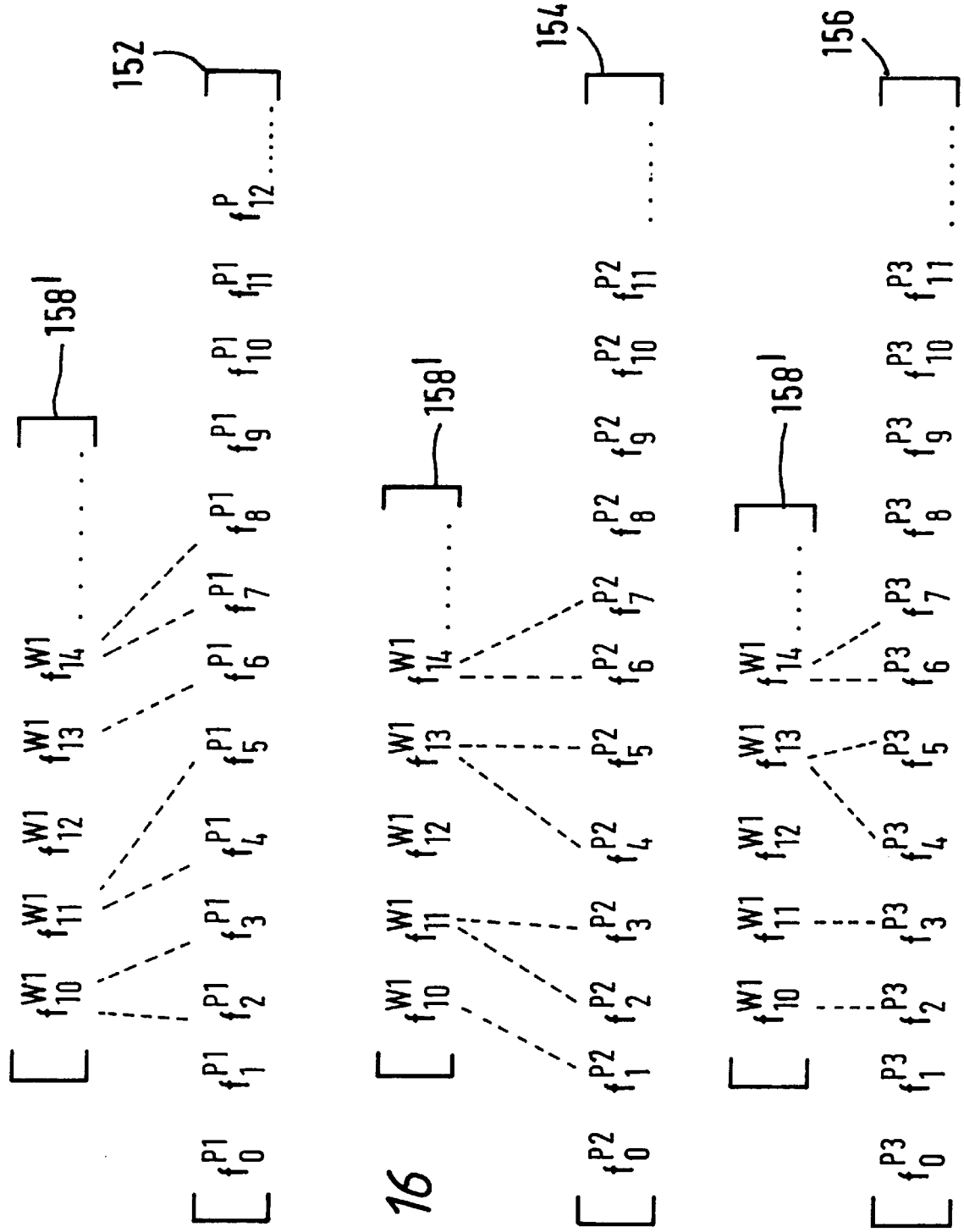
FIG. 16 is a schematic representation of the alignment between parameter frames of the word shown in FIG. 15 and parameter frames corresponding to the input phrases in which that word appears.

Next in step S25 shown in FIG. 14, the sequences of parameter frames corresponding to the input phrases are aligned with the sequences of parameter frames of the isolated word models for the words in those phrases. For example, the sequences of parameter frames 152, 154 and 156 corresponding to the utterances of phrases in which the word "get" appears are aligned with the sequence of parameter frames of the isolated word model 158' for the word "get". FIG. 16 shows the resulting alignment achieved between the sequences 152,154 and 156 and the sequence 158', where the dashed lines represent the alignment between the frames. As shown, it is established that frames $f_2^{P1}$ and $f_3^{P1}$ are aligned with frame $f_{10}^{W1}$, and frames $f_4^{P1}$ and $f_5^{P1}$ are aligned with frame $f_{11}^{W1}$ etc.

Next in step S27 shown in FIG. 14, a reference model for the unknown word is generated by replacing the individual frames of the isolated word model with the average of the aligned frames from the sequences of parameter frames corresponding to the phrases. For example, for the sequence of parameter frames of the isolated word model 158' shown in FIG. 16, frame $f_{10}^{W1}$ is replaced by the average of frames $f_2^{P1}, f_3^{P1}, f_1^{P2}$ and $f_2^{P3}$, whilst frame $f_{11}^{W1}$ is replaced by the average of frames $f_4^{P1}, f_5^{P1}, f_2^{P2}, f_3^{P2}$ and $f_3^{P3}$ etc. In the event that there are no frames of a phrase aligned with one of the frames of the isolated word model, then that particular frame is replaced by a frame derived by interpolating between or extrapolating from neighbouring replaced frames. Therefore, for the sequence of parameter frames 158' shown in FIG. 16, frame $f_{12}^{W1}$ is not aligned with any of the frames in the sequences of parameter frames 152, 154 or 156, and is replaced by a frame derived by interpolating between the substituted frames for $f_{11}^{W1}$ and $f_{13}^{W1}$. Alternatively, the frames of the isolated word model which are not aligned with any frames of the phrase can be discarded.

The reference word models generated in step S27 are ready for use in the speech recognition part of the system, which will be described further below. Therefore, the status flag 141 of each word that has been processed is changed from CHOPPED to IN-USE.

Figure 17A:
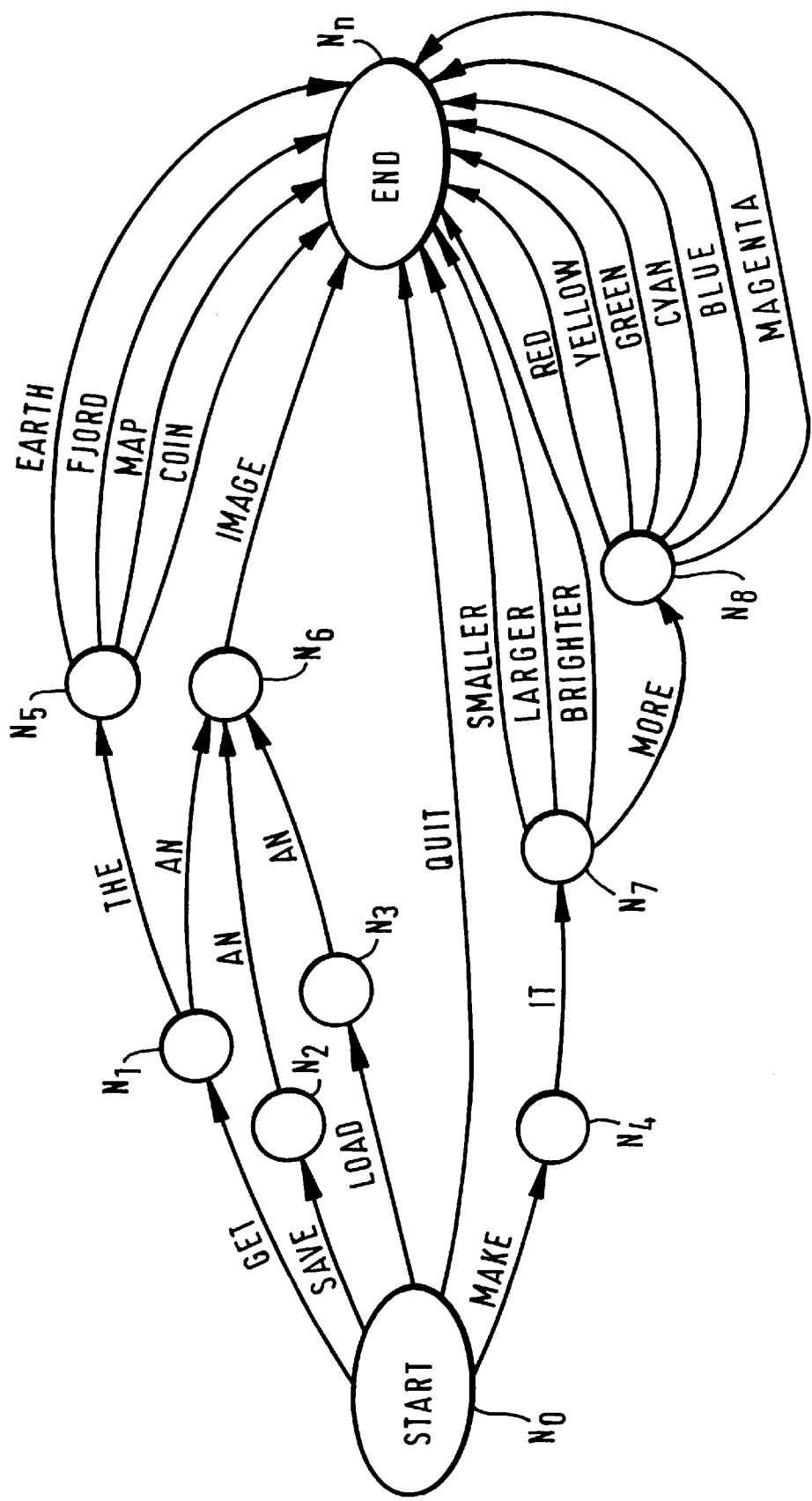
FIG. 17a is a schematic representation of a language model generated during the training process for a number of example input phrases.
Figure 17B:
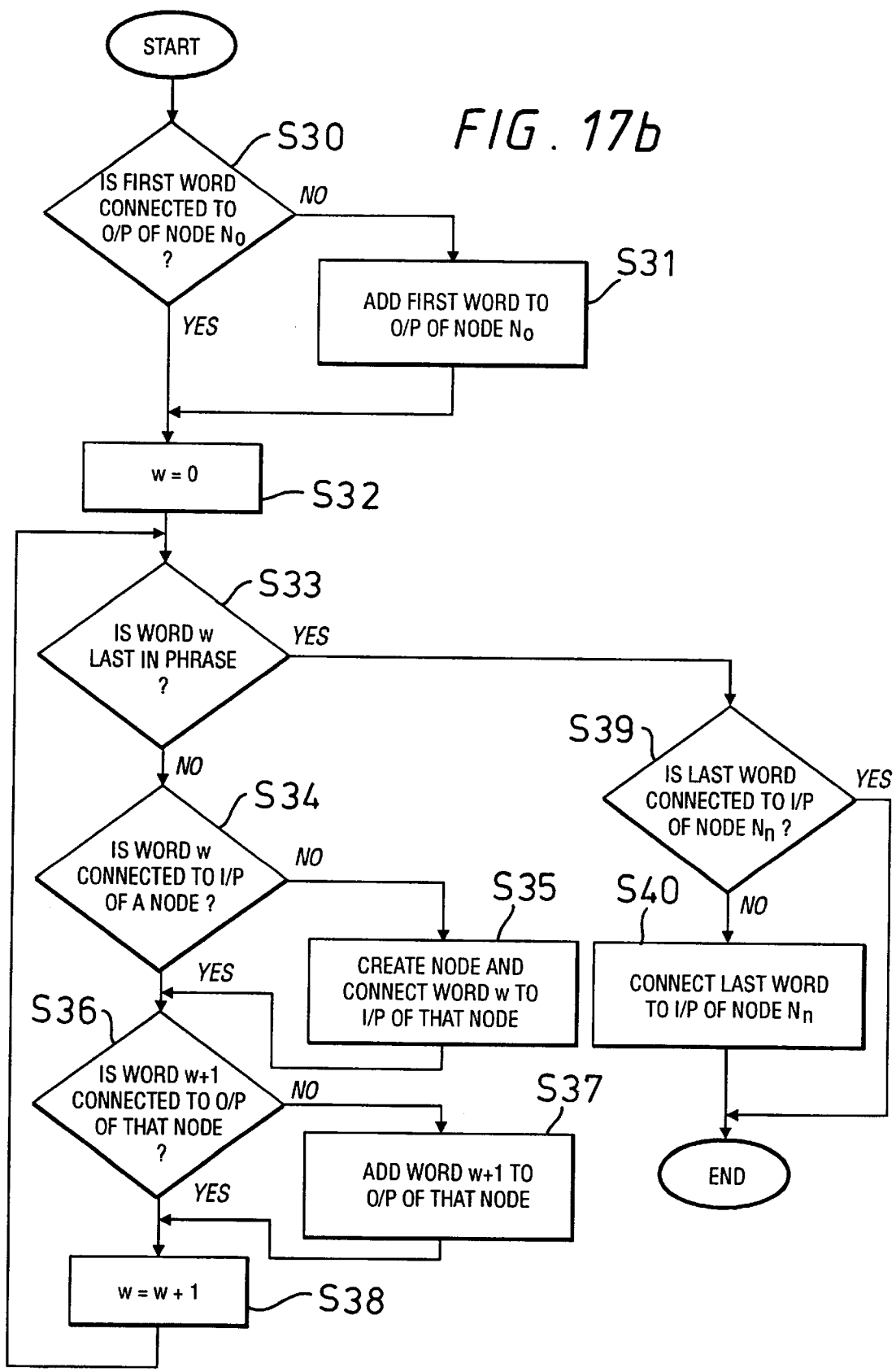
FIG. 17b is a flow chart which illustrates the manner in which the system adds a new phrase to the language model.

Once a reference word model has been created for all the words in a phrase, then that phrase can be added to the language model 21 shown in FIG. 2. In this embodiment, the language model 21 is similar to a Bigram model, and comprises a mesh of interconnected nodes, where the interconnections represent the words known to the system. It does not, however, contain any grammatical rules concerning, for example, correct English language usage. It only constrains which words can follow others based on the phrases known to it. FIG. 17a illustrates the language model 21 derived when the following phrases have been learnt by the system:

get an image—phrase 1
get the earth—phrase 2
get the fjord—phrase 3
get the map—phrase 4
get the coin—phrase 5
save an image—phrase 6
load an image—phrase 7
make it smaller—phrase 8
make it larger—phrase 9
make it brighter—phrase 10
make it more red—phrase 11
make it more yellow—phrase 12
make it more green—phrase 13
make it more cyan—phrase 14
make it more blue—phrase 15
make it more magenta—phrase 16
quit—phrase 17

As shown in FIG. 17a there is a start node $N_0$, an end node $N_n$ and eight intermediate nodes $N_1$ to $N_8$. For an input phrase to be recognised the system must find a path from the start node $N_0$ to the end node $N_n$. The system is, however, reasonably flexible in that once trained and the user inputs the phrase "make smaller" instead of "make it smaller" the system will still recognise the input phrase. The system will not, however, recognise a phrase that is input if that phrase is not known to the system even if the individual words in the phrase are known, i.e. for the language model given above, if the user says "save the image" the system will not recognise this input even though it knows the words "save", "the" and "image".

The language model 21 is created by extracting the necessary word sequence constraints from the text input in step S3 in FIG. 11 and is updated after each new phrase has been input provided there is a word model for each of the words in the phrase. The way in which the language model 21 is updated will now be described with reference to FIG. 17b.

When a new input phrase has been input and a word model for each word in the phrase has been determined, the system identifies in step S30, whether the first word in the phrase is already connected to the output of the start node $N_0$. If it is, then the processing proceeds to step S32. If on the other hand, the first word is not already connected to the output of the start node $N_0$, then a new output from the start node $N_0$ is added, in step S31, for the first word.

The processing then proceeds to step S32 where the system initialises a word loop counter w, which is used to count through all the words in the phrase. The processing then proceeds to step S33 where the system determines whether or not word w is the last word in the phrase. If it is not, then the processing proceeds to step S34 where the system determines whether or not word w is connected to the input of a node (except the end node $N_n$). If it is, then the processing proceeds to step S36 where the system checks to see if the next word w+1 is connected to the output of the node that has word w as an input. If on the other hand, at step S34, the system determines that word w is not connected to the input of any node, then the processing proceeds to step S35 where a new node is created and word w is connected to the input of that new node. The processing then proceeds to step S36 described above.

If the system determines, in step S36, that the next word w+1 is not connected to the output of the node that has word w as an input, then the processing proceeds to step S37 where the next word w+1 is added as an output of that node. If on the other hand the system determines, in step S36, that the next word w+1 is already connected to the output of the node that has word w as an input, then nothing happens and the processing proceeds to step S38 where the word counter w is incremented. The processing then returns to step S33 and a similar procedure is carried out for the next word in the phrase. If the system determines at step S33 that word w is the last word in the phrase, then the processing proceeds to step S39 where the system determines whether or not the last word is already connected to the input of the end node $N_n$. If it is not connected to the input of the end node $N_n$ then the processing proceeds to step S40 where the system connects the last word in the phrase to the input of the end node $N_n$. If the last word is already connected to the last node $N_n$, or once the last word has been connected to the last node $N_n$ in step S40, then the processing is complete and the phrase now forms part of the language model 21.

One feature of the training process is that the system can be taught the phrases individually or it can be taught a number of phrases at once. Further, if a new phrase is input and the system already has word models for some of the words in that phrase, then it only needs to generate word models for the unknown words before it can update the language model 21.

Dynamic Programming (DP)

In the processing performed in steps S21 and S25 of FIG. 14, an alignment procedure was used to align the parameter frames of the phrases with the parameter frames of the words. In order to align the two sequences of parameter frames in an effective manner, the alignment process must be able to compensate for the different rates at which the word is spoken, for example when the word is spoken in isolation and when the word is embedded within the continuously spoken phrase. The dynamic programming (DP) alignment process mentioned above is one way which can match one word onto another in a way which applies the optimum non-linear time-scale distortion to achieve the best match at all points.

Figure 18:
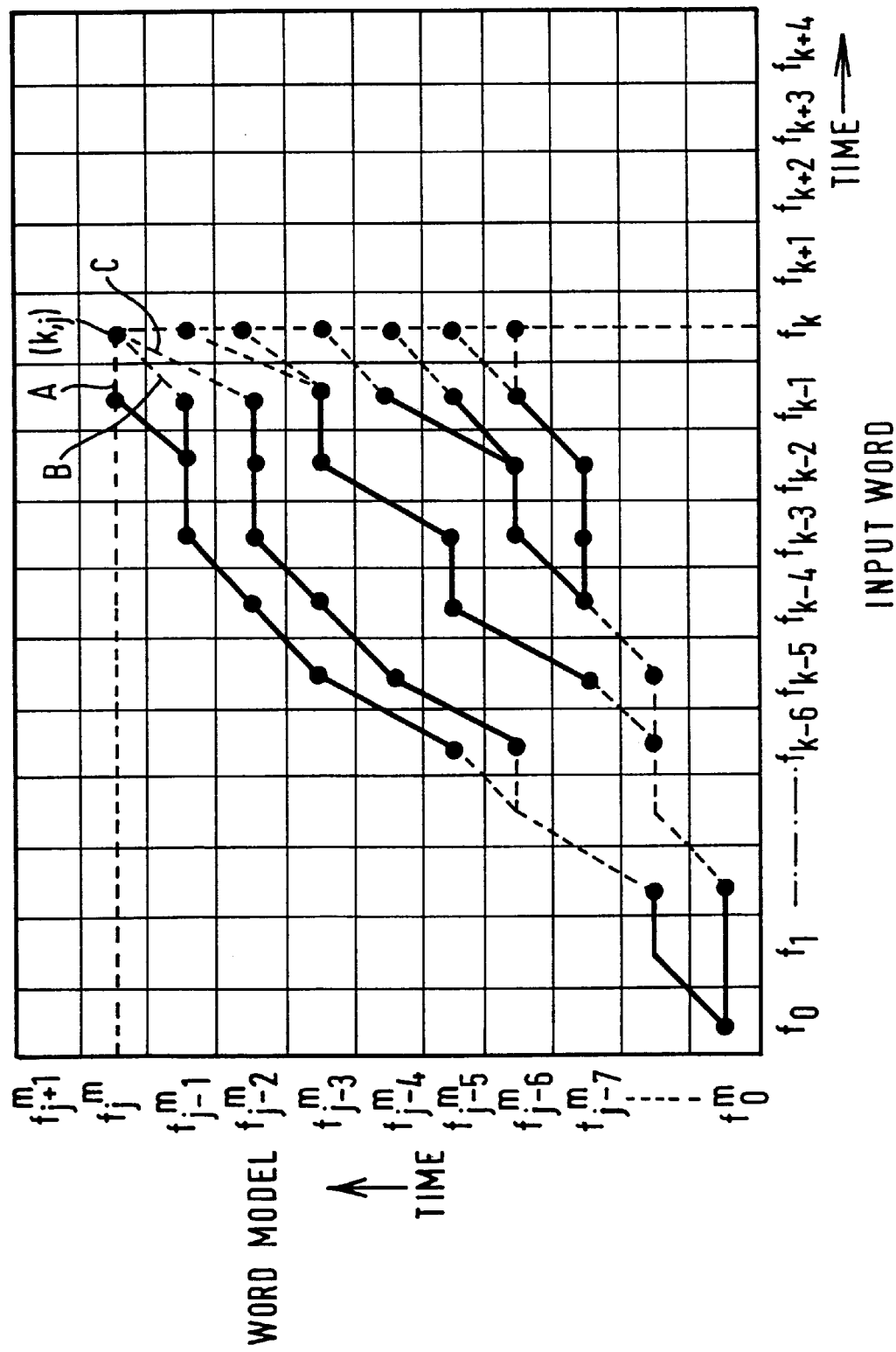
FIG. 18 is a schematic representation of the processing performed when an input word is aligned with a word model using a dynamic processing technique.
Figure 19:
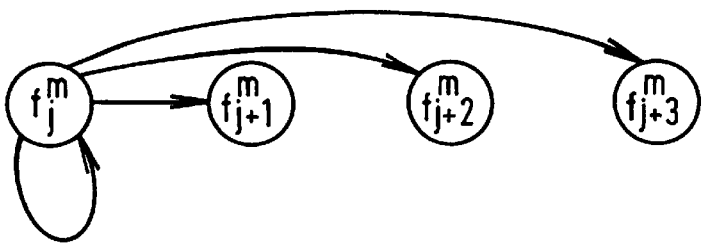
FIG. 19 is a schematic representation of an allowed state transition sequence from one input frame to the next.
Figure 20:
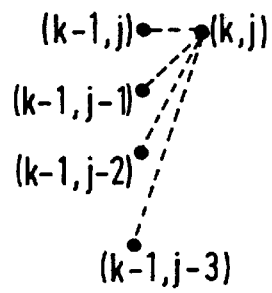
FIG. 20 is an alternate representation of the allowed state transition sequence shown in FIG. 19.

An overview of the DP matching process will now be given with reference to FIGS. 18–20. FIG. 18 shows along the abscissa a sequence of parameter frames representative of an input word, and along the ordinate a sequence of parameter frames representative of a word model. Comparing this example with the processing performed in step S25 in FIG. 14, the sequence of parameter frames representative of the input word may represent part of the sequence of parameter frames corresponding to one of the input phrases, and the sequence of parameter frames representative of the word model may represent the sequence of frames representing one of the chopped words.

To find the total difference between the word model and the input word, it is necessary to find the sum of all distances between the individual pairs of frames along whichever path between the bottom left and top right corners in FIG. 18 that gives the smallest cumulative distance. This definition will ensure that corresponding frames of similar words are correctly aligned. One way of calculating this total distance is to consider all possible paths and add the value of d(k,j) (the distance between frame k and frame j) for each point along each one. The distance measured between the two words is then taken to be the lowest value obtained for the cumulative distance. Although this method gives the correct answer, the number of valid paths becomes so large that the computation is impossible for any practical speech recognition system.

Dynamic programming is a mathematical technique which finds the cumulative distance along the optimum path without having to calculate the distance along all possible paths. The number of paths along which the cumulative distance is determined can be reduced further by placing certain constraints on the DP process. For example, it can be assumed that the optimum path will always go forward with a non-negative slope, otherwise one of the words will be a time reversed version of the other. Another constraint that can be placed on the DP process is to limit the maximum amount of time compression/expansion of the input word relative to the reference word. In this embodiment, this constraint is realised by limiting the number of frames that can be skipped or repeated in the matching process. For example, in FIG. 19 the frame sequence is constrained such that if frame $f_k$ is matched to frame $f_j^m$ then frame $f_{k+1}$ can be matched with frame $f_j^m$, $f_{j+1}^m$, $f_{j+2}^m$ or $f_{j+3}^m$. Therefore, if parameter frame $f_k$ of the input word and parameter frame $f_j^m$ of the word model lie on the optimum path then the above constraint necessitates that the immediately preceding point on the optimum path must be either (k–1,j), (k–1,j–1), (k–1,j–2) or (k–1,j–3), as illustrated in FIG. 20.

FIG. 18 shows the "valid paths" which are propagated up to frame $f_{k-1}$ which represent possible matchings between the input word and the word model. When frame $f_k$ is applied to the recognition unit 17 each valid path has the local distance between current frame $f_k$ and the frame of the word model that is at the end of that valid path added to its cumulative distance. If a number of valid paths meet at the same point then the valid path with the lowest cumulative distance is continued and the others are discarded. For example, in FIG. 18 path SA, B and C meet at point (k,j) and the path (A, B or C) with the lowest cumulative distance is continued whereas the other two are discarded.

Therefore, if D(k,j) is the cumulative distance along a valid path from the beginning of the word to the point (k,j), i.e.:

$$D(k, j) = \sum_{\substack{x,y=1 \\ \text{along a} \\ \text{valid path}}}^{k,j} d(x, y) \tag{5}$$

Then, with the above constraints it follows that:

$$D(k, j) = d(k, j) + \min[D(k-1, j), D(k-1, j-1), D(k-1, j-2), D(k-1, j-3)] \tag{6}$$

With the above constraints, the value of D(0,0) must equal d(0,0), d(1,0), d(2,0) or d(3,0), as all possible paths must begin at one of these points. Therefore, starting from one of the starting points, the value of D(k,j) can be determined via a recursive processing routine. When the routine reaches the end of the words to be matched, the minimum cumulative distance calculated by the DP process represents the score for the best way of matching the two words. If the input utterance to be recognised comprises a sequence of words then backpointers must be used to indicate the direction that has been taken, so that after the DP process identifies the end of the optimum path, it is possible to recognise the input utterance by tracing back through the backpointers.

Although the DP process described above provides a large computational saving compared with the exhaustive search of all possible paths, the remaining computation can be substantial, particularly if each incoming word has to be compared with a large number of word models for matching. Any possible saving in computation which does not significantly affect the accuracy of the recognition result is therefore desirable. One possible computational saving is to prevent paths that are scoring badly from propagating further. This is sometimes known as pruning because the growing paths are like branches of a tree. By pruning the paths in this way, only a narrow band of possible paths are considered which lie on either side of the best path. It will be appreciated that where such pruning is used it can no longer be guaranteed that the dynamic programming process will find the optimum path. However, with a pruning threshold that reduces the average amount of computation by, for example a factor of 5 to 10, the right path will almost always be obtained where the words are fairly similar.

In this embodiment, the recognition block 17 shown in FIG. 2 uses a dynamic programming matching process similar to the one described above, for matching the sequence of parameter frames for the utterance to be recognised with the word models 19 and noise model 23.

Recognition Search

Another feature of the speech recognition system according to this embodiment is the manner in which the dynamic programming process is implemented. In particular, this embodiment makes use of the fact that the minimum calculation performed in equation (6) above, i.e.

$$\min[D(k-1,j), D(k-1,j-1), D(k-1,j-2), D(k-2,j-3)] \quad (7)$$

does not depend upon the current frame $f_k$ being processed. Therefore, this part of equation (6) can be calculated when the previous frame $f_{k-1}$ is being processed.

The manner in which the dynamic programming process is implemented will now be explained with reference to FIGS. 21 to 31.

Figure 21:
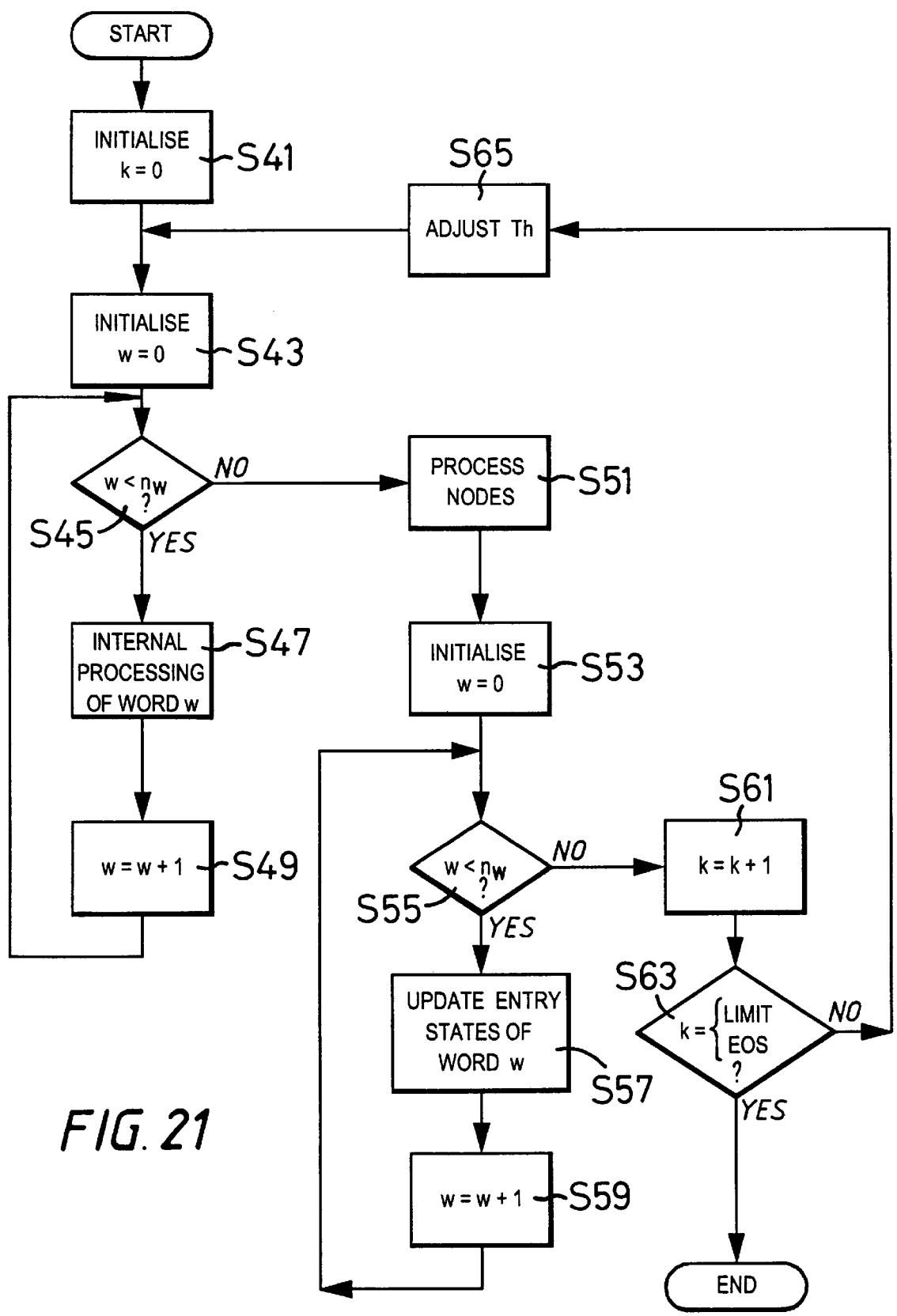
FIG. 21 is a flow chart which illustrates the implementation of the dynamic programming alignment technique used in the first embodiment.

FIG. 21 is a flow chart illustrating the processing performed in the recognition block 17 when an input utterance is to be recognised. The system processes the parameter frames of the input utterance in the sequence that they are generated by the preprocessor 15. For this purpose a frame counter variable k is provided which is initialised to zero in step S41 and is subsequently incremented after each frame is processed in step S61. Each frame being processed is used in step S47 to update the cumulative distances of the remaining valid paths within each word model. For this purpose a word counter w is provided and initialised in step S43 and incremented after step S47 in step S49. In step S45 the system checks to see if all the word models have been processed using the current frame, i.e. it checks to see whether the word counter w is less than the number of words known to the system $n_w$.

Once each word model has been processed using the current frame $f_k$ the processing passes to step S51 where the nodes of the language model 21 shown in FIG. 17a are processed using the current frame. The processing performed in step S51 takes care of the situation where the current parameter frame corresponds to silence at the beginning or end of the input speech or between allowed sequences of words in the input speech. This processing also ensures that the valid paths can only propagate through allowed sequences of words.

After the nodes have been processed in step S51, the cumulative distances for the valid paths which end at one of the beginning or "entry states" of each word model are updated in step S57. This processing is to cope with the situation where the next parameter frame $f_{k+1}$ is matched with the beginning of a word model, when the current parameter frame $f_k$ is matched with the end of another word model. To achieve this, the word counter w is reinitialised to zero in step S53, and the system checks, in step S55, whether all the word models have been processed. The system then updates, in step S57, the cumulative distances for the entry states of the current word model, and the word count w is incremented in step S59. The processing then returns to step S55.

After all the word models have been processed for the current parameter frame $f_k$, the parameter frame counter variable k is incremented in step S61. The system then determines, in step S63, whether there are any more parameter frames of the input utterance to be processed. This is done by comparing k with the system limit (LIMIT) and the end of speech identifier (EOS) in step S63. The system limit is defined by the size of buffer used to store the speech samples output from ADC 63 shown in FIG. 3.

If all the parameter frames of the incoming utterance have been processed, then the DP process is complete and a backtracking algorithm is used to determine the optimum path, and hence the recognition result. If on the other hand, the system determines, at step S63, that there are further parameter frames to be processed, then the system adjusts the pruning threshold in step S65 and the processing returns to step S43. The pruning threshold Th is adjusted in step S67 to limit the number of valid paths that will be processed in steps S47, S51 and S57 when the next input frame is being processed.

Figure 22:
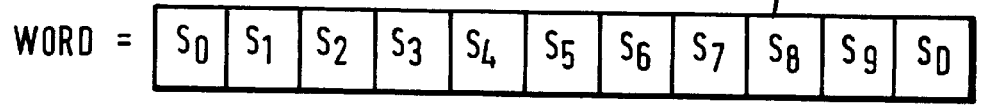
FIG. 22 is a schematic representation of a word model and a current active list and new active list associated therewith.
Figure 22:
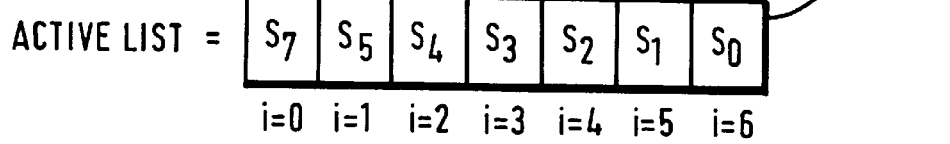
Figure 22:

The processing performed in step S47 of FIG. 21 will now be described in more detail with reference to FIGS. 22 to 26 for a particular example of a word model. In particular, FIG. 22 shows an example word model 201 which comprises a sequence of states $S_0$ to $S_9$ derived during a training session, and an exit state $S_D$ at the end of the word model 201, the purpose of which will be described below.

Each state S of the word model 201 has associated therewith a cumulative distance store D[S] which stores the cumulative distance of a valid path which ends at that state. In this embodiment, the word model 201 also has associated therewith a current active list 203 for the current frame $f_k$ which lists, in descending order, the states in the word model that are at the end of a valid path for the current frame $f_k$. Therefore, each state in the current active list 203 will store the cumulative distance of the valid path that ends at that state. In this particular example, the current active list 203 for the current frame $f_k$ lists states $S_7$, $S_5$, $S_4$, $S_3$, $S_2$, $S_1$ and $S_0$. The states on the current active list 203 will be referred to as active states. In this embodiment, the word model 201 also has associated therewith a new active list 205, which is completed during the processing performed in step S47 and which lists the states in the word model 201 that will be at the end of a valid path for the next frame $f_{k+1}$.

Figure 23:
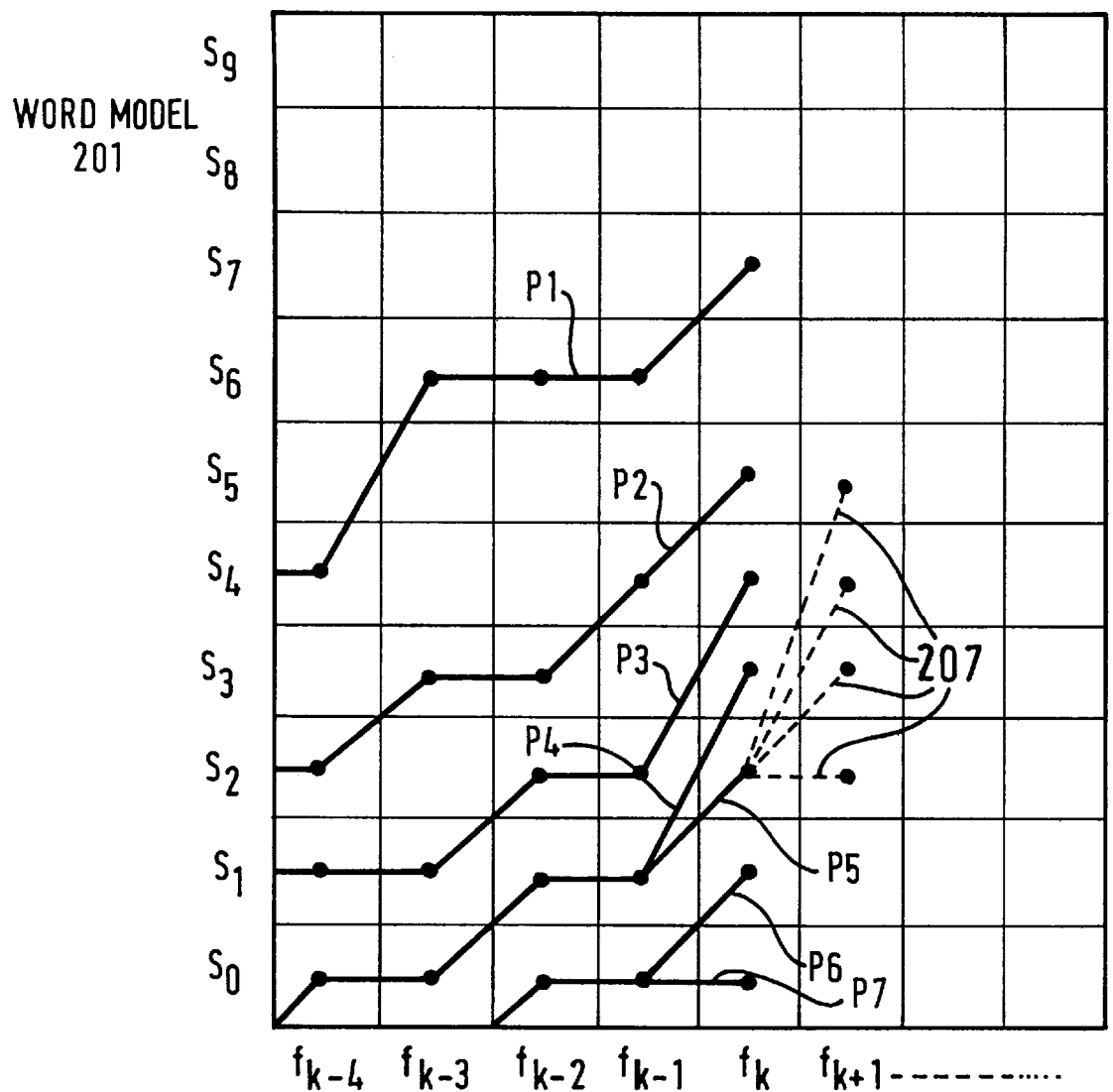
FIG. 23 is a schematic diagram which illustrates a number of example dynamic programming paths propagating within a reference model.

The significance of the current active list 203 and the new active list 205 will now be explained with reference to FIG. 23. In particular, FIG. 23 shows seven valid paths p1 to p7 which represent seven possible matchings between the incoming word and the word model 201 up to the current frame $f_k$. As shown, the seven valid paths p1 to p7 end at word model 201 states $S_7$, $S_5$, $S_4$, $S_3$, $S_2$, $S_1$ and $S_0$ respectively, and it is these end states of the valid paths that are listed, in descending order, in the current active list 203.

To determine the states that are to be in the new active list 205, i.e. to determine the paths remaining for the next input frame $f_{k+1}$, consideration has to be given to the state transitions that are allowed from one input parameter frame to the next.

The maximum amount of time compression of the reference models relative to the incoming utterance is determined by the maximum number of states that can be skipped between adjacent frames of the incoming utterance. In this embodiment, this is set to two, i.e. the DP process follows the state transition diagram shown in FIG. 19. The maximum amount of time expansion of the reference models relative to the incoming utterance is determined by the maximum number of consecutive incoming frames which can be matched to the same state. In this embodiment, only three consecutive frames can be matched to the same state. To monitor for this situation, each state S has associated therewith a self-repetition counter, SELF, which is incremented whenever the same valid path ends at that state from one input frame $f_k$ to the next $f_{k+1}$. Therefore, for example, path p5 may propagate along one or all of the dashed paths 207 shown in FIG. 23. The other paths p1 to p4 and p6 to p7 shown in FIG. 23 will propagate in a similar manner. If two or more paths meet at the same point, then the path having the lowest cumulative distance is maintained and the others are discarded. Further, if the cumulative distance of a path is greater than the pruning threshold then this path will also be discarded. In this way, new paths are continuously being created whilst others are discarded. The aim of the pruning threshold is to limit the number of valid paths that are processed for each input parameter frame, thereby placing a limit on the amount of time and memory required for the algorithm.

Figure 24:
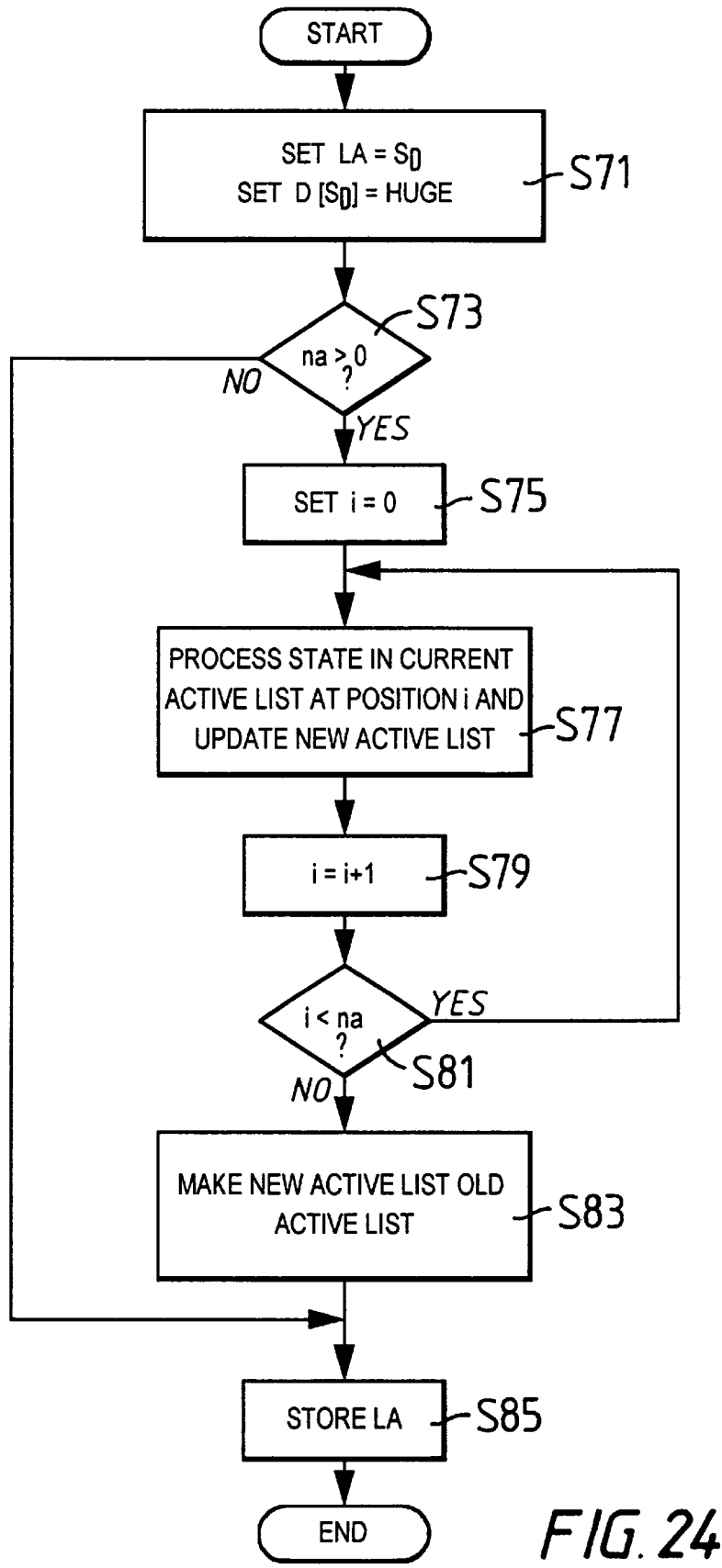
FIG. 24 is a flow chart which illustrates the steps involved in step S47 shown in FIG. 21.

FIG. 24 shows in more detail the processing steps performed in step S47 of FIG. 21. In particular, in step S71 a pointer LA is initialised and the cumulative distance stored in the exit state, i.e. $D[S_D]$, of word model 201 is set to a very large value, HUGE. The pointer LA is used to point to the last active state that has been placed in the new active list 205. Initially, there are no active states in the new active list 205 and so pointer LA is set to point to the exit state $S_D$. In step S73 the system then checks to see if there are any active states in the current active list 203. In other words, a check is made to see if there are any valid paths ending in the current word for the current frame $f_k$. In the present example there are seven active states in the current active list 203 and the system processes each in turn. A count variable i is provided, which is used to count through the active states on the current active list 203, and which is set to zero in step S75 and incremented in step S79 until all the active states in the current active list 203 have been processed. The system determines whether all the active states have been processed by comparing, in step S81, the value of the count variable i with the number $n_a$ of active states in the current active list 203.

Once all the active states on the current active list 203 have been processed, the new active list 205 generated during the processing in step S77 is changed, in step S83, to be the current active list 203 for the next frame $f_{k+1}$ of the input utterance to be processed. In practice this is achieved by swapping the pointers that are used to point to the two active lists. The old current active list then being overwritten during the processing of the next input frame $f_{k+1}$. Finally in step S85 the last state that was activated and put on the new active list 205, indicated by pointer LA, is stored for use in step S57 shown in FIG. 21.

Figure 25:
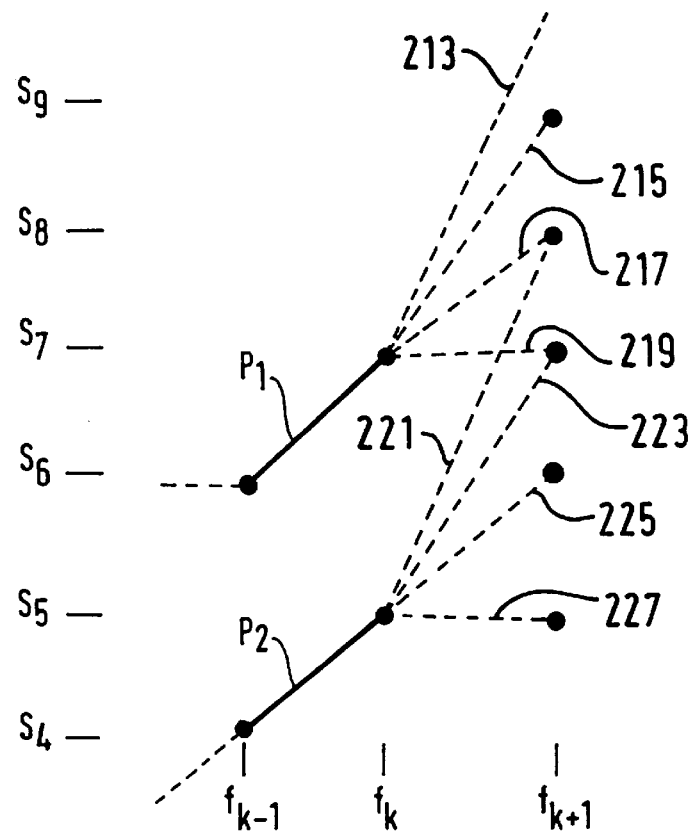
FIG. 25 is a schematic diagram which illustrates the manner in which two of the dynamic programming paths shown in FIG. 23 can propagate from the current input frame to the next.

An overview of the processing performed in step S77 will now be given by taking as examples, active states $S_7$ and $S_5$, which are at the ends of paths p1 and p2 respectively, as shown in FIG. 23. FIG. 25 shows part of the two valid paths p1 and p2 that end at states $S_7$ and $S_5$ respectively at the current frame $f_k$. The dashed lines in FIG. 25 show the ways in which each of the two paths p1 and p2 may propagate at the next frame $f_{k+1}$. As indicated by dashed line 213 it is possible for path p1 to extend into another word at frame $f_{k+1}$. Therefore, the cumulative distance of path p1 (which is stored in active state $S_7$) is copied into the exit state $S_D$. As indicated by dashed lines 215, 217 and 219 path p1 can also propagate to state $S_9$, state $S_8$ and state $S_7$ respectively. Therefore, the cumulative distance of path p1 is also copied into these states. States $S_9$, $S_8$ and $S_7$ are then added, in descending order, to the new active list 205 (but not the exit state which is never actually compared with the incoming frames, and is only used to store the minimum cumulative distance of all the paths that leave the word) and the last active pointer LA is set to point to the last state added (i.e. state $S_7$).

Figure 26A:
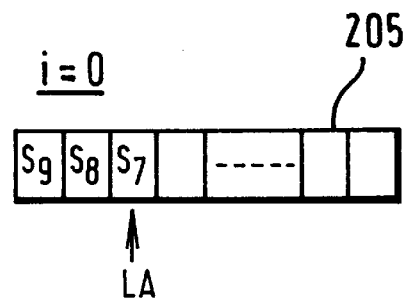
FIG. 26a is a schematic diagram illustrating the contents of the new active list shown in FIG. 22 after the first state in the current active list for the word model shown in FIG. 22 has been processed.

Referring to FIG. 26a, the new active list 205 is shown after the first state $S_7$ on the current active list 203 has been processed. As shown, state $S_9$, state $S_8$ and state $S_7$ are in the first three elements of the new active list 205 respectively, and the last active pointer LA points to state $S_7$.

Referring back to FIG. 25, as indicated by dashed lines 221, 223, 225 and 227 path p2 can propagate to state $S_8$, state $S_7$, state $S_6$ and state $S_5$ respectively. However, the cumulative distance for path p2 is not simply copied into each of these states, since two of the states $S_8$ and $S_7$ already have a cumulative distance stored therein for the next frame $f_{k+1}$. For these two states, a comparison is made between the cumulative distances already stored therein and the cumulative distances associated with path p2, and the smallest is copied into those two states. In other words the cumulative distance stored in $S_8$ and $S_7$ for the paths shown in FIG. 23 and after processing active state $S_5$ is given by $\min(D[S_7], D[S_5])$. On the other hand, the cumulative distance stored in active state $S_5$ can be copied directly into state $S_6$ since a cumulative distance for the next frame $f_{k+1}$ has not previously been stored therein. The two states $S_6$ and $S_5$ (since state $S_5$ has not repeated twice) are then added to the new active list 205 and the last active pointer LA is set to point to state $S_5$.

Figure 26B:
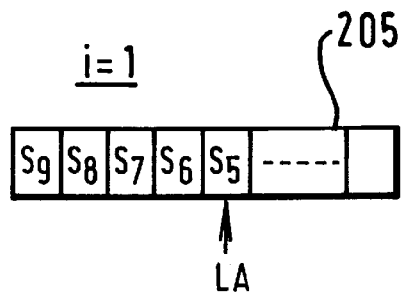
FIG. 26b is a schematic diagram illustrating the contents of the new active list shown in FIG. 22 after the second state in the current active list for the word model shown in FIG. 22 has been processed.

Referring now to FIG. 26b, the new active list 205 is shown after the second active state $S_5$ on the current active list 203 has been processed. As shown, states $S_9$, $S_8$, $S_7$, $S_6$ and $S_5$ are in the first five elements of the new active list 205 respectively, and the last active pointer LA points to state $S_5$. The remaining active states on the current active list 203 are processed in an identical manner and then the processing proceeds to step S49 shown in FIG. 21, where the word count is incremented.

The last active pointer LA is provided so that the system does not have to look at the new active list 205 to identify those states which require a comparison and those that do not. If the state is equal to or beyond the state indicated by the last active pointer LA then a comparison is required, otherwise the cumulative distance can simply be copied into the state.

The processing performed in step S77 shown in FIG. 24 will now be described in more detail with reference to FIGS. 27a and 27b, for the example of the word model 201 shown in FIG. 22. The first active state S to be processed corresponding to i=0 in step S77 is state $S_7$. Therefore, in step S91 of FIG. 27a the system checks to see whether the cumulative distance for the valid path ending at state $S_7$ is less than the pruning threshold Th, i.e. $D[S_7]$ is compared with Th. If D[S₇] is greater than the pruning threshold Th, then this path is discarded and the processing returns to step S79 shown in FIG. 24. If D[S₇] is less than the pruning threshold Th then the processing proceeds to step S92 where the variable ACOUNT, which is used to keep count of the total number of active states processed for the current frame $f_k$, is incremented. Then the system calculates, in step S93, the local distance between the current active state S₇ being processed and the current frame $f_k$ being processed and adds this to the cumulative distance D[S₇].

In the present embodiment, the following Euclidean distance equation is used to derive a measure of the local distance between the current frame $f_k$ and the current active state S:

$$d(S, f_k) = \|S - f_k\|^2 \qquad (8)$$

After the cumulative distance D[S₇] has been updated in step S93, the system checks to see, in step S95, if the valid path which ends at the current active state S₇ can leave the current word at the next input frame $f_{k+1}$. With the above DP constraints this implies determining whether the state three states beyond the current active state S being processed, will be beyond the last state in the word model 201. As the state three states beyond the current active state S₇ is past the last state S₉, a pointer j is set to point to the exit state $S_D$ at the end of word model 201 in step S97. In step S101 the state indicated by pointer j is compared with the state indicated by the last active pointer LA. Since this is the first active state in the current active list 203 to be processed, the last active pointer LA will be pointing to the exit state $S_D$ (see step S71 shown in FIG. 24). Therefore the processing proceeds to step S103 where the cumulative distance stored in the state pointed to by pointer j, i.e. the exit state SD, is compared with the cumulative distance for the valid path p1 ending at the current active state S₇ being processed.

The cumulative distance stored in the exit state, i.e. D[$S_D$], has just been set to the large value, HUGE, in step S71 shown in FIG. 24, and will therefore be larger than the cumulative distance stored in the current active state S₇ being processed. Consequently, the processing proceeds to step S105 where D[S₇] is copied into D[$S_D$]. Next in step S107 the self-repetition count for the state indicated by pointer j, i.e. the exit state $S_D$, is set to zero. Then in step S109 the pointer j is decremented and now points to state S₉, and the processing returns to step S101.

Figure 27A:
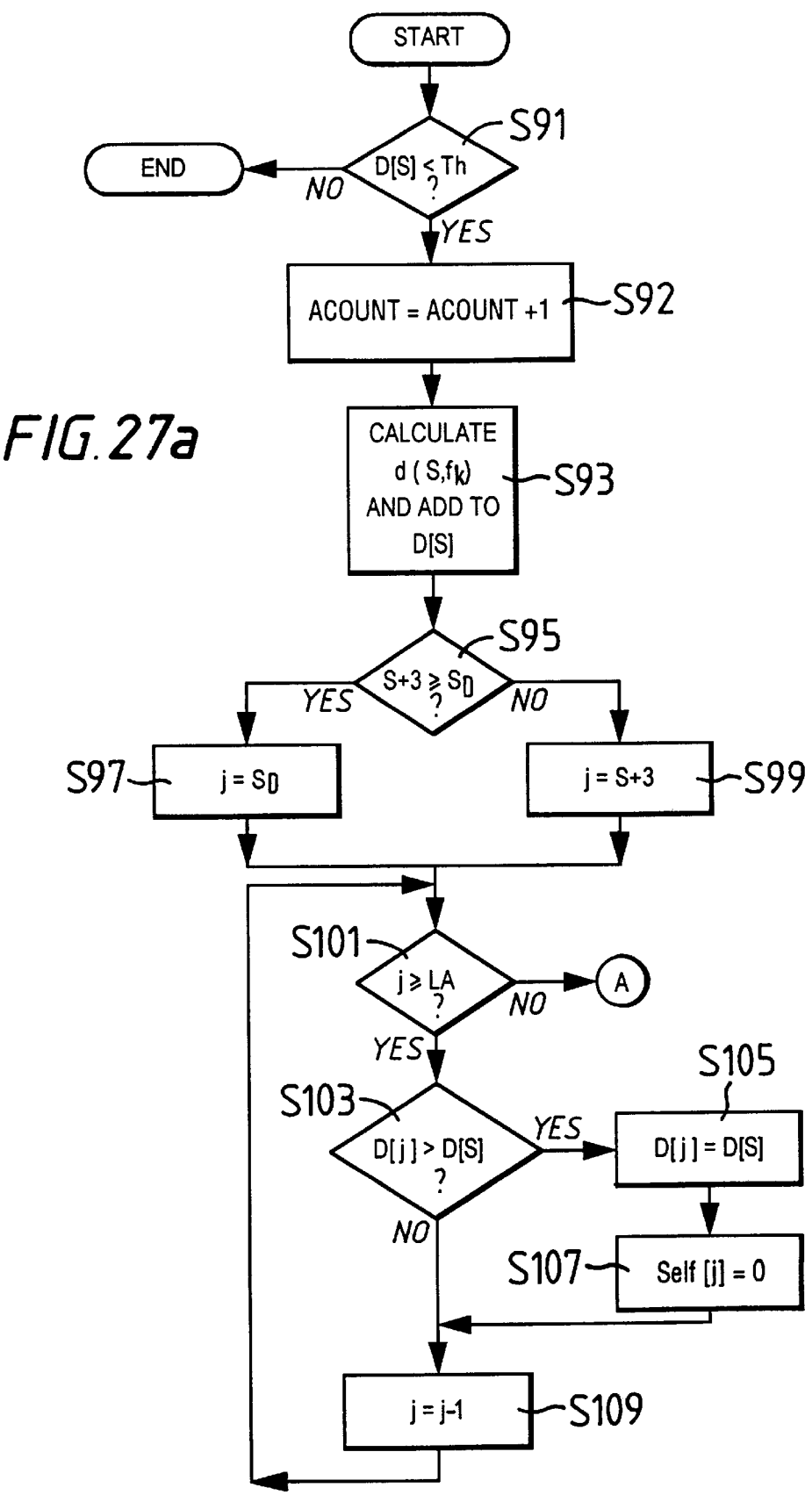
FIG. 27a is a flow chart which illustrates part of the processing performed in step S77 shown in FIG. 24.
Figure 27B:
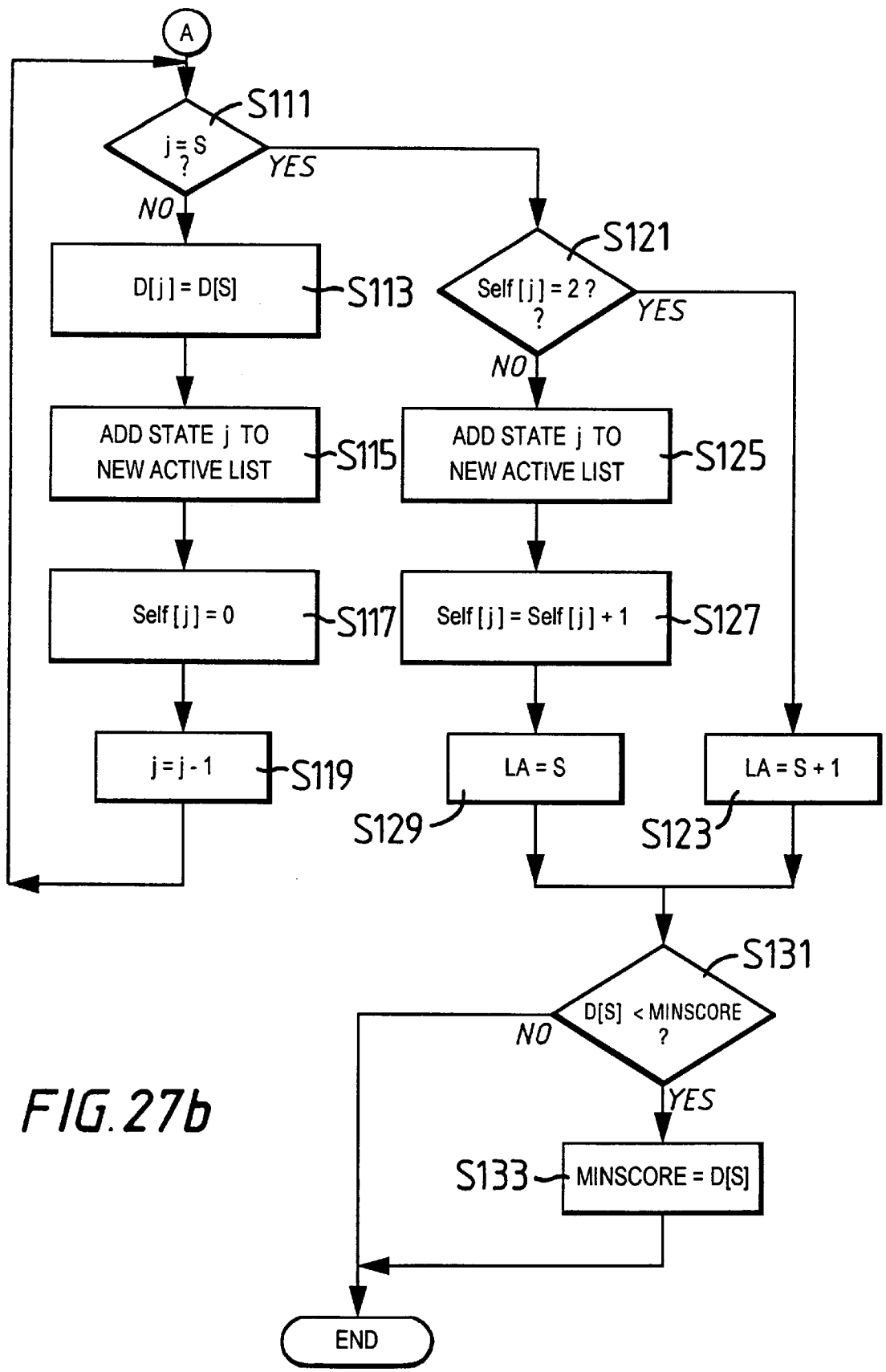
FIG. 27b is a flow chart which illustrates the remaining steps involved in step S77 of FIG. 24.
Figure 28:
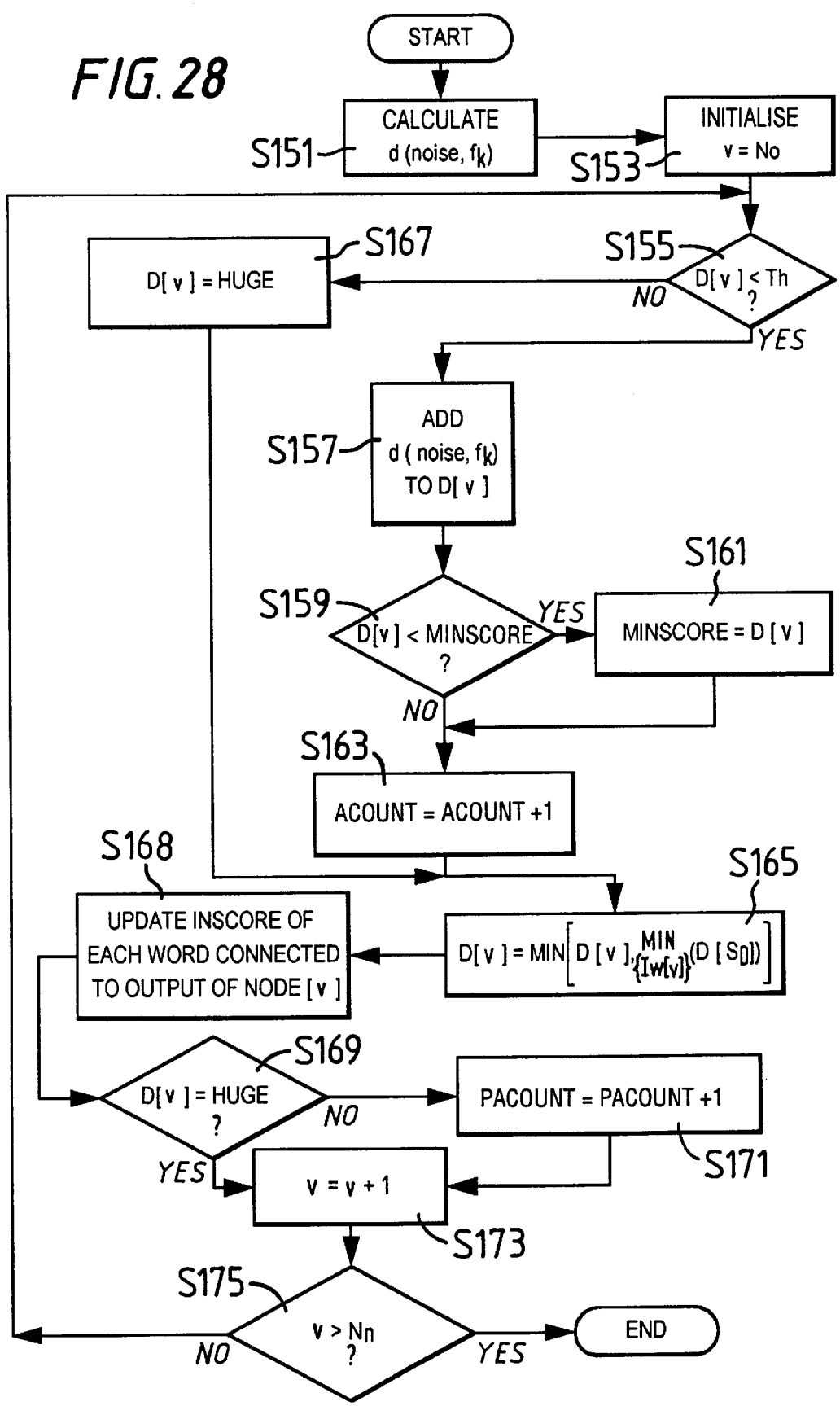
FIG. 28 is a flow chart which illustrates the processing performed in step S51 shown in FIG. 21.

This time the state indicated by pointer j (state S₉)is before the state indicated by the last active pointer LA (state $S_D$) and therefore the processing proceeds to step S111 shown in FIG. 27b. In step S111 the system checks to see if the state pointed to by pointer j, i.e. state S₉, is equal to the current active state S₇ being processed. It is not, therefore, the processing proceeds to step S113 where the cumulative distance stored in state S₉ is made equal to the cumulative distance stored in the current active state S₇. In other words, the cumulative distance of path p1 is copied into state S₉. Then in step S115 state S₉ is added to the new active list 205 shown in FIG. 22. In step S117 the self-repetition counter associated with state S₉ is reset to zero, and in step S119 the pointer j is decremented and now points to state S₈. The processing then returns to step S111 and state S₈ is processed in a similar manner. After state S₈ has been processed in steps S113, S115 and S117, j is decremented in step S119 and now points to state S₇ which is also the current active state being processed. Therefore at this point, the processing proceeds to step S121 where the self-repetition count associated with state S₇ is checked to see if the valid path ending at state S₇ has ended there for the past two frames of the input utterance. If the self-repetition count associated with state S₇ is equal to two, then state S₇ is not added to the new active list 205 and the processing proceeds to step S123 where the last active pointer LA is set to point to the current active state plus one, i.e. to state S₈. This routine ensures that if the self-repetition count associated with the current active state is equal to two, then the valid path which ends at the current active state is prevented from propagating to the same state at the next frame $f_{k+1}$. In the example of the paths shown in FIG. 23, path p1 ending at state S₇ for the current frame $f_k$ came from state S₆ and therefore the self-repetition count will be equal to zero. Consequently, state S₇ is added to the new active list 205 in step S125. The self-repetition count for state S₇ is then incremented in step S127, and the last active pointer LA is set to point to the current active state, i.e. state S₇, in step S129.

After step S129 or step S123 the processing proceeds to step S131 where the cumulative distance stored in the current active state S₇ is compared with the minimum cumulative distance MINSCORE for all of the valid paths, in all the words, that have been processed for the current frame $f_k$. If the cumulative distance stored in state S₇ is less than MINSCORE then MINSCORE is replaced by the cumulative distance stored in state S₇ in step S133, and the processing returns to step S79 shown in FIG. 24. If the cumulative distance stored in MINSCORE is smaller than the cumulative distance associated with the current state S₇, then the processing returns to step S79 shown in FIG. 24. Upon returning to step S79 the count variable i is incremented and the next active state in the current active list 203, i.e. state S₅, is processed in step S77.

Active state S₅ is processed in a similar manner to active state S₇ described above. In particular, provided the cumulative distance of the valid path ending at state S₅ is less than the pruning threshold Th, then in step S93, the system calculates the local distance between the current active state S₅ and the current frame $f_k$ being processed and adds this to the cumulative distance stored in the current active state S₅. Then in step S95 the system determines that the path p2 ending at the current active state S₅ cannot extend into another word at the next frame $f_{k+1}$ due to the above DP constraints. In other words three states beyond state S₅ is not equal to or beyond state $S_D$, and therefore the processing proceeds to step S99 where the pointer j is set to point to state S₅ plus three, i.e. state S₈. The state indicated by pointer j is then compared with the state pointed to by the last active pointer LA in step S101.

Last active pointer LA points to state S₇ and pointer j points to state S₈. Therefore, the processing proceeds to step S103 where the cumulative distance already stored in state S₈ (as a result of the processing of active state S₇) is compared with the cumulative distance stored in active state S₅. If the cumulative distance stored in S₈ is greater than the cumulative distance stored in active state S₅ then it is replaced by the cumulative distance stored in active state S₅. Then the self-repetition counter associated with state S₈ is reset to zero in step S107 and the pointer j is decremented in step S109 so that it now points to state S₇. The processing then returns to step S101 where a similar processing is performed.

This recursive processing routine is performed on all the current active states in all the reference words known to the system.

After processing each word in the above manner for the current frame $f_k$, each node in the language model 21 is processed in turn. As described above the language model 21 determines the sequences of words that are allowable. This information is defined by the nodes and in particular by the words that are connected to the input and output thereof. The processing of the nodes in step S51 of FIG. 21 ensures that valid paths only propagate through allowed sequences of words. The processing performed in step S51 will now be described in more detail with reference to FIG. 28.

Initially, prior to processing any of the nodes the local distance between the frame representative of background noise and the current frame $f_k$ (i.e. d(noise,$f_k$)) is calculated in step S151. Then in step S153 a node pointer v is initialised to point to the start node $N_0$. Then in step S155 the cumulative distance stored in the node pointed to by the node pointer v, i.e. D[v], is compared with the pruning threshold Th. If D[v] is less than the pruning threshold Th then the processing proceeds to step S157 where d(noise,$f_k$) is added to the cumulative distance stored in the current node v being processed. Then in step S159 the system compares D[v] with the value stored in the minimum value store MINSCORE, and copies it into MINSCORE in step S161 if it is smaller. Then the count ACOUNT (which indicates the number of active states and nodes that have been processed for the current frame) is incremented in step S163 and the processing proceeds to step S165. Returning to step S155, if D[v] is greater than the pruning threshold Th then it is set to the large value HUGE in step S167 and the processing proceeds to step S165.

Figure 29:
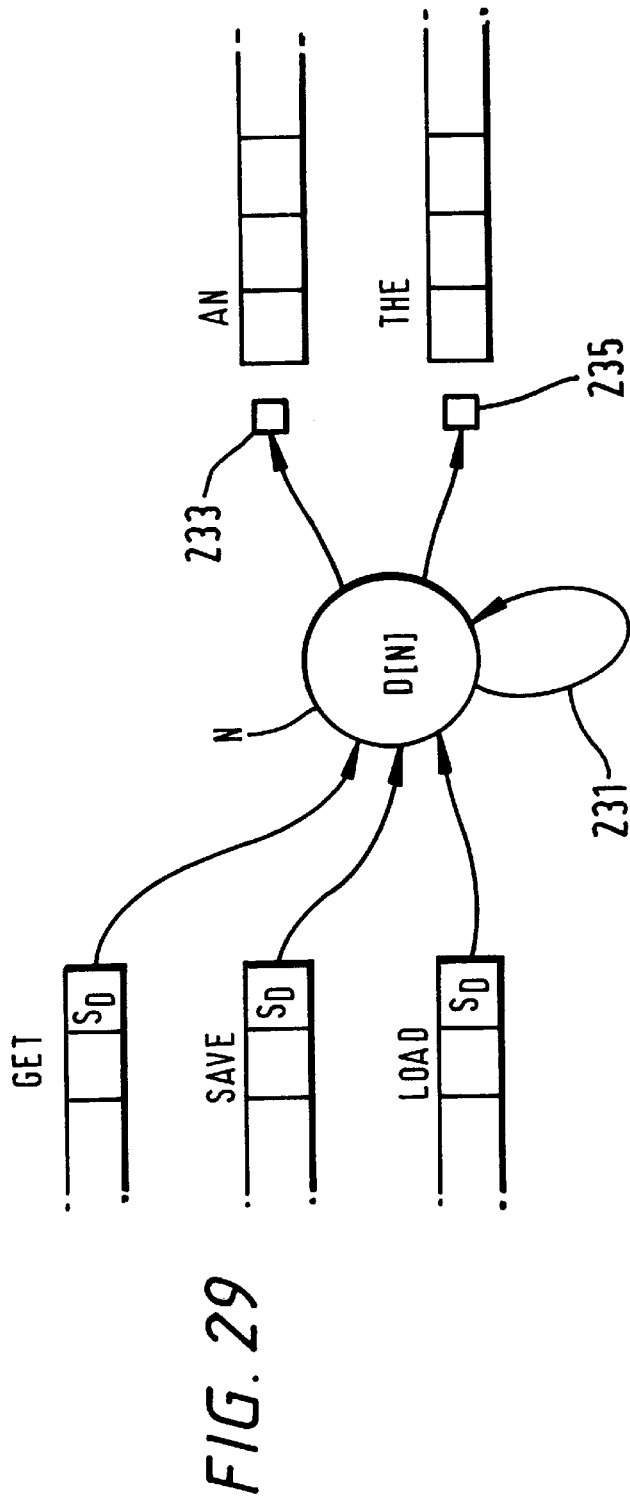
FIG. 29 is a schematic representation of the processing performed to an exemplary node N during the processing illustrated in FIG. 28.

The processing performed in step S165 and step S168 will be explained for the example node N shown in FIG. 29, which has the three words "get", "save" and "load" connected to its input and the words "an" and "the" connected to its output. Although the generation of such a node is not possible using the procedure shown in FIG. 17b, this example is chosen to illustrate that the dynamic programming process will work for more complex language models. In particular, finite state grammars where nodes like the one shown in FIG. 29 are commonplace.

In step S165 the system determines the minimum of all the cumulative distances stored in the exit states for the words connected to the input of node N, i.e. the exit states of words "get", "save" and "load". For the general case, this calculation is represented by:

$$\underset{\{I_w[v]\}}{\text{MIN}} (D[S_D]) \tag{9}$$

where $I_w[v]$ represents all the words connected to the input of node v. After the system has determined this minimum cumulative distance for node N, it is copied into the cumulative distance D[N] stored in node N if it is smaller than the cumulative distance already stored there. In effect, this is a determination of whether there is a valid path coming from one of the words connected to the input of the node which has a smaller cumulative distance than the cumulative distance of the path which is still propagating in the node.

It is possible for valid paths to propagate within the node because it is possible that there are gaps before, between and at the end of the words in the phrase which match with the background noise frame. This possibility of a valid path remaining within a node from one input frame to the next is represented by the arrow 231 shown in FIG. 29, which leaves and returns to node N. Unlike the states of the word models, a path may remain within a node for any number of consecutive input frames. After the system has performed the processing of step S165 the cumulative distance stored in node N is copied, in step S168, into the temporary store INSCORE represented by boxes 233 and 235 for words "an" and "the" respectively, if it is smaller than the value already stored there. A comparison must be made since it is possible that a word may be connected to the output of more than one node, and it is only the path having the minimum cumulative distance that is propagated into the connecting word. The cumulative distance stored in the temporary store INSCORE of a word is used to update the entry states of that word during the processing in step S57 shown in FIG. 21.

The system then checks, in step S169, whether D[v] equals the large value HUGE. If it does, then this indicates that no valid paths will end or pass through the current node v into a word connected to it at the next frame $f_{k+1}$. If D[v] is less than the large value HUGE, then a valid path will either end at the node v or passes through it into a word connected to it, at the next frame $f_{k+1}$. Therefore, the counter PACOUNT, which represents the number of potentially active states (and nodes) at the next input frame $f_{k+1}$, is incremented in step S171 since the silence state associated with that node may be active at the next input frame $f_{k+1}$. The node pointer v is then incremented in step S173 and will now point to the next node in the language model 21. The system then checks to see if all the nodes in the language model 21 have been processed in step S175, by checking to see if the node pointer v indicates a node which is beyond the end node $N_n$ in the language model 21. If the system has not finished processing all the nodes, then the processing returns to step S155, whereas if all the nodes have been processed then the processing returns to step S53 shown in FIG. 21.

Figure 30:
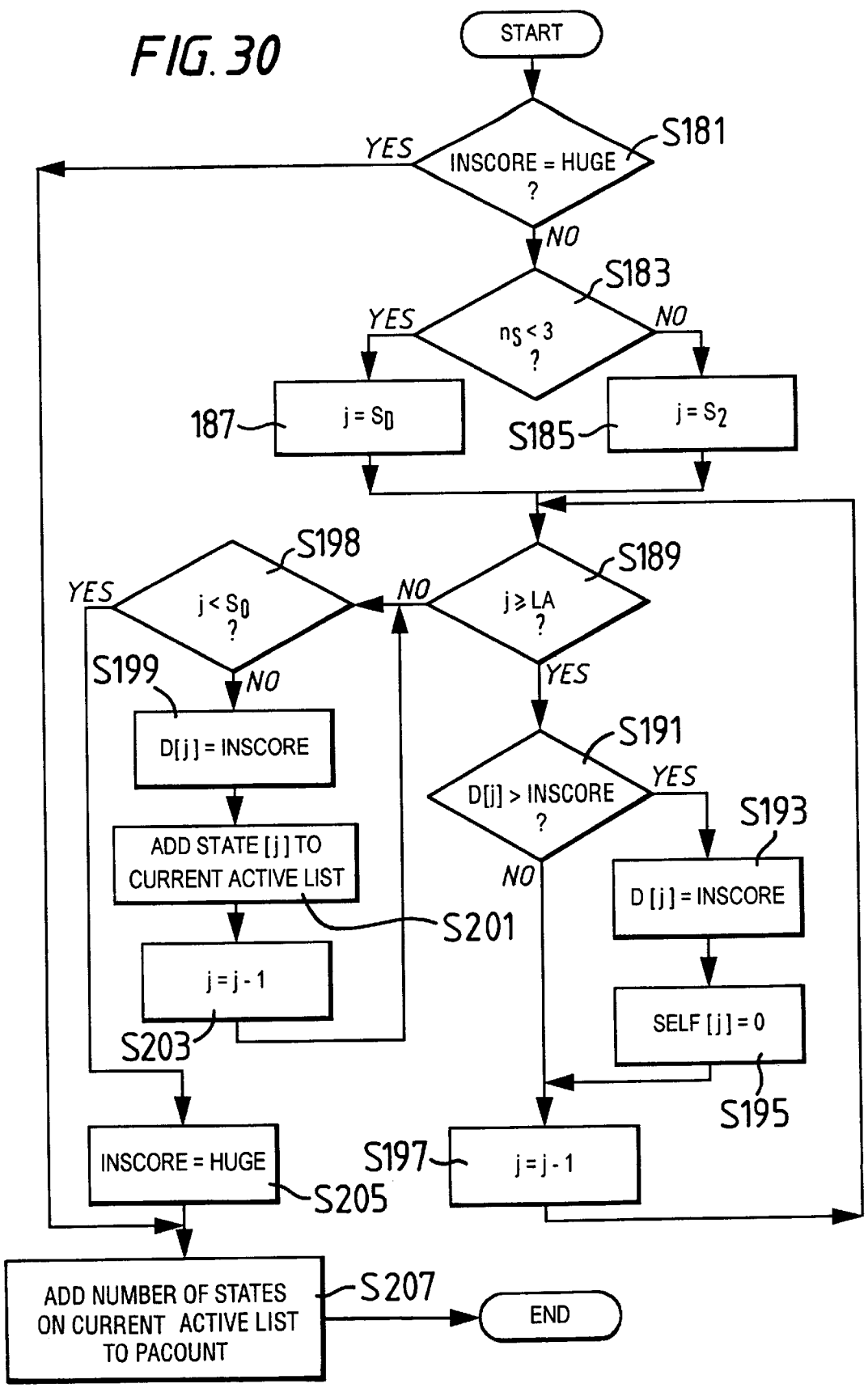
FIG. 30 is a flow chart which illustrates the steps involved in step S57 shown in FIG. 21.

The processing performed in step S57 shown in FIG. 21 will now be described in more detail with reference to FIGS. 30 and 31, for the word model 201 shown in FIG. 22. Referring to FIG. 30, in step S181 the system checks to see if the cumulative distance stored in INSCORE equals the large value HUGE. If it does then this means that no valid paths will be entering this word at the next time point. Therefore, this word does not need to be processed again, so the processing proceeds to step S207 where the number of active states for the next input frame $f_{k+1}$ (which are now stored in the current active list 203 due to step S83 shown in FIG. 24), is added to the count PACOUNT. The processing then returns to step S59 shown in FIG. 21 where the word count is incremented so that the next word model can be processed.

If on the other hand, INSCORE is not equal to the large value HUGE, then this means that a valid path has left a preceding word and may enter the current word being processed. Therefore, the states of the current word model which can be reached by a path extending from another word model (which will be referred to as the entry states) must be updated using the cumulative distance stored in INSCORE. In the present embodiment with the above DP constraints the entry states are states $S_0$, $S_1$ and $S_2$. This updating procedure is achieved in the following manner. Firstly in step S183 the system checks to see if the word model representative of the current word being processed contains more than three states (not including the exit state). If there are more than three states, then the state pointer j is set to point to state $S_2$ in step S185. If on there other hand there are less than three states in the current word, then the state pointer j is set, in step S187, to point to the exit state $S_D$ at the end of the word being processed. After the state pointer j has been set to point to either state $S_D$ or state $S_2$ in steps S187 or S185 respectively, the processing proceeds to step S189 where the state indicated by pointer j is compared with the state indicated by the last active pointer LA.

As with the processing performed in the sequence of steps shown in FIGS. 27a and 27b, if the state indicated by pointer j is beyond the state indicated by the last active pointer LA, then a comparison has to be made between the cumulative distance already stored in that state and the cumulative distance stored in INSCORE.

For the example DP paths shown in FIG. 23, path p7 can propagate to states $S_1$, $S_2$ and $S_3$ at the next frame $f_{k+1}$ but not to state $S_0$, since path p7 has ended at state $S_0$ for the preceding two frames. Therefore, the last active pointer LA will point to state $S_1$.

Figure 31:
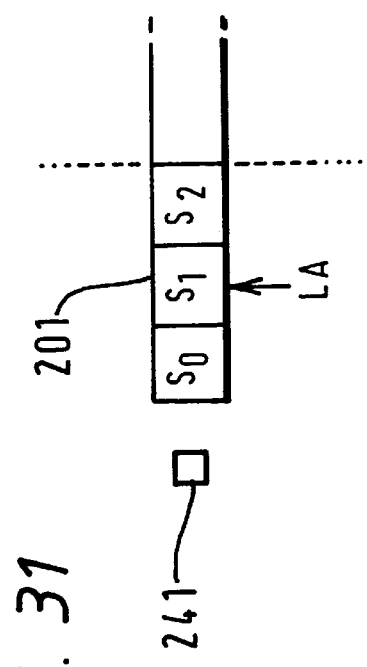
FIG. 31 is a schematic diagram illustrating the entry states of the word model shown in FIG. 22.

FIG. 31 shows the entry states (i.e. the first three states) of the word model 201 shown in FIG. 22. As shown, the last active pointer LA points to state $S_1$. Since there are more than three states in the word model 201 the state pointer j will point to state $S_2$. Therefore, the system will determine, in step S189, that the state indicated by pointer j is beyond the state indicated by the last active pointer LA, i.e. state $S_1$, and therefore, the processing proceeds to step S191. In step S191 the system compares the cumulative distance stored in state $S_2$ with the cumulative distance stored in the temporary store INSCORE associated with word model 201. The store INSCORE, for word model 201, is represented by rectangular box 241 shown in FIG. 31. If the cumulative distance stored in INSCORE is smaller than the cumulative distance stored in state $S_2$, then it is copied into state $S_2$ in step S193. Then in step S195 the self-repetition count for state $S_2$ is reset to zero and the processing proceeds to step S197. If the cumulative distance stored in INSCORE is greater than the cumulative distance stored in state $S_2$, then the cumulative distance stored in state $S_2$ is unchanged and the processing proceeds to step S197 where the pointer j is decremented so that it now points to state $S_0$. The processing then returns to step S189 and the same processing is performed to state $S_1$.

After processing state $S_1$ the pointer j is decremented again in step S197, and will now point to state $S_0$. Therefore, the processing will proceed to step S198 after step S189, where the system checks to see if there are any more states to be processed. Since state $S_0$ is still to be processed, the system proceeds to step S199 where the cumulative distance stored in INSCORE is copied into state $S_0$. No comparison of cumulative distances has to be performed for state $S_0$ as this state is before the last active state pointed to by the last active pointer. The system then adds, in step S201 state $S_0$ to the current active list (which was the new active list 205 prior to step S83 in FIG. 24) and decrements the pointer j so that it now points to state $S_{-1}$. The processing then returns to step S198 where the system determines that there are no more entry states in the current word to be processed. The processing then proceeds to step S205 where the cumulative distance stored in the corresponding temporary store INSCORE is reset to the large value HUGE. The number of states on the current active list is then added, in step S207 to the count PACOUNT and the processing returns to step S59 shown in FIG. 21.

Pruning

Referring to FIG. 21, if in step S63 the system determines that there are more input frames to be processed, then the processing proceeds to step S65 where the pruning threshold Th is adjusted. The aim of using pruning is to limit the number of DP paths that propagate from one time point to the next. In particular, the present embodiment aims to adjust the pruning threshold so that the number of active states that are actually processed remains essentially bounded within predefined limits, which are dictated by the amount of working memory and processing time available. Furthermore, the present embodiment also aims to achieve this without the need for expensive computational overheads. In this embodiment, the pruning threshold is determined by adding a variable differential value (PRUNING) to the overall minimum cumulative score MINSCORE determined for the input frame just processed, i.e. the pruning threshold is given by:

$$Th = MINSCORE + PRUNING \tag{10}$$

Figure 32:
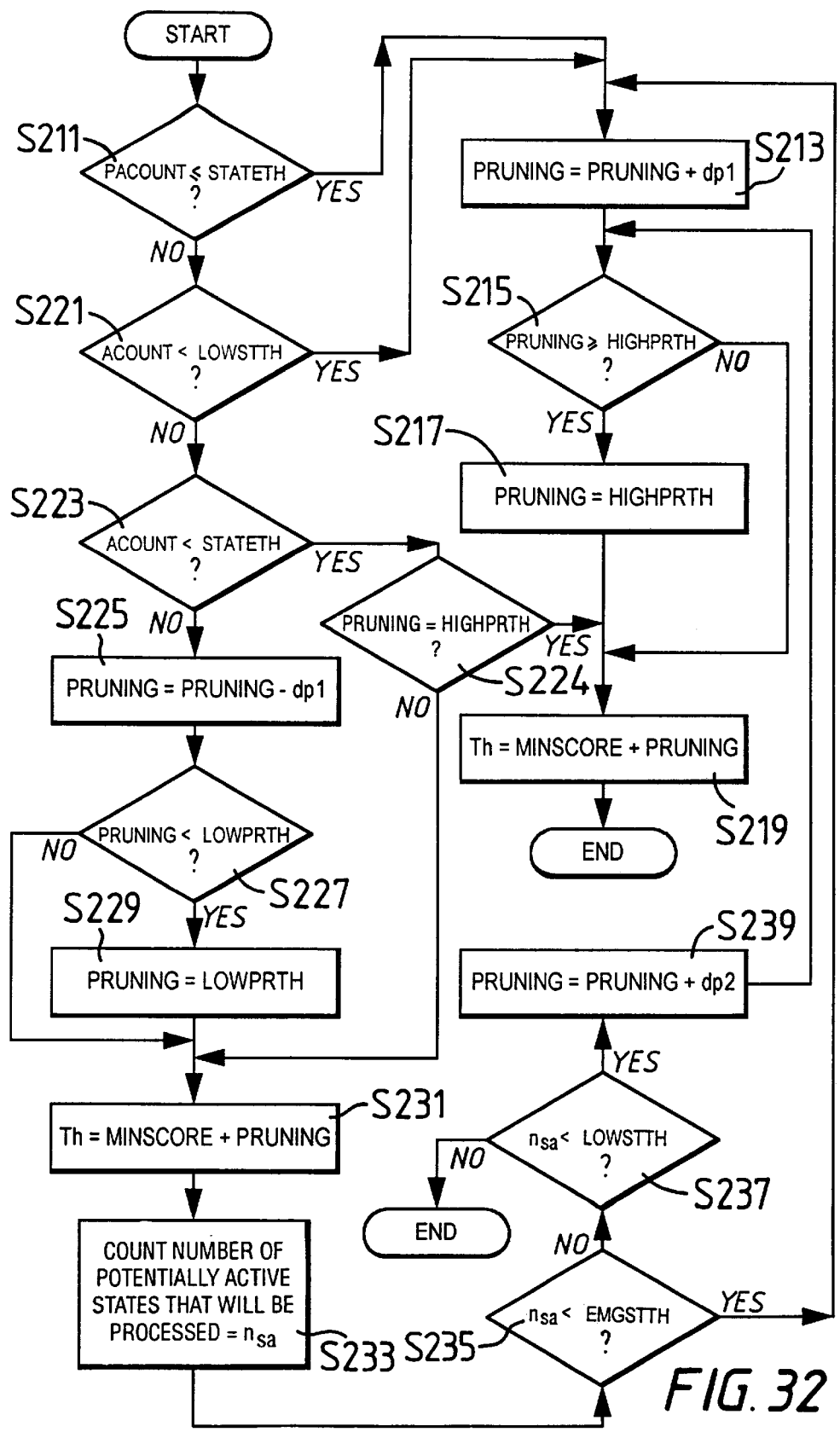
FIG. 32 is a flow chart which illustrates the steps performed in step S65 shown in FIG. 21.

One way of ensuring that only a set number of active states are processed for each input frame is to sort the active states that are on all the active lists for the input frame about to be processed in order of increasing cumulative distances stored therein, and then only processing the desired number beginning with the one with the lowest cumulative distance. However, this technique requires a large amount of computational time to sort out the active states. Rather than performing this computationally expensive sorting, the technique employed in the present embodiment makes use of the information available after processing the last input frame. In particular, in this embodiment a differential value (PRUNING) is varied in dependence upon the number of states that are potentially active (which is stored in PACOUNT) for the next input frame to be processed, in order to maintain the number of states that will actually be processed, to be between two thresholds. The manner in which the pruning threshold Th is adjusted will now be described in more detail with reference to FIG. 32.

In step S211 the system compares the number of states that are potentially active for the next frame to be processed (which is stored in PACOUNT) with a state threshold (STATETH), which is set to be less than but close to an absolute maximum state threshold determined by the amount of working memory available. If the value stored in PACOUNT is less than STATETH then this means that all the potentially active states can be processed, and therefore, the differential value PRUNING used at the last time point can be increased. Therefore, in step S213 an adjustment constant dpi is added to the existing differential value, PRUNING. The value of dP1 is set to be larger than any reasonable local distance, so that most, if not all, of the potentially active states will be processed.

The value stored in PRUNING is then compared with a high pruning threshold, HIGHPRTH in step S215. An upper limit is placed on the differential value PRUNING as it is assumed that there is a maximum differential value above which there is never any need to go. If the value stored in PRUNING is less than HIGHPRTH then the processing proceeds to step S219. If the value stored in PRUNING is greater than HIGHPRTH then PRUNING is set to equal HIGHPRTH in step S217. After step S215 or step S217 the system sets the pruning threshold Th to equal the minimum cumulative distance of all the remaining valid paths, i.e. MINSCORE, plus the differential value PRUNING. The processing then returns to step S43 shown in FIG. 21.

If at step S211 the system determines that the number of potentially active states, PACOUNT, for the next frame is greater than STATETH, then the system compares, in step S221, the number of states that were active and processed during the processing of the last input frame (which is stored in ACOUNT) with a low state threshold, LOWSTTH. The value of LOWSTTH is set to try and ensure that if ACOUNT is less than LOWSTTH, then it will be possible to process all the potentially active states for the next input frame without taking too much time or memory. Therefore, if ACOUNT is less than LOWSTTH, then the processing passes from step S221 to step S213 where the differential value PRUNING is adjusted and the processing proceeds as described above. If, on the other hand, ACOUNT is greater than LOWSTTH then there is no guarantee that if all the potentially active states are processed then this will not take too much time or memory to process. Therefore, it may be necessary to reduce the differential value PRUNING.

In order to determine whether the differential value PRUNING needs to be reduced, the system compares ACOUNT with STATETH in step S223. If ACOUNT is less than STATETH then the system checks to see if the differential value PRUNING is equal to HIGHPRTH. If it does equal HIGHPRTH then this indicates that the system has been trying to process all the active states, and that therefore, it is unlikely that the number of active states that will be processed for the next input frame will result in the process taking too long or too much memory. Therefore, the differential value PRUNING is not changed and the processing passes to step S219 where the pruning threshold is set to equal MINSCORE plus the differential value PRUNING. If on the other hand, the differential value PRUNING is not equal to HIGHPRTH (in which case it must be less than it), then it is possible that the number of active states that will be processed for the next input frame will take too long or too much memory. Therefore, the actual number of active states that will be processed must be calculated. This is performed in step S233 using the pruning threshold set in step S231 which uses an unchanged differential value PRUNING.

Returning to step S223, if the system determines that ACOUNT is greater than STATETH then the differential value PRUNING is reduced by the adjustment constant dp1 in step S225. After the differential value PRUNING has been decreased in step S225, the system determines in step S227 whether the differential value PRUNING is less than a low pruning threshold, LOWPRTH. A low pruning threshold is used to ensure that the number of active states that will be processed for the next input frame, will be greater than a set emergency state threshold, EMGSTTH. The reason for this is that it has been found that the dynamic programming process fails if it is pruned too heavily. If the differential value PRUNING is less than the low pruning threshold LOWPRTH, then it is made equal to LOWPRTH in step S229, and the pruning threshold Th is set, in step S231, to equal MINSCORE plus the adjusted differential value PRUNING. Subsequently, in step S233 the system counts the number of active states that will be processed for the next input frame. This is achieved by comparing the cumulative distances stored in all the active states and the cumulative distances stored in all the nodes with the newly determined pruning threshold Th.

This total number ($n_{sa}$) represents the total number of active states and nodes that will be processed for the next input frame. If this total number nsa is less than the emergency state threshold, EMGSTTH, then the pruning threshold has been set too low and the processing returns to step S213 where the differential value PRUNING is increased and the pruning threshold Th is reset. If nsa is not less than EMGSTTH then it is compared with LOWSTTH in step S237. If nsa is greater than LOWSTTH then this implies that the pruning threshold Th set in step S231 is acceptable and the processing returns to step S43 shown in FIG. 21. If on the other hand, $n_{sa}$ is less than LOWSTTH, then the pruning threshold can be increased, and so a second adjustment constant dp2 is added to the differential value PRUNING in step S239, prior to the pruning threshold Th being reset in step S219. In this embodiment the second adjustment constant dp2 is set to equal half the adjustment constant dp1.

As those skilled in the art will realise, the above method of varying the pruning threshold is not computationally expensive, yet it allows the pruning threshold to be adjusted in such a manner that the number of active states that are processed at each time point is bounded, so that the allocated processing time and memory are not exceeded.

After all the frames in the input sequence have been processed using the sequence of processing steps illustrated in FIG. 21 a backtracking routine is required to determine the exact path taken by the optimum path determined by the dynamic programming process. In this embodiment the backtracking routine traces through backpointers which indicate the sequence of words through which each path propagates. The details of the way in which the backtracking routine is performed, and the way in which the pointers are generated are well known to those skilled in the art of speech processing, and will not be described further.

Initialisation

Before the system attempts to recognise an input utterance, the system thresholds and variables which are used during the recognition process must be initialised. This is achieved in the following manner. Firstly the cumulative distance stored in the start node $N_0$ is set to zero and the cumulative distance stored in all the other nodes is set to equal the large value, HUGE. Then the counter which counts the number of potentially active states, PACOUNT, associated with each word model is set to zero; the last active pointer associated with each word model is set to point to the end state $S_D$ of that model; and the temporary store INSCORE associated with each word model is set to the large value, HUGE. All the nodes are then processed so that the minimum of the cumulative distances of all the nodes connected to the input of a word is, copied into the temporary store INSCORE associated with that word. This ensures that the temporary store INSCORE of each word connected to the start node $N_0$ is set to zero. Finally, the value stored in INSCORE of each word is used to activate and initialise the entry states of each word model. The processing steps to initialise the entry states of each word model are identical to the processing steps used to update the entry states described above with reference to FIG. 30. The pruning threshold and the differential value PRUNING are also initialised prior to the processing of the first input frame. In particular, the pruning threshold Th is set to the large value, HUGE, and the differential value PRUNING is set to equal the high pruning threshold, HIGHPRTH.

Flexible dynamic programming alignment

A brief description is given above with reference to FIGS. 13 to 16, of the way in which the word models are generated in this embodiment. In particular, isolated word models are first generated for the words contained in a phrase by aligning the sequence of parameter frames corresponding to the phrase with the sequences of parameter frames corresponding to the words when spoken in isolation contained within the phrase, using a flexible dynamic programming alignment process. This flexible alignment process will now be described in more detail for the training phrase "get an image", when no word model for the words in the phrase exists yet.

Figure 33:
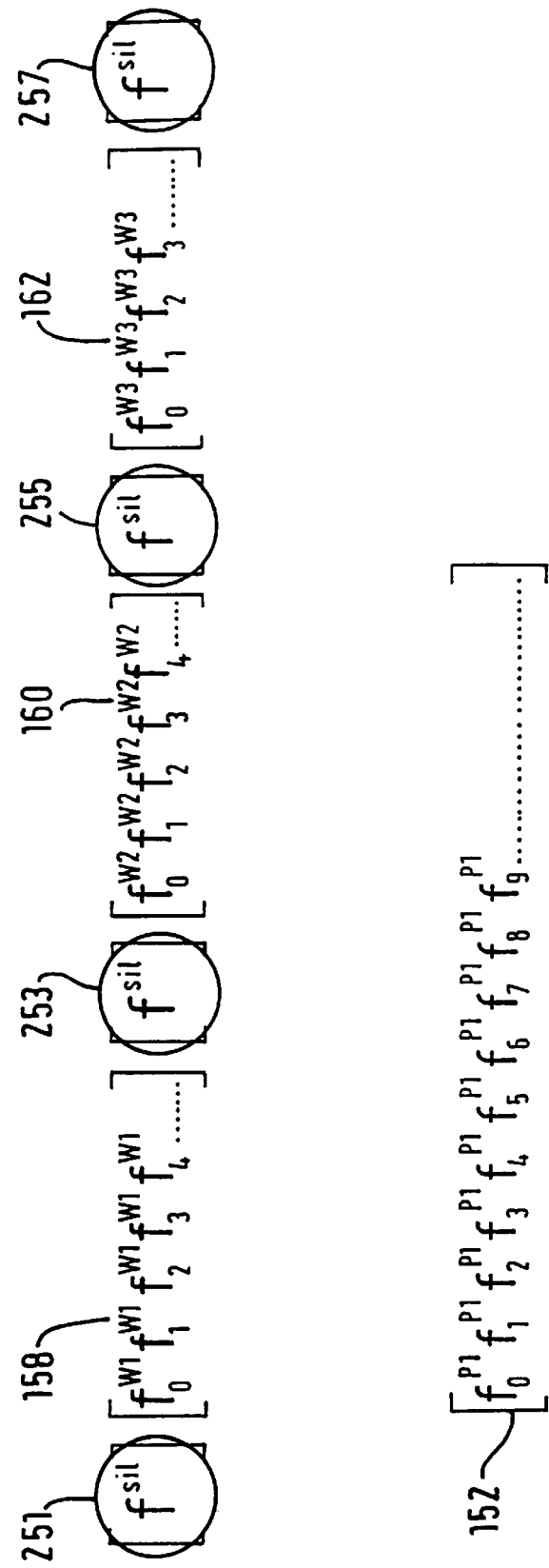
FIG. 33 is a schematic representation of the sequence of parameter frames for an input phrase together with the sequences of parameter frames for the words contained within the input phrase when spoken in isolation.

FIG. 33 shows the sequence of parameter frames 152 which corresponds to the utterance of the phrase "get an image" and the sequences of parameter frames 158,160 and 162 corresponding to the utterances of the isolated words "get", "an" and "image" respectively. Since some of the parameter frames in the sequence of parameter frames 152 will correspond to background noise or silence, nodes 251, 253, 255, 257 are provided between the isolated words and at the beginning of the first word and at the end of the last word contained in the phrase. These nodes act in a similar manner to the nodes in the language model shown in FIG.

17a, and take care of the situation where a current parameter frame of the sequence of parameter frames 152 being processed, corresponds to silence or background noise. This possibility is illustrated in FIG. 33 by the silence frame $f^{si1}$ (which is the noise model 23 shown in FIG. 10) at nodes 251, 253, 255 and 257.

Although some of the frames at the beginning and at the end of the sequences of parameters frames 158,160 and 162 will correspond to silence or background noise, the parameter frames in the sequence of parameter frames 152 which correspond to silence or background noise should match better with the silence frame $f^{si1}$ stored in the nodes 251, 252, 255 and 257 than the frames corresponding to silence in sequences 158, 160 and 162. This is because the silence frame $f^{si1}$ represents an average of all silence frames, and therefore on average, the variation between the frames in sequence 152 corresponding to silence and the silence frame $f^{si1}$ should be less than the variation between the frames corresponding to silence in sequence 152 and those corresponding to silence in sequences 158, 160 and 162.

The way in which the flexible alignment process is carried out is similar to the way in which the input speech is aligned with the stored reference models, as described above with reference to FIGS. 18 to 32. In particular, the general processing steps of the flexible alignment process follow those shown in FIG. 21, using the sequences of parameter frames 158, 160 and 162 as reference models, the nodes 251, 253, 255 and 257 and the frames of sequence 152 as input frames. In order to avoid confusion, the parameter frames of the sequences 158, 160 and 162 representing the words when spoken in isolation will be referred to as states. Like the states of the reference models used during recognition of an unknown input utterance, these states have an associated cumulative distance store for storing the cumulative distance of the dynamic programming path which ends at that state for the current frame of the sequence 152 being processed.

The main difference between the flexible alignment process and the alignment process used during recognition of an unknown input utterance is that with the flexible alignment:

(i) each dynamic programming path can enter a word at any position (and not only in one of the entry states); and (ii) each dynamic programming path can exit a word from any state therein.

The way in which the flexible alignment process operates for the above example will now be explained by considering the first few parameter frames of the sequence of parameter frames 152. Before processing the first frame, however, the cumulative distance scores associated with the nodes and the states in the word models are initialised. This initialisation procedure is similar to the initialisation procedure performed prior to attempting to recognise an unknown input utterance, as described above. In particular, the cumulative distance stored in the start node, ie. node 151, is set to zero and the cumulative distance stored in all the other nodes is set equal the large value, HUGE. The cumulative distance scores of the states in words W1, W2 and W3 are then updated using the cumulative distance scores stored in the nodes connected to the input of the words. This will ensure that a dynamic programming path can be started at each state of the first word W1 and at the first node 151 when the frame $f_0^{P1}$ is processed.

After initialisation, the first frame $f_0^{P1}$ is processed with respect to each word W1, W2 and W3 in turn. However, since the cumulative distance associated with the states in words W2 and W3 will have the value, HUGE, the first frame will only be processed with respect to the states in the first word W1. When processing the first frame with respect to word W1, the distance between frame $f_0^{P1}$ and each state in word W1 is stored in the respective cumulative distance store associated with that state. The flexible alignment process then processes the nodes 251, 253, 255 and 257 in turn, using the processing steps shown in FIG. 28. Finally, the processing of the first frame $f_0^{P1}$ is completed by updating the cumulative distance scores of the states in words W1, W2 and W3 using the results of the node processing. The updating procedure is similar to that shown in FIG. 30 except all the states in the words are updated and not just the entry states (ie. the first three states).

Once the first parameter frame of sequence 152 has been processed, the second parameter frame $f_1^{P1}$ is processed in order to propagate the dynamic programming paths started by the processing of the first parameter frame $f_0^{P1}$. As with the dynamic programming method used during recognition of an input utterance, the states in each word W1, W2 and W3 are processed in reverse sequential order, using in this embodiment similar propagation constraints as those described with reference to FIGS. 19 and 20. The only difference is that each dynamic programming path is also allowed to exit a current word from any of its states, and not just from the last three states as is the case during recognition of an unknown input utterance. Once the words W1, W2 and W3 have been processed using the second parameter frame $f_1^{P1}$, the nodes 251, 253, 255 and 257 are processed in order to update the dynamic programming path which is currently propagating within each node. Once this had been done, each of the words W1, W2 and W3 is processed again in order to update the dynamic programming paths in order to take into account the results of the node processing.

The remaining parameter frames in the sequence of parameter frames 152 are then processed in turn in a similar manner. Once all the parameter frames in the sequence 152 have been processed, the dynamic programming path with the lowest cumulative score is determined. In order to identify the beginning and end frames within the sequences of parameter frames 158, 160 and 162 which bound those parameter frames which represent the corresponding words (and not silence), a record is made of the progress of each dynamic programming path during the flexible alignment process.

In particular, whenever a dynamic programming path enters a word, either from a preceding word or from the node in front of the word, the state into which that dynamic programming path enters is recorded and associated with that path. Similarly, when a dynamic programming path exits a word then the state from which it exits is recorded, provided the score associated with that path is lower than the score associated with all previous dynamic programming paths which have exited from that word. Therefore, once the last parameter frame in the sequence of parameter frames 152 has been processed and the dynamic programming path having the best score is identified, approximate beginning and end points of the words within the sequence of parameter frames 158, 160 and 162 can be identified by looking at the record associated with the identified dynamic programming path.

As those skilled in the art will appreciate, the above description of the flexible alignment process is particular to the situation where no word model exists for each word contained in the input phrase. However, since the training of the reference models is designed to be incremental in nature, ie. such that the user can train the system at his convenience, the situation will sometimes arise that a word model for a word in an input phrase will already exist. In this case, during the alignment between the phrase and the individual words, a hybrid type dynamic programming alignment process is employed which uses a standard type dynamic programming alignment process for words that already have a word model, and a flexible dynamic programming alignment process for the other words which do not yet have a word model.

As mentioned above with reference to steps S25 and S26 in FIG. 14, once the isolated word models for the unknown words in a phrase have been determined, they are aligned with the sequence of parameter frames of the input phrases containing that word, and word models are generated from the-result.

Word Model Adaptation

Another feature of the speech recognition system according to this embodiment is that the word models 19, the noise model 23 and the language model 21 shown in FIG. 10 can be updated and even modified by the build/update module 91. Therefore, the stored word models 19 can be modified or adapted by the input speech of a different user.

Figure 34:
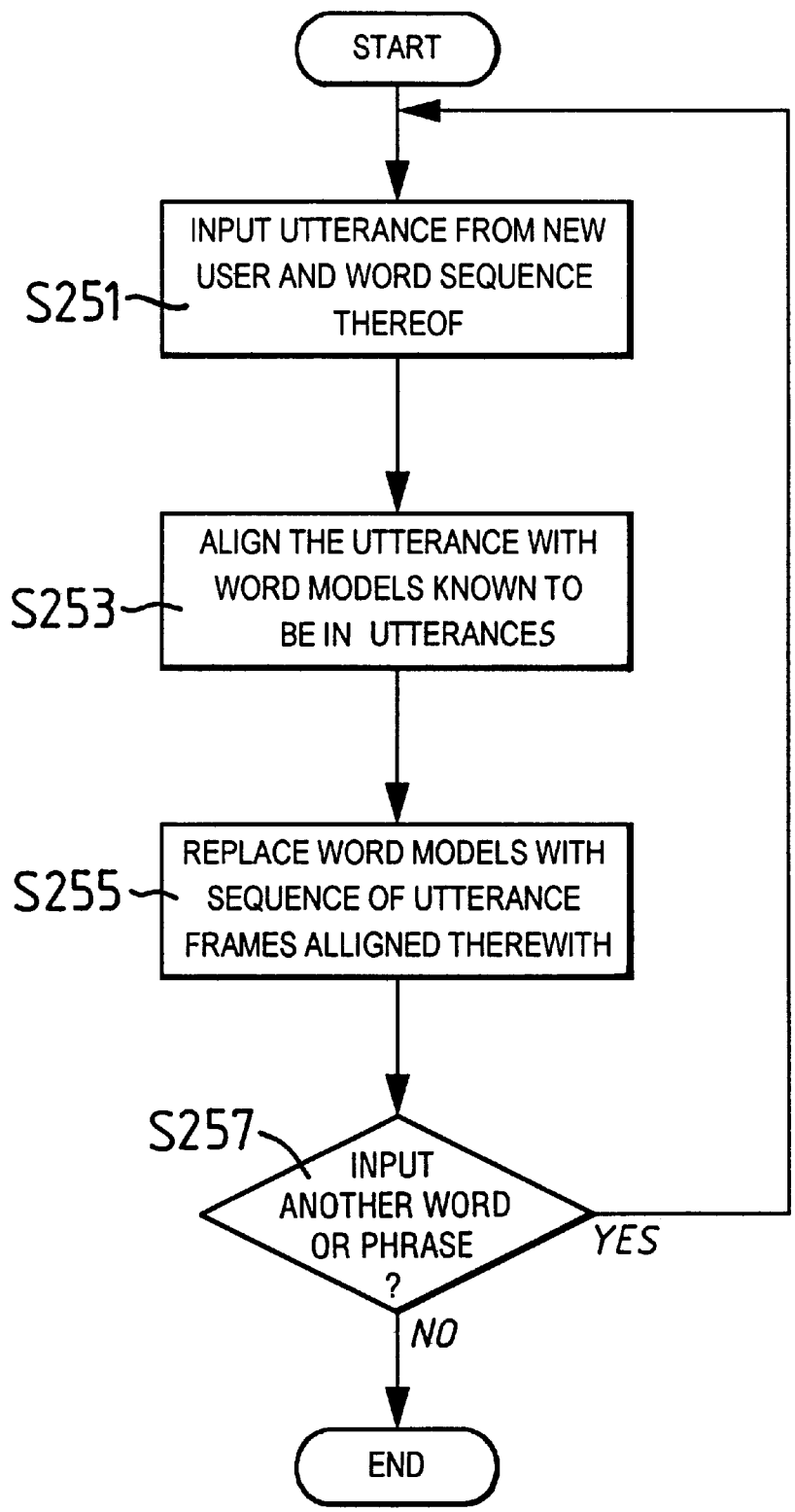
FIG. 34 is a flow chart which illustrates the steps involved in adapting the word models to a different user using a first substitution technique.

FIG. 34 is a flow chart which illustrates one method of how the stored word models 19 can be adapted to a different user. In particular, in step S251 the the new user inputs a known word or phrase into the system via the microphone 7 and the keyboard 3. The build/update module 91 therefore has the sequence of parameter frames corresponding to the utterance from the new user and the corresponding text entered via the keyboard 3. The system then aligns, in step S253, the input utterance with the existing word models of the words which are known to be in the utterance using a dynamic programming routine. The dynamic programming routine aligns the parameter frames of the input utterance with the states of the appropriate word models. The system then directly replaces, in step S255, the states of the word models with the sequence of parameter frames which are aligned therewith. If the new user then decides, in step S257, to input another phrase, then the processing returns to step S251, and the same routine is performed again for the next input utterance. If the new user decides at step S257 that no more phrases are to be adapted then the processing ends.

Figure 35:
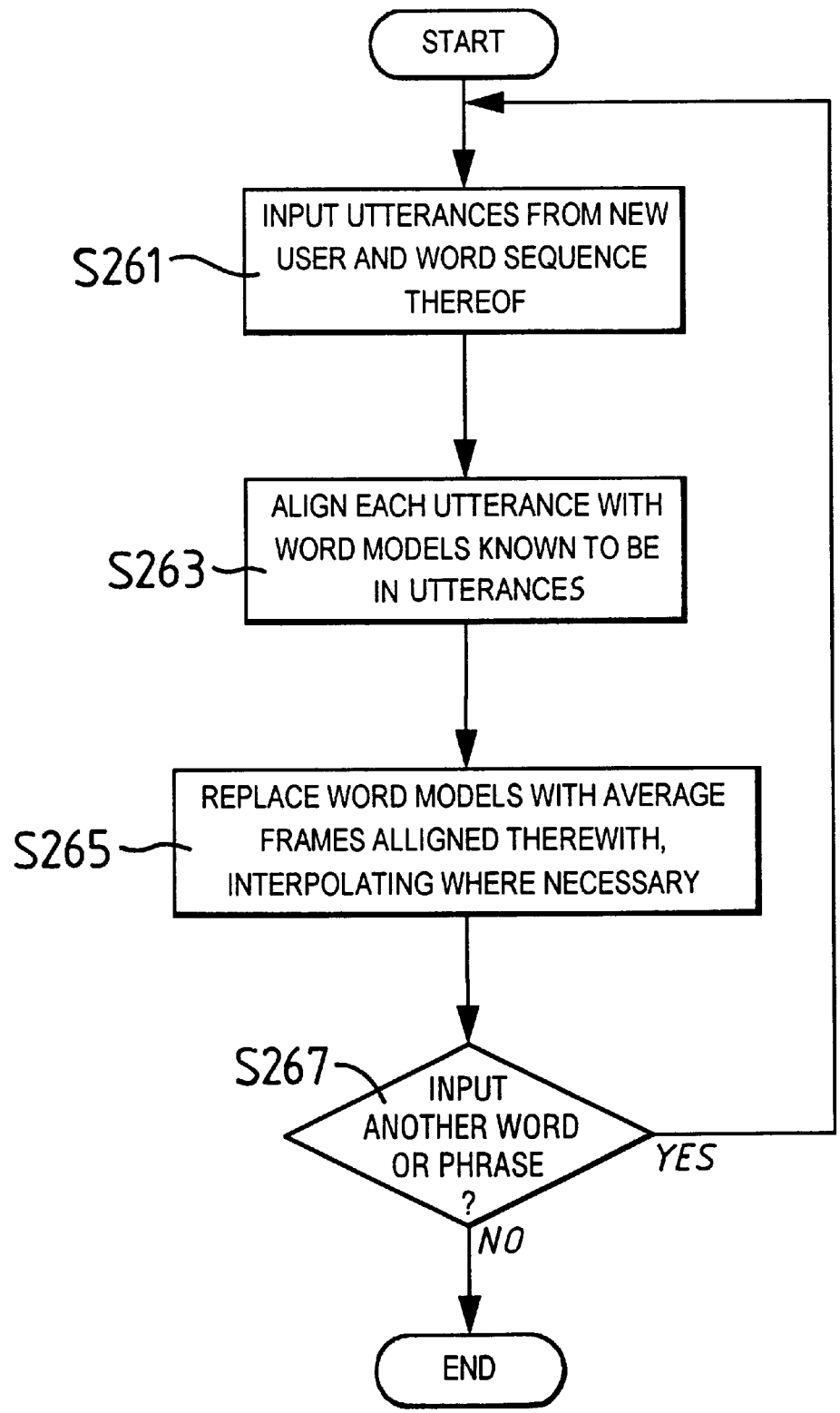
FIG. 35 is a flow chart which illustrates the steps involved in adapting the word models to a different user using a second substitution technique.

FIG. 35 is a flow chart which illustrates a second method of how the stored word models 19 can be adapted for a different user. In particular, in step S261 the new user inputs a known word or phrase into the system, a number of times via the microphone and once via the keyboard. The build/update module 91 therefore has a plurality of sequences of parameter frames, each corresponding to the utterance of the known word or phrase by the new user, and the corresponding text entered via the keyboard 3. The system then aligns, in step S263, each input utterance with the existing word models of the words which are known to be in the utterance, using a dynamic programming routine.

The dynamic programming routine aligns the parameter frames of each input utterance with the states of the appropriate word models. The system then replaces, in step S265, the states of the word models with the average of the parameter frames which are aligned therewith. If a state of a word model has not been aligned with any of the parameter frames of the utterances then, in this embodiment, the system interpolates between or extrapolates from neighbouring replaced states. If the new user decides, in step S267, to adapt another phrase, then the processing returns to step S261, and the same routine is performed again for the next phrase. If the new user decides at step S267 that no more phrases are to be input then the processing ends. Therefore, as will be apparent to those skilled in the art, the new user can adapt the existing word models incrementally at his convenience. Additionally, the new user can also add new words or phrases to the system in the manner described above.

Alternative Embodiments

A number of modifications can be made to the above speech recognition system without departing from the inventive concept of the present invention. A number of these modifications will now be described.

Although in the above embodiment, the whole utterance is received before it is processed, the system can run incrementally whereby as the speech is received it is processed. In such an embodiment, an input buffer would still be required, but it would only need to be able to store incoming speech corresponding to one frame, i.e. 20 milliseconds of speech. As those skilled in the art will realise, in order for this system to work, the entire processing of the frame of input speech (by the preprocessor and the recognition block), must be finished before the next frame of input speech is ready to be processed. With the above frame rate and frame duration, this means that the time taken to process a frame of input speech must be less than ten milliseconds. This can be achieved with current state of the art processors. In addition, the power parameter in each frame of the input utterance would have to be normalised in a different manner. One way of normalising the power in such an embodiment would be to use an adaptive normalisation factor which would be adapted based upon the power of the input speech over, for example, the previous twenty input frames.

In the first embodiment, the states of the word models which were at the end of a dynamic programming path were listed in an active list associated with that word model. In an alternative embodiment a single global active list could be provided in which all the active states of all the word models would be listed. In such an alternative embodiment, information would have to be stored associated with the global active list, for identifying which word models the particular active states belong to.

In the first embodiment, the states of the word models correspond in time duration to the frames of the input speech to be recognised. In an alternative embodiment, each state of a word model could be equivalent in time duration to, for example, three consecutive frames of the input speech. In such an alternative embodiment, the input frames would be averaged in groups of three and then aligned with the states of the word models.

In yet another alternative embodiment, the word models could be statistical models, for example Hidden Markov models, well known to those skilled in the art of speech recognition. In such an embodiment, rather than determining the minimum cumulative distance between the input utterance and the sequences of word models, the maximum probability that the input sequence was generated by a particular sequence of Hidden Markov models would be determined. In such an embodiment, the Hidden Markov models would be generated in a similar manner to the continuous reference models generated in the first embodiment. In particular, an isolated reference model for a word would be generated by comparing an utterance of the word with one or more utterances of phrases containing the word. The isolated reference model would then be used with a plurality of example phrases, which contain the word, to generate the mean parameter frames and the covariance matrices of the states of the Hidden Markov Model, and to generate the transition probabilities between the states. The way in which this would be achieved, would be apparent to those skilled in the art of speech recognition.

In the first embodiment, the reference models used corresponded to whole words. As those skilled in the art will realise, this is not essential. The reference models could correspond to parts of words, e.g. syllables, to a plurality of words or even to individual phonemes. However, the disadvantage of using reference models which correspond to phonemes is that the system becomes language dependent. Further, reference models which are equivalent to whole words are preferred to those equivalent to whole phrases because there is a potential for time and computational savings. In particular, by modelling the words within phrases and by using a language model, it is possible to teach the system many different phrases using only a handful of words. If on the other hand, the reference models corresponded to the whole phrases, then a reference model would be required for each of the different phrases to be learnt by the system. In addition to this advantage, the use of reference models which correspond to words also increases the system's flexibility to gaps between the words in the phrase. This is possible because of the environment model which can appear at the beginning or end of the phrase and also between the words in the phrase.

In yet another alternative embodiment, the reference models could be compressed if consecutive frames of the model are similar. If this situation arises then the consecutive similar frames would be replaced by a single frame. In such an embodiment, the constraint placed on the dynamic programming process, that consecutive frames of the input utterance cannot be aligned with the same state of a word model more than twice, would have to be removed.

In the language model shown in FIG. 17, if a word can be followed by two different words, then no preference is placed on which of the two words will follow that word. In an alternative embodiment, it would be possible to weigh some sequences of words more favourably than others. For example, for the phrases illustrated in FIG. 17a, it may be known that the phrase "make it more . . . " (followed by a colour) is more common than the phrases "make it smaller", or "make it larger" or "make it brighter". Therefore, the transition from node $N_7$ to node $N_8$ is made stronger compared to the transition from node $N_7$ to the end node $N_n$. This can be achieved by using weighing factors which weigh the cumulative distances being propagated from node $N_7$ to the input of words "more", "smaller", "larger" and "brighter".

As those skilled in the art will realise, the language model used to define the allowed sequences of words does not have to be a Bigram model, but could be any known type of language model, for example a finite state grammar model. If the type of language model used is changed, then some modifications would have to be made to the dynamic programming matching process described above, but such modifications would be apparent to those skilled in the art of speech recognition. However, the essential features of the matching process would remain unchanged, as these are designed to be suitable for use in any pattern matching process.

In the first embodiment, at least two phrases which contain a word had to be input into the system before a reference model for that word could be generated. This is a preferred mode of operation, and word models could be generated for each word from only a single example phrase containing that word. However, in such an embodiment, the reference models will be less representative of that word when used in any given phrase. Additionally, in the training method used in the first embodiment, once a reference word model is determined for a word the word model is not changed regardless of whether subsequent input training phrases contain that word. In an alternative embodiment, it would be possible to update existing word models during the training session, using input phrases which contain examples of the words for which there are already word models.

When the user is training the speech recognition system, and inputs a phrase containing a number of words which have already been input in isolation, the system does not prompt the user to input those words in isolation again. In an alternative embodiment, the system could prompt the user for those words again, and could perform a consistency check to ensure that the two utterances of the word do not significantly differ.

In the first embodiment, when the reference models are being trained or adapted, the user has to input the text and then input the corresponding voice command. As those skilled in the art of speech recognition will realise, this is not essential. Instead of entering text, the user could simply press a corresponding key/combination of keys on the keyboard, facsimile machine, photocopier etc. For example, when training the system for use in a photocopier, when entering the voice command "copy" the desired machine response can be input by the user simply pressing the copy button.

In addition, it will be apparent to those skilled in the art of pattern matching, that the method of implementing the dynamic programming matching process and the reference model generation and adaptation processes described above, could also be used for matching other types of patterns. For example, it is envisaged that the above described pattern matching process could be used in handwriting recognition or other pattern matching techniques.

Although a continuous word speech recognition system is described in the first embodiment described above, it will be apparent to those skilled in the art that many features of the system described could equally apply to other kinds of speech recognition systems. For example, the way of determining the isolated word models, and the isolated word models referred to above, could be used in an isolated word speech recognition system. Similarly, many features of the way in which the dynamic programming process is carried out, and the way in which the pruning threshold is adjusted, could be used in any speech recognition system where the reference models correspond to any part of speech, e.g. phonemes, syllables, etc.

The speech recognition system described in the first embodiment can be used in conjunction with many different software applications, for example, a spreadsheet package, a graphics package, a word processor package etc. If the speech recognition system is to be used with a plurality of such software applications, then it might be advantageous to have separate word and language models for each application, especially if the phrases used in each application are different. The reason for this is that as the number of word models increases and as the language model increases in size, the time taken for the system to recognise an input utterance increases. Therefore, by having separate word and language models for each application, the speed of the speech recognition system can be maintained. Additionally, several word and language models could be used for each application.

Additionally, as those skilled in the art will appreciate, the above speech recognition system can also be used in many different types of hardware. For example, apart from the obvious use in a personal computer or the like, the speech recognition system could be used as a user interface to a facsimile machine, telephone, printer, photocopier or any machine having a human/machine interface.

Example Application

One application for the above speech recognition system is in a computer graphics package user interface. The user of the graphics package can then input image manipulation commands via a microphone, without having to use complex pointing device or keyboard controlled graphics menus.

Figure 36:
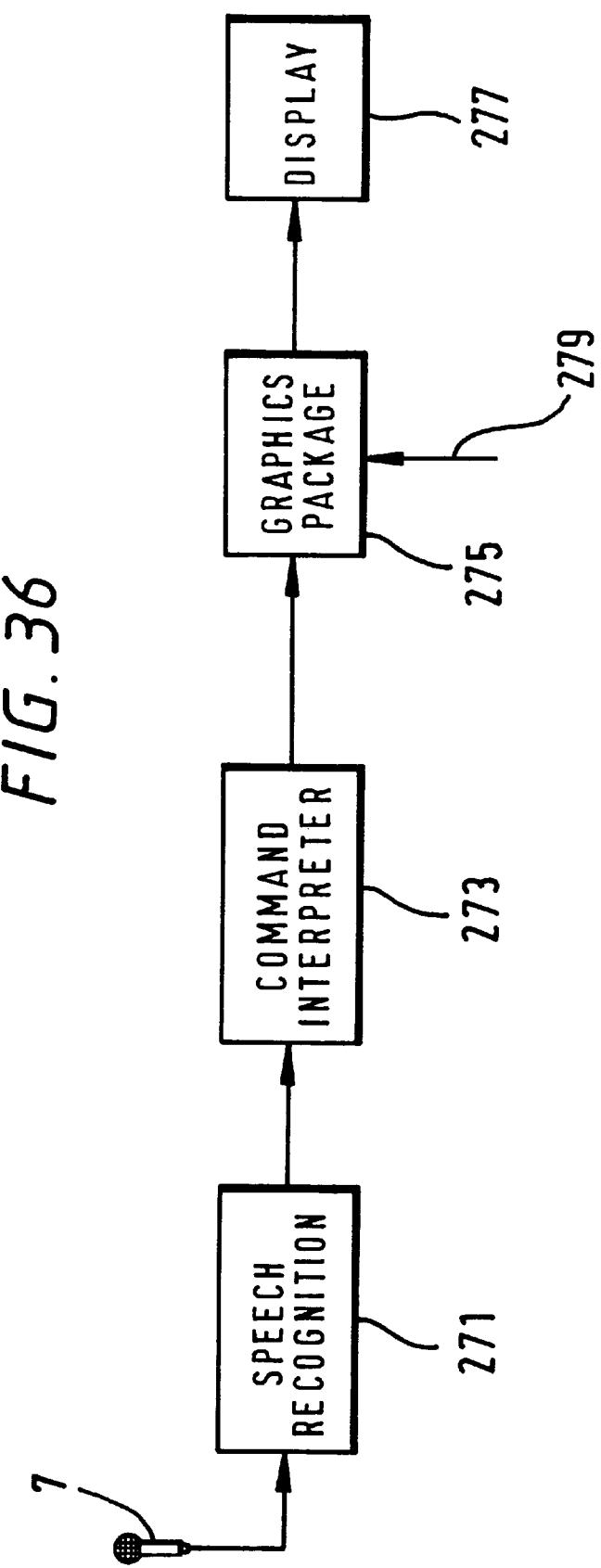
FIG. 36 is a block diagram of an image editing system that has a speech recognition user interface.

FIG. 36 is a block diagram of an image editing system that has a speech recognition user interface. In particular, the system comprises a microphone 7 which converts acoustic speech commands from a user into an equivalent electrical signal; a speech recognition unit 271, for example the one described above, for recognising the input speech; a command interpreter 273 for interpreting the recognised speech; a graphics package 275 responsive to the command interpreter; and a display 277 for displaying the current image being edited.

An input speech command is recognised by the speech recognition block 271 and interpreted by the command interpreter 273. The command interpreter then sends a sequence of instructions to the graphics package 275 for editing the current image displayed on the display 277. The graphics package 275 can also receive other instructions and data from the user, and this possibility is represented by arrow 279.

Figure 37:
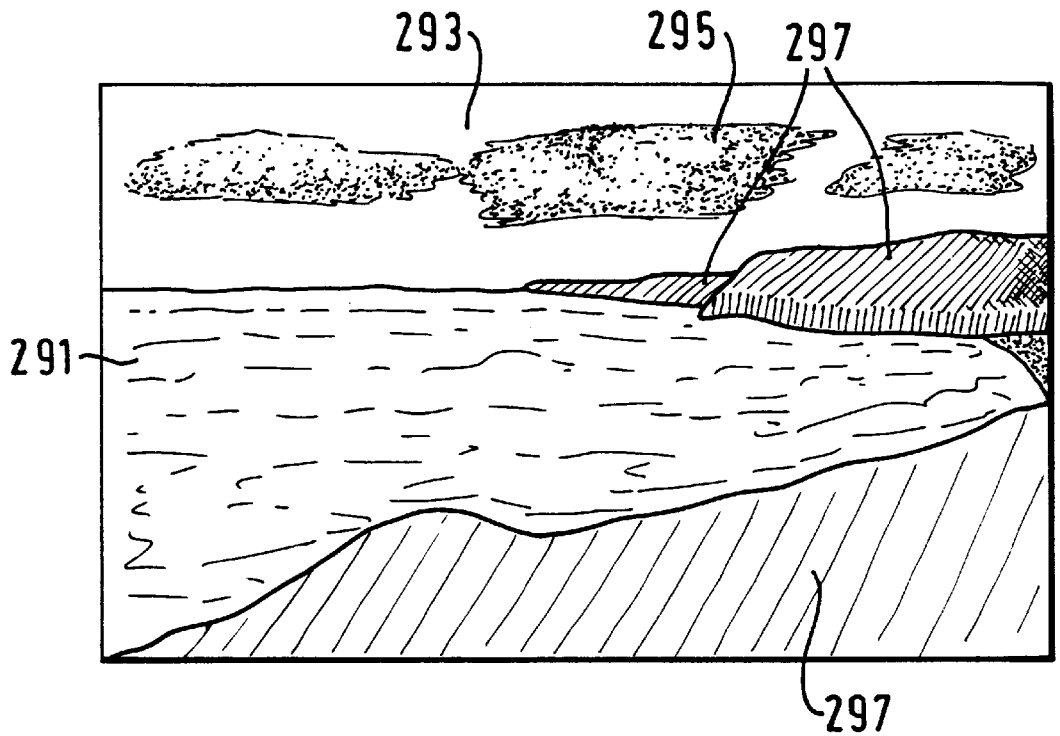
FIG. 37 is a scenic view, showing the sea, the sky with clouds and land.

This system is useful for colour manipulation of the current image displayed. An example of the capabilities of such a system will now be described with reference to FIGS. 37 and 38. FIG. 37 shows a scenic view of the sea 291, the sky 293 with clouds 295 and land 297. If the user wishes to make the sea 291 more blue, then he simply inputs the command "make this more blue", and uses a pointing device such as a mouse, to designate the sea 291 on the display 277. The system recognises the input and the graphics package 275 alters the displayed image to affect the desired change. The way in which the system shown in FIG. 36 achieves this will now be described in more detail.

When the user inputs the command "make this more blue" via the microphone 7, the speech recognition unit 271 converts the utterance into a representative sequence of patterns, and compares the sequence with pre-stored sequences of patterns representative of known speech. From this comparison, the speech recognition unit 271 outputs a recognition result to the command interpreter unit 273, which interprets the recognition result and initiates an appropriate program which is stored on, for example a hard disc. In this example the program initiated monitors the pointing device (not shown) which is connected to the graphics package 275, to receive details of what has to be made more blue. The user then moves the cursor, controlled by the pointing device, into the area of the display corresponding to the sea 291 and presses and holds down a selection button on the pointing device. While holding the selection button down, the user then moves the cursor across the display 277 in the area corresponding to the sea 291. As the cursor is moved across the sea 291, the program initiated by the command interpreter 273 collects the values of the hue, saturation and intensity of those pixels traced over by the cursor. When the user releases the selection button the program determines the average hue and the standard deviation of the sampled pixels which do not have a low saturation or intensity value.

Figure 38:
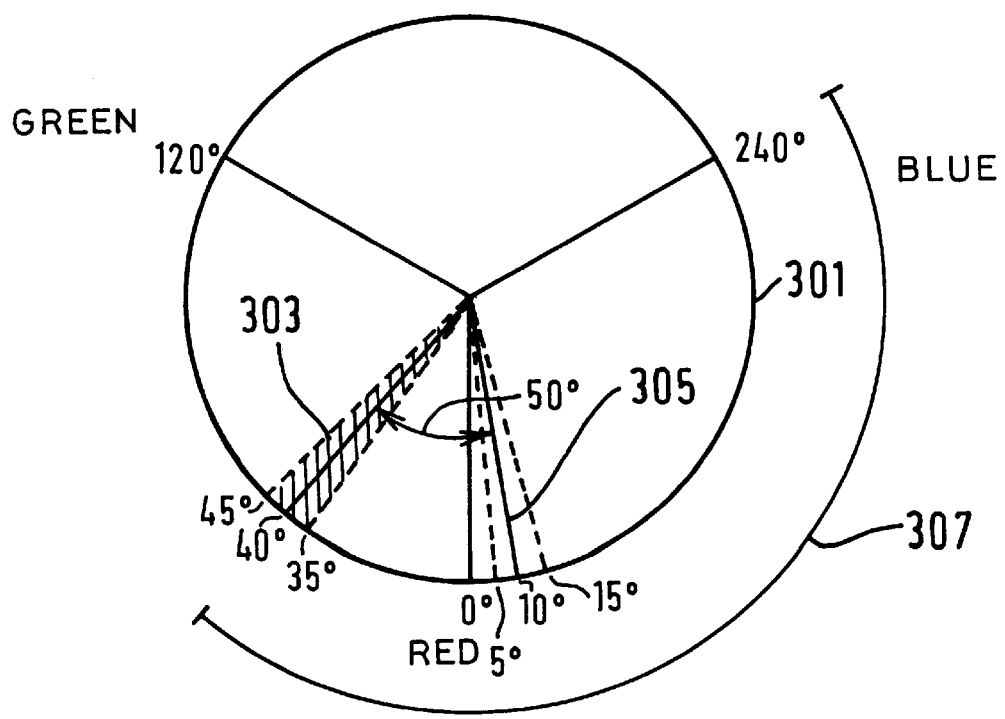
FIG. 38 is a schematic representation of a hue chart plotted on the circumference of a circle.

FIG. 38 shows a hue chart 301 with red corresponding to 0° at the six o'clock position, green corresponding to 120° at the ten o'clock position and blue corresponding to 240° at the 2 o'clock position. In the above example, if the program determines that the average hue corresponds to 40° and the standard deviation is 5° then the resulting range of hue values is illustrated by the area 303 in the hue chart shown in FIG. 38. To make the sea 291 more blue the system then transforms all pixels that have a hue value within the area 303 into a target area 305 shown in FIG. 38. The target area 305 is determined by firstly determining the smallest arc between the average hue value determined for the sampled pixels and the hue value corresponding to blue (this arc is represented by arc 307 shown in FIG. 38), then dividing the angle of the arc by four and finally adding or, as in this example, subtracting the resulting angle from the hue values of all the pixels that have a hue value within the area 303. In the example described, the average hue is 40°, therefore the angle of the arc is 200° and so 50° is subtracted from the hue values of all pixels falling within the area 303. The image is then redisplayed and the sea 291 appears "more blue" to the user.

As those skilled in the art will realise, it would also be possible to change all the pixels that have a hue range falling within the area 303 to have a specific hue value corresponding to a given colour. It would also be possible to associate the colours of one palette with the colours of user generated palettes, so that if the user asks the machine to load one of the user defined palettes, then the colours of the original image will be transformed into the corresponding colours of the user defined palette. Alternatively, it would be possible to perform similar processing techniques to change the intensity or saturation of a part or parts of an image. This may be appropriate where the output is a black and white image from, for example, a facsimile machine, and the user wishes to emphasise tonal contrasts of parts of the reproduced image. Whilst the embodiment described above uses a display to reproduce the image, it will be apparent that if the system is to be used in conjunction with a facsimile machine or photocopier, such a display would be optional. Although the graphics manipulation system has been described with reference to a computer, it is also applicable to other image devices, such as cameras, and in particular digital motion and still cameras.

In summary, the user can edit an image without having to be experienced in colour editing terminology or colour manipulation tools.

The present invention is not intended to be limited by the exemplary embodiments described above, and various other modifications and embodiments will be apparent to those skilled in the art.

What I claim is:

1. An image manipulation apparatus comprising:

means for reproducing an image;

a speech recognition user interface for allowing a user to input a speech signal comprising a description of a desired change to be made to the reproduced image;

means for interpreting a recognition result output from the speech recognition interface; and changing means responsive to the interpreting means for changing the colour of one or more parts of the reproduced image in order to affect a manipulation desired by the user;

wherein said description comprises a number of continuously spoken words;

wherein said speech recognition user interface comprises:

a memory for storing a plurality of reference word models, each representative of a word, and for storing a language model which defines sequences of the reference word models which can be matched with the input speech signal, in order to define input speech commands;

matching means for matching the input speech signal with selected sequences of said word models, selected in accordance with the stored language model;

recognition means, responsive to said matching means, for providing a recognition result based upon a likely sequence of reference models that corresponds to an input utterance;

receive means for receiving a new input speech command comprising two or more whole words;

means for generating a word model for each of the words contained within the new input speech command, if they do not already exist; and means for adapting said language model to incorporate said new input speech command.

2. An apparatus according to claim 1, wherein said means for reproducing the image comprises a display device, and wherein the system further comprises means for designating one or more areas of the displayed image to be altered.

3. An apparatus according to claim 2 wherein said designating means is a pointing device which is moved across an area to be changed, and wherein said changing means is arranged to determine the statistical characteristics of the hue values of the pixels traced by said pointing device, and wherein said changing means is arranged to change the hue value of all pixels in the image having a hue value similar to the determined statistics.

4. An apparatus according to claim 3, wherein said changing means determines the average and standard deviation of the pixels traced by said pointing device, and wherein all pixels in the image having a hue value within the range of the determined average plus or minus the determined standard deviation are changed by said changing means.

5. An apparatus according to claim 3, wherein the amount of hue change is dependent upon the hue value of the desired colour change.

6. An apparatus according to claim 1, wherein said means for reproducing the image comprises a printing device.

7. An apparatus according to claim 1, wherein said language model adapting means comprises:

means for associating the first word in the new input speech command to the output of a start node of the language model, if it is not already associated thereto;

means for processing all but the last word in the new input speech command comprising:

i) means for creating an intermediate node and for associating the current word in the new input speech command to the input of that node, if the current word is not already connected to the input of an intermediate node; and ii) means for associating the next word in the new input speech command to the output of the intermediate node that has the current word associated to its input, if it is not already associated thereto; and means for associating the last word in the new input speech command to the input of an end node of the language model if it is not already associated thereto.

8. A computer having an image manipulation system according to claim 1.

9. A facsimile machine having an image manipulation system according to claim 1.

10. A photocopier having an image manipulation system according to claim 1.

11. A camera having an image manipulation system according to claim 1.

12. A method of manipulating an image comprising the steps of:

reproducing an image;

using a speech recognition user interface for allowing a user to input a speech signal comprising a description of a desired change to be made to the reproduced image;

interpreting a recognition result output from the speech user recognition interface; and changing a colour of one or more parts of the reproduced image in response to the interpreting step, in order to effect the colour manipulation desired by a user;

wherein said description comprises a number of continuously spoken words;

wherein said speech recognition user interface performs the steps of:

i) matching the input speech signal with selected sequences of word models, selected in accordance with a stored language model by using a memory storing a plurality of reference word models, each representative of a word, and a language model which defines sequences of the reference word models which can be matched with the input speech signal, in order to define input speech commands; and ii) providing, in response to the matching step, a recognition result based upon a likely sequence of reference models that corresponds of an input utterance; and wherein said language model is adaptable by:

(a) receiving a new input speech command comprising two or more whole words;

(b) generating a word model for each of the words contained within the new input speech command, if they do not already exist; and (c) adapting the language model to incorporate the new input speech command.

13. A method according to claim 12, wherein said reproducing step displays said image on a display, and wherein said method further comprises the step of designating one or more areas of the displayed image to be altered.

14. A method according to claim 13, wherein a user moves a pointing device across an area to be changed in order to designate said one or more areas of the displayed image, and wherein said changing step determines statistical characteristics of hue values of pixels traced by said pointing device, and wherein said changing step is arranged to change the hue value of all pixels in the image having a hue value similar to the determined statistical characteristics.

15. A method according to claim 14, wherein said changing step determines an average and standard deviation of pixels traced by said pointing device, and wherein all pixels in the image having a hue value within a range of the determined average plus or minus the determined standard deviation are changed in said changing step.

16. A method according to claim 14, wherein an amount of hue change is dependent upon the hue value of a desired colour change.

17. A method according to claim 12, wherein said reproducing step comprises a step of printing the image.

18. A method according to claim 12, wherein said adapting step comprises the steps of:

associating the first word in the new input speech command to the output of a start node of the language model, if it is not already associated thereto;

processing all but the last word in the new input speech command by:

i) creating an intermediate node and associating a current word in the new input speech command to the input of that node, if the current word is not already connected to the input of an intermediate node; and ii) associating a next word in the new input speech command to an output of the intermediate node that has the current word associated to its input if the next word is already associated thereto; and associating a last word in the new input speech command to an input of an end node of the language model if the last word is not already associated thereto.

19. A computer readable medium storing computer executable process steps to allow image manipulation, the process steps comprising the steps of:

reproducing an image;

using a speech recognition user interface for allowing a user to input a speech signal comprising a description of a desired change to be made to the reproduced image;

interpreting a recognition result output from the speech user recognition interface; and changing the colour of one or more parts of the reproduced image in response to said interpreting step, in order to effect a manipulation desired by a user;

wherein said description comprises a number of continuously spoken words;

wherein said speech recognition user interface performs the step of:

matching the input speech signal with selected sequences of word models, selected in accordance with a stored language model by using a memory storing a plurality of reference word models, each representative of a word, and a language model which defines sequences of the reference word models which can be matched with the input speech signal, in order to define input speech commands; and providing, in response to the matching step, a recognition result based upon a likely sequence of reference models that corresponds to an input utterance; and wherein said language model is adaptable by:

(a) receiving a new input speech command comprising two or more whole words:

(b) generating a word model for each of the words contained within the new input speech command, if they do not already exist; and (c) adapting the language model to incorporate the new input speech command.

20. A computer readable medium according to claim 19, wherein said reproducing step displays said image on a display, and further comprising processing steps designating one or more areas of the displayed image to be altered.

21. A computer readable medium according to claim 20, wherein a user moves a pointing device across an area to be changed in order to designate said one or more areas of the displayed image, and wherein said changing step determines the statistical characteristics of the hue values of the pixels traced by said pointing device, and wherein said changing step is arranged to change the hue value of all pixels in the image having a hue value similar to the determined statistical characteristics.

22. A computer readable medium according to claim 21, wherein said changing step determines an average and standard deviation of pixels traced by said pointing device, and wherein all pixels in the image having a hue value within a range of the determined average plus or minus the determined standard deviation are changed in said changing step.

23. A computer medium according to claim 21, wherein an amount of hue change is dependent upon the hue value of a desired colour change.

24. A computer readable medium according to claim 19, wherein said reproducing step comprises a step of printing the image.

25. A computer readable medium according to claim 19, wherein said adapting step comprises the steps of:

associating the first word in the new input speech command to an output of a start node of the language model, if it is not already associated thereto;

processing all but the last word in the new input speech command by:

i) creating an intermediate node and associating a current word in the new input speech command to an input of that node, if the current word is not already connected to the input of an intermediate node; and ii) associating a next word in the new input speech command to the output of the intermediate node that has the current word associated to its input, if the next word is not already associated thereto; and associating the last word in the new input speech command to the input of an end node of the language model if the last word is not already associated thereto.

26. An image manipulation apparatus comprising:

a speech recognition user interface for allowing a user to input a speech signal of a command comprising a number of continuously spoken words;

means for interpreting a recognition result output from the speech recognition interface; and means responsive to the interpreting means for executing a function corresponding to the command;

wherein said speech recognition user interface uses a memory for storing a plurality of reference word models, each representative of a word, and for storing a language model which defines sequences of the reference word models which can be matched with the input speech signal, in order to define input speech commands and comprises:

matching means for matching the input speech signal with selected sequences of said word models, selected in accordance with the stored language model;

recognition means, responsive to said matching means, for providing a recognition result based upon a likely sequence of reference models that corresponds to an input utterance;

receive means for receiving a new input speech command comprising two or more whole words;

means for generating a word model for each of the words contained within the new input speech command, if they do not already exist; and means for adapting said language model to incorporate said new input speech command.

27. A method of manipulating an image comprising the steps of:

using a speech recognition user interface for allowing a user to input a speech signal of a command comprising a number of continuously spoken words;

interpreting a recognition result output from the speech recognition interface; and executing a function corresponding to the command in response to the interpreting step;

wherein said speech recognition user interface uses a memory for storing a plurality of reference word models, each representative of a word, and for storing a language model which defines sequences of the reference word models which can be matched with the input speech signal, in order to define input speech commands and matches the input speech signal with selected sequences of said word models, selected in accordance with the stored language model; and provides in response to said matching step a recognition result based upon a likely sequence of reference models that corresponds to an input utterance; and wherein the method further comprises the steps of:

receiving a new input speech command comprising two or more whole words;

generating a word model for each of the words contained within the new input speech command, if they do not already exist; and adapting said language model to incorporate said new input speech command.

28. A computer readable medium storing computer executable process steps to allow image manipulation, the process steps comprising the steps of:

using a speech recognition user interface for allowing user to input a speech signal of a command comprising a number of continuously spoken words;

interpreting a recognition result output from the speech recognition interface; and executing a function corresponding to the command in response to the interpreting step;

wherein said speech recognition user interface uses memory for storing a plurality of reference word models, each representative of a word, and for storing a language model which defines sequences of the reference word models which can be matched with the input speech signal, in order to define input speech commands and matches the input speech signal with selected sequences of said word models, selected in accordance with the stored language model; and provides, in response to said matching step a recognition result based upon a likely sequence of reference models that corresponds to an input utterance; and wherein the process steps further comprise the steps of:

receiving a new input speech command comprising two or more whole words;

generating a word model for each of the words contained within the new input speech command, if they do not already exist; and adapting said language model to incorporate said new input speech command.

* * * * *

UNITED STATES PATENT AND TRADEMARK OFFICE
CERTIFICATE OF CORRECTION

PATENT NO.   : 6,133,904
DATED        : October 17, 2000
INVENTOR(S)  : Eli Tzirkel-Hancock It is certified that error appears in the above-identified patent and that said Letters Patent is hereby corrected as shown below:

Title page,
Item [30], Foreign Application Priority Data, "9602701" should read -- 9602701.6 --.
Item [56], U.S. PATENT DOCUMENTS, "Salisbury et al," should read
-- Salisbury et al., --.

Drawings,
Sheet 16, FIG. 21, "INITIALISE" (both occurrences) should read -- INITIALIZE --.
Sheet 22, FIG. 28, "INITIALISE" should read -- INITIALIZE --.

Column 1,
Line 3, "particular" should read -- particular relevance, --.

Column 3,
Line 16, "land;" should read -- land; and --.

Column 7,
Line 9, "etc," should read -- etc., --; and
Line 14, "the," should read -- the --.

Column 19,
Line 33, "SD," should read -- $S_D$, --.

Column 22,
Line 57, "If on there other hand" should read -- If, on the other hand, --.

Column 23,
Line 30, "$S_0$." should read -- $S_1$. --.

Column 25,
Lines 49, 53 and 55, "nsa" should read -- $n_{sa}$ --.

Column 26,
Line 30, "is," should read -- is --.

Column 27,
Line 8, "parameters" should read -- parameter --.

Column 29,
Line 13, "the-result." should read -- the result. --; and
Line 23, "the the" should read -- the --.

Column 33,
Line 5, "use" should read -- use a --.

UNITED STATES PATENT AND TRADEMARK OFFICE
CERTIFICATE OF CORRECTION

PATENT NO. : 6,133,904
DATED : October 17, 2000
INVENTOR(S) : Eli Tzirkel-Hancock It is certified that error appears in the above-identified patent and that said Letters Patent is hereby corrected as shown below:

Column 34,
Line 2, "blue" should read -- blue, --;
Line 4, "305" should read -- 305, --;
Line 55, "colour" should read -- color --; and
Line 56, "affect" should read -- effect --.

Column 35,
Line 19, "claim 2" should read -- claim 2, --; and
Line 35, "colour" should read -- color --.

Column 36,
Lines 8, 10 and 55, "colour" should read -- color --.

Column 37,
Line 20, "colour" should read -- color --; and
Line 41, "words:" should read -- words; --.

Column 38,
Line 1, "computer medium" should read -- computer readable medium --; and
Line 3, "colour" should read -- color --.

Column 39,
Line 22, "user" should read -- a user --.

Column 40,
Line 4, "memory" should read -- a memory --.

Signed and Sealed this

Twenty-fourth Day of June, 2003

JAMES E. ROGAN
*Director of the United States Patent and Trademark Office*